(12) United States Patent
Tsifourdaris

(10) Patent No.: US 8,167,568 B2
(45) Date of Patent: May 1, 2012

(54) HIGH PRESSURE TURBINE BLADE AIRFOIL PROFILE

(75) Inventor: Panagiota Tsifourdaris, Montreal (CA)

(73) Assignee: Pratt & Whitney Canada Corp., Longueuil, QC (CA)

(*) Notice: Subject to any disclaimer, the term of this patent is extended or adjusted under 35 U.S.C. 154(b) by 216 days.

(21) Appl. No.: 12/732,708

(22) Filed: Mar. 26, 2010

(65) Prior Publication Data
US 2011/0236214 A1 Sep. 29, 2011

(51) Int. Cl.
F01D 5/14 (2006.01)

(52) U.S. Cl. ............... 416/223 A; 416/243; 416/DIG. 2; 415/191; 415/193; 415/199.5; 415/208.2; 415/209.1; 415/211.2

(58) Field of Classification Search .......... 415/191–193, 415/199.4, 199.5, 208.1, 208.2, 209.1, 211.2; 416/223 R, 223 A, 243, DIG. 2, DIG. 5
See application file for complete search history.

(56) References Cited

U.S. PATENT DOCUMENTS

| | | | |
|---|---|---|---|
| 6,398,489 B1 | 6/2002 | Burdgick et al. | |
| 6,832,897 B2 | 12/2004 | Urban | |
| 6,854,961 B2 | 2/2005 | Zhang et al. | |
| 6,910,868 B2 | 6/2005 | Hyde et al. | |
| 7,306,436 B2 | 12/2007 | Girgis et al. | |
| 7,351,038 B2 | 4/2008 | Girgis et al. | |
| 7,354,249 B2 | 4/2008 | Girgis et al. | |
| 7,367,779 B2 | 5/2008 | Girgis et al. | |
| 7,402,026 B2 | 7/2008 | Girgis et al. | |
| 7,520,726 B2 | 4/2009 | Papple et al. | |
| 7,520,727 B2 | 4/2009 | Sreekanth et al. | |
| 7,520,728 B2 | 4/2009 | Sleiman et al. | |
| 7,534,091 B2 | 5/2009 | Ravanis et al. | |
| 7,537,432 B2 | 5/2009 | Marini et al. | |
| 7,537,433 B2 | 5/2009 | Girgis et al. | |
| 7,559,746 B2 | 7/2009 | Tsifourdaris et al. | |
| 7,559,747 B2 | 7/2009 | Mohan et al. | |
| 7,559,748 B2 | 7/2009 | Kidikian et al. | |
| 7,559,749 B2 | 7/2009 | Kidikian et al. | |
| 7,566,200 B2 | 7/2009 | Marini et al. | |
| 7,568,889 B2 | 8/2009 | Mohan et al. | |
| 7,568,890 B2 | 8/2009 | Findlay et al. | |
| 7,568,891 B2 | 8/2009 | Mohan et al. | |
| 7,611,326 B2 | 11/2009 | Trindade et al. | |
| 7,625,182 B2 | 12/2009 | Mah et al. | |
| 7,625,183 B2 | 12/2009 | Tsifourdaris et al. | |
| 7,632,074 B2 | 12/2009 | Ravanis et al. | |
| 2005/0079061 A1 | 4/2005 | Beddard | |
| 2008/0124219 A1 | 5/2008 | Kidikian et al. | |
| 2009/0097982 A1 | 4/2009 | Saindon et al. | |
| 2009/0116967 A1 | 5/2009 | Sleiman et al. | |
| 2010/0008784 A1 | 1/2010 | Shafique et al. | |
| 2010/0266398 A1* | 10/2010 | Marini | 415/208.1 |
| 2010/0329874 A1* | 12/2010 | Tsifourdaris | 416/223 A |
| 2011/0243747 A1* | 10/2011 | Marini | 416/223 A |
| 2011/0243748 A1* | 10/2011 | Tsifourdaris | 416/223 A |
| 2011/0262279 A1* | 10/2011 | Marini et al. | 416/223 A |

* cited by examiner

*Primary Examiner* — Christopher Verdier
(74) *Attorney, Agent, or Firm* — Norton Rose Canada LLP

(57) ABSTRACT

A two-stage high pressure turbine includes a second stage blade having an airfoil with a profile substantially in accordance with at least an intermediate portion of the Cartesian coordinate values of X, Y and Z set forth in Table 2. The X and Y values are distances, which when smoothly connected by an appropriate continuing curve, define airfoil profile sections at each distance Z. The profile sections at each distance Z are joined smoothly to one another to form a complete airfoil shape.

12 Claims, 4 Drawing Sheets

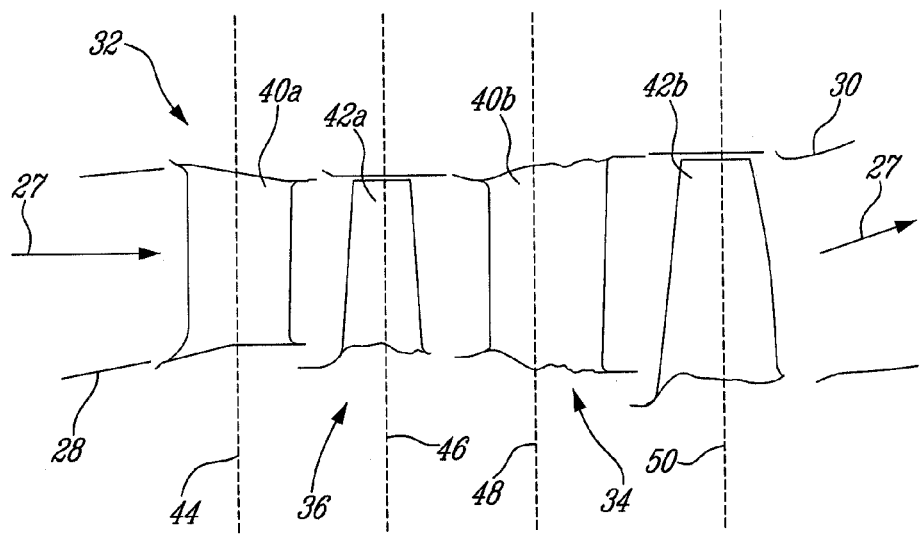
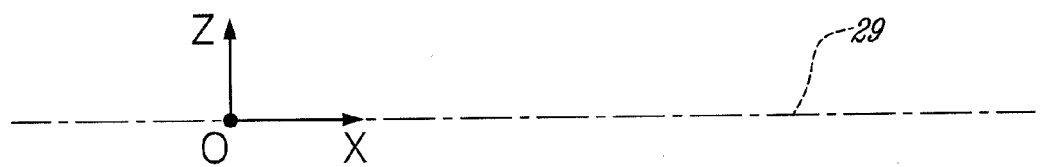

HIGH PRESSURE TURBINE BLADE AIRFOIL PROFILE

TECHNICAL FIELD

The application relates generally to a blade airfoil for a gas turbine engine and, more particularly, to an airfoil profile suited for use in the second stage blade assembly of a high pressure (HP) turbine.

BACKGROUND OF THE ART

Every stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. Each airfoil is subject to flow regimes which lend themselves easily to flow separation, which tend to limit the amount of work transferred to the compressor, and hence the total thrust or power capability of the engine. The high pressure turbine is also subject to harsh temperatures and pressures, which require a solid balance between aerodynamic and structural optimization. Therefore, improvements in airfoil design are sought.

SUMMARY

It is an object to provide an improved blade airfoil suited for use in a multistage high pressure turbine blade assembly.

In one aspect, the present application provides a turbine blade for a gas turbine engine having a gaspath, the blade comprising an airfoil having an intermediate portion contained within the gaspath and defined by a nominal profile substantially in accordance with Cartesian coordinate values of X, Y, and Z of Sections 3 to 13 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

In another aspect, the present application provides a turbine blade for a gas turbine engine having a gaspath, the turbine blade having a cold coated intermediate airfoil portion contained within the gaspath and defined by a nominal profile substantially in accordance with Cartesian coordinate values of X, Y, and Z of Sections 3 to 13 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

In another aspect, the present application provides a turbine rotor assembly for a gas turbine engine having a gaspath, the assembly comprising a plurality of blades, each blade including an airfoil having an intermediate portion contained with the gaspath of the engine and defined by a nominal profile substantially in accordance with Cartesian coordinate values of X, Y, and Z of Sections 3 to 13 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

In a still further aspect of the present application, there is provided a high pressure turbine blade comprising at least one airfoil having a surface lying substantially on the points of Table 2, the airfoil extending from a platform defined generally by some of the ID gaspath coordinates given in Table 1, wherein a fillet radius is applied around the airfoil between the airfoil and the platform.

Further details of these and other aspects of the present application will be apparent from the detailed description and figures included below.

DESCRIPTION OF THE DRAWINGS

Reference is now made to the accompanying figures depicting aspects of the present invention, in which:

FIG. 2 is a schematic view of a gaspath of the gas turbine engine of FIG. 1, including a two-stage high pressure turbine;

DETAILED DESCRIPTION

Figure 1:
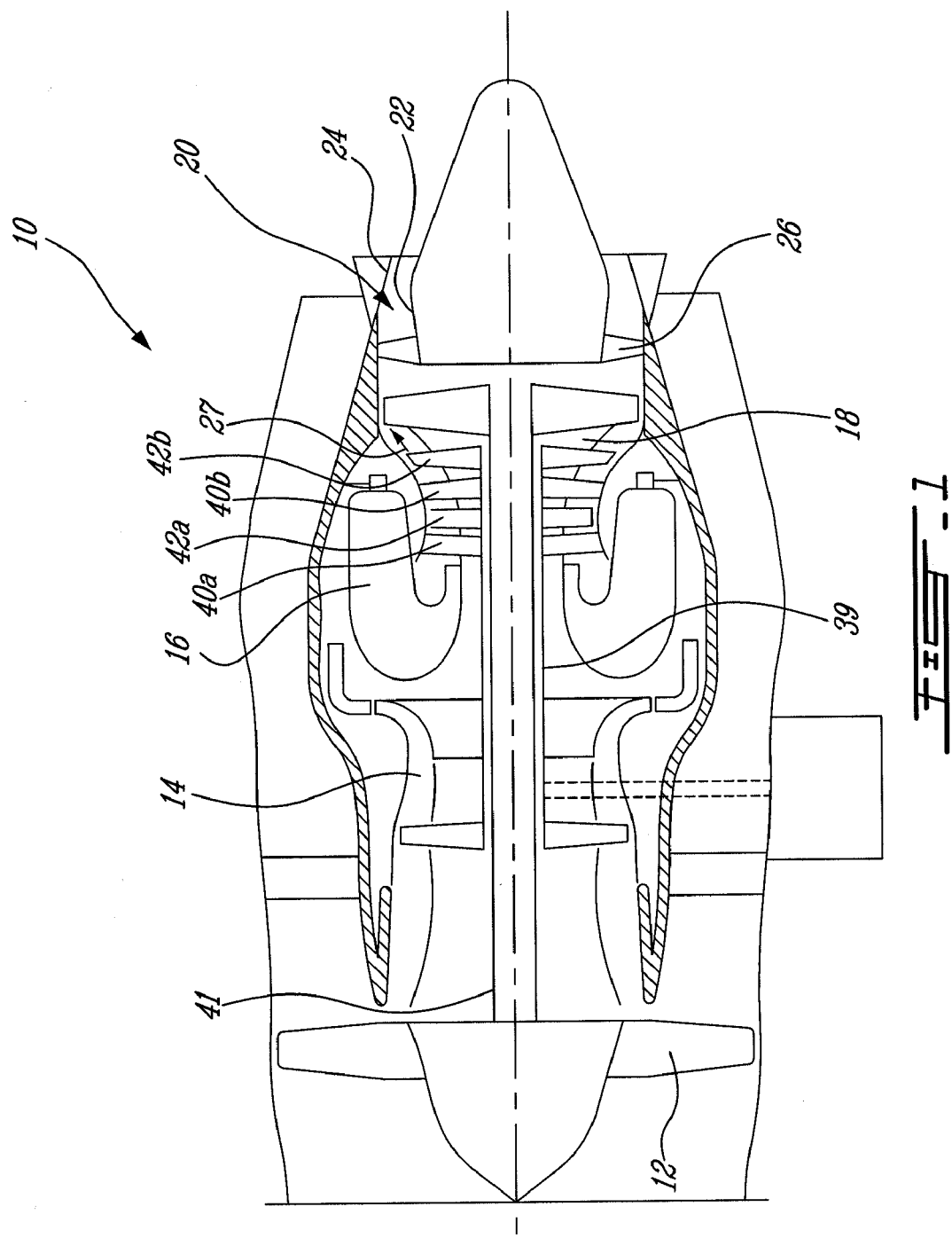
FIG. 1 is a schematic view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases to drive the fan, the compressor, and produce thrust.

The gas turbine engine 10 further includes a turbine exhaust duct 20 which is exemplified as including an annular core portion 22 and an annular outer portion 24 and a plurality of struts 26 circumferentially spaced apart, and radially extending between the inner and outer portions 22, 24.

FIG. 2 illustrates a portion of an annular hot gaspath, indicated by arrows 27 and defined by annular inner and outer walls 28 and 30 respectively, for directing the stream of hot combustion gases axially in an annular flow. The profile of the inner and outer walls 28 and 30 of the annular gaspath, "cold" (i.e. non-operating) conditions, is defined by the Cartesian coordinate values such as the ones given in Table 1 below. More particularly, the inner and outer gaspath walls 28 and 30 are defined with respect to mutually orthogonal x and z axes, as shown in FIG. 2. The x axis corresponds to the engine turbine rotor centerline 29. The radial distance of the inner and outer walls 28 and 30 from the engine turbine rotor centerline and, thus, from the x-axis at specific axial locations is measured along the z axis. The z values provide the inner and outer radius of the gas path at various axial locations therealong. The x and z coordinate values in Table 1 are distances given in inches from the point of origin O (see FIG. 2). It is understood that other units of dimensions may be used. The x and z values have in average a manufacturing tolerance of about ±0.030". The tolerance may account for such things as casting, coating, ceramic coating and/or other tolerances. It is understood that the manufacturing tolerances of the gas path may vary along the length thereof.

The turbine section 18 has two high pressure turbine (HPT) stages located in the gaspath 27 downstream of the combustor 16. Referring to FIG. 2, the HPT stages each comprise a stator assembly 32, 34 and a rotor assembly 36, 38 having a plurality of circumferentially arranged vane 40a, 40b and blades 42a, 42b respectively. The vanes 40a,b and blades 42a,b are mounted in position along respective stacking lines 44-50, as identified in FIG. 2. The stacking lines 44-50 extend in the radial direction along the z axis at different axial locations. The stacking lines 44-50 define the axial location where the blades and vanes of each stage are mounted in the engine 10. More specifically, stacking line 44 located at x=0 corresponds to the first stage HPT vane 40a. The stacking line 50 of the second stage HP turbine blade 42b is located at x=4.433 inches.

Table 1 provides cold coated gaspath definition from upstream to downstream of the second stage HP blade airfoil 42b.

TABLE 1

COLD COATED GASPATH DEFINITION

| INNER GASPATH | | OUTER GASPATH | |
|---|---|---|---|
| X | Z | X | Z |
| 2.894 | 6.320 | 2.749 | 8.055 |
| 2.948 | 6.296 | 2.998 | 8.055 |
| 3.185 | 6.262 | 3.238 | 8.105 |
| 3.434 | 6.246 | 3.483 | 8.124 |
| 3.686 | 6.246 | 3.735 | 8.127 |
| 3.812 | 5.998 | 3.771 | 8.152 |
| 3.855 | 6.037 | 3.921 | 8.152 |
| 3.980 | 6.204 | 4.070 | 8.152 |
| 4.174 | 6.223 | 4.219 | 8.152 |
| 4.378 | 6.184 | 4.368 | 8.152 |
| 4.587 | 6.178 | 4.518 | 8.152 |
| 4.794 | 6.144 | 4.667 | 8.152 |
| 4.994 | 6.191 | 4.816 | 8.152 |
| 5.313 | 6.157 | 5.070 | 8.149 |
| 5.769 | 6.244 | 5.386 | 8.200 |
| 6.236 | 6.296 | 5.688 | 8.305 |

Figure 3:
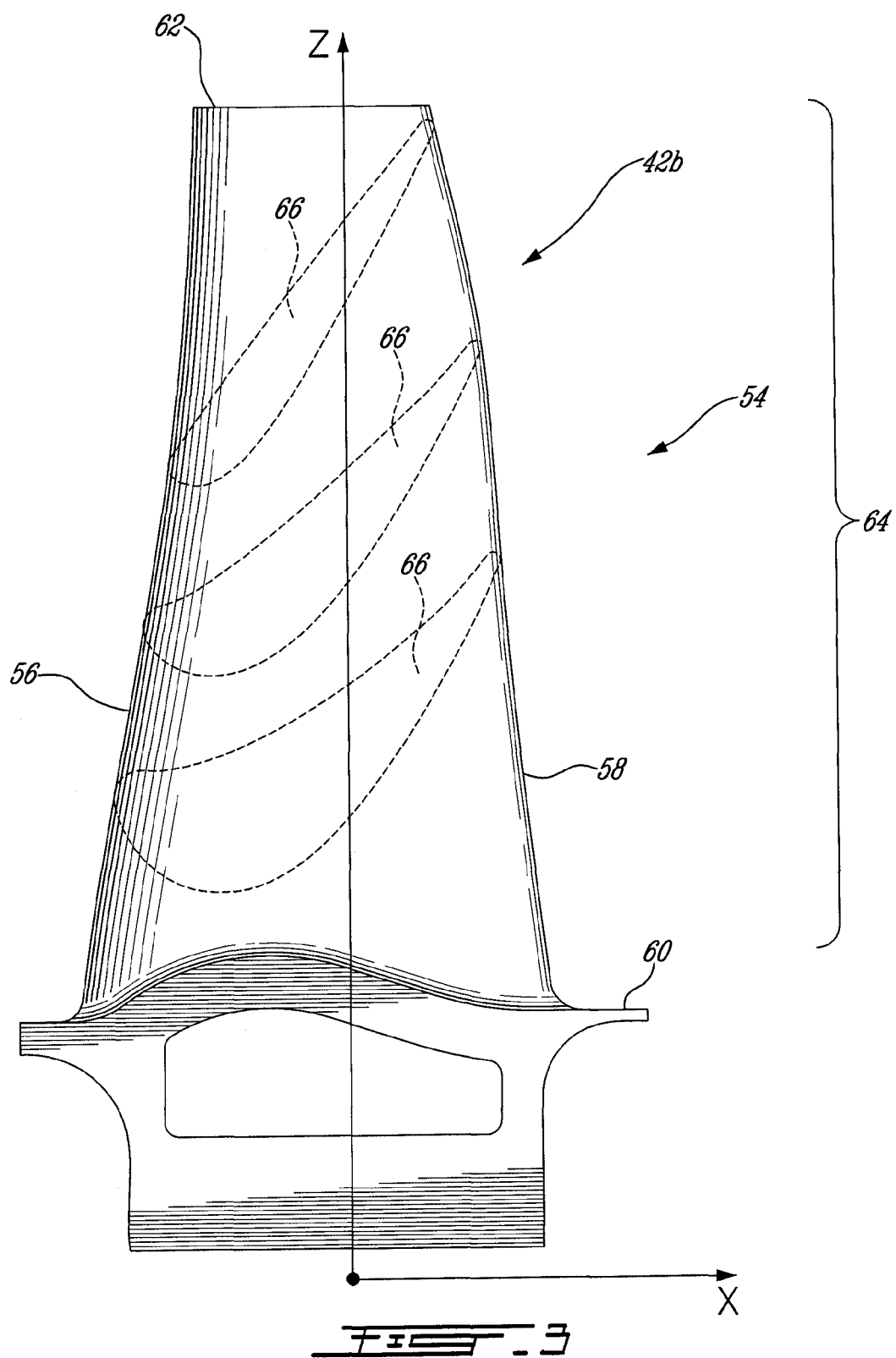
FIG. 3 is a schematic elevation view of a high pressure turbine (HPT) stage blade having a vane profile defined in accordance with an embodiment of the present application.

More specifically, the rotor assemblies 36, 38 each include a plurality of circumferentially distributed blade 42a and 42b respectively which extend radially across the hot gaspath 27. FIG. 3 shows an example of a blade 42b of the second HPT stage. It can be seen that each blade 42b has an airfoil 54 having a leading edge 56 and a trailing edge 58, extending from an inner platform 60 to a tip 62.

The novel airfoil shape of each second stage HPT blade 42b is defined by a set of X-Y-Z points in space. This set of points represents a novel and unique solution to the target design criteria discussed above, and are well-adapted for use in a two-stage high pressure turbine design. This blade design provides the following features: tip vortex control; reduced airfoil count for high lift design; and non-axisymmetric endwall contouring. The set of points are defined in a Cartesian coordinate system which has mutually orthogonal X, Y and Z axes. The X axis extends axially along the turbine rotor centerline 29, i.e., the rotary axis. The positive X direction is axially towards the aft of the turbine engine 10. The Z axis extends along the HPT blade stacking line 50 of each respective blade 42b in a generally radial direction and intersects the X axis. The positive Z direction is radially outwardly toward the tip 62 of the blade. The Y axis extends tangentially with the positive Y direction being in the direction of rotation of the rotor assembly 38. Therefore, the origin of the X, Y and Z axes is defined at the point of intersection of all three orthogonally-related axes: that is the point (0,0,0) at the intersection of the center of rotation of the turbine engine 10 and the stacking line 50.

In a particular embodiment of the second stage HPT blade, the set of points which define the blade airfoil profile relative to the axis of rotation of the turbine engine 10 and stacking line 50 thereof are set out in Table 2 below as X, Y and Z Cartesian coordinate values. Particularly, the blade airfoil profile is defined by profile sections 66 at various locations along its height, the locations represented by Z values. For example, if the blades 42b are mounted about the rotor assembly 38 at an angle with respect to the radial direction, then the Z values are not a true representation of the height of the airfoils of the blades 42b. Furthermore, it is to be appreciated that, with respect to Table 2, Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 66 are defined at selected locations in a Z direction normal to the X, Y plane. The X and Y coordinates are given in distance dimensions, e.g., units of inches, and are joined smoothly, using appropriate curve-fitting techniques, at each Z location to form a smooth continuous airfoil cross-section. The blade airfoil profiles of the various surface locations between the distances Z are determined by smoothly connecting the adjacent profile sections 66 to one another to form the airfoil profile.

The coordinate values listed in Table 2 below represent the desired airfoil profiles in a "cold" non-operating coated condition (and at nominal restagger). However, the manufactured airfoil surface profile will be slightly different, as a result of manufacturing and applied coating tolerances. According to an embodiment of the present invention, the finished HPT blade is coated with a thermal protecting layer.

The Table 2 values are generated and shown to three decimal places for determining the profile of the HPT stage blade airfoil. However, as mentioned above, there are manufacturing tolerance issues to be addressed and, accordingly, the values for the profile given in Table 2 are for a theoretical airfoil. A profile tolerance of ±0.015 inches, measured perpendicularly to the airfoil surface is additive to the nominal values given in Table 2 below. The second stage HPT blade airfoil design functions well within these ranges of variation. The cold or room temperature profile (including coating) is given by the X, Y and Z coordinates for manufacturing purposes. It is understood that the airfoil may deform, within acceptable limits, once entering service.

The coordinate values given in Table 2 below provide the preferred nominal second stage HPT blade airfoil profile.

TABLE 2

| X | Y | Z |
|---|---|---|
| SECTION 1 | | |
| −0.583 | 0.022 | 6.016 |
| −0.584 | 0.027 | 6.016 |
| −0.584 | 0.031 | 6.016 |
| −0.584 | 0.036 | 6.016 |
| −0.584 | 0.040 | 6.016 |
| −0.584 | 0.045 | 6.016 |
| −0.585 | 0.049 | 6.016 |

TABLE 2-continued

| X | Y | Z |
|---|---|---|
| −0.585 | 0.054 | 6.016 |
| −0.585 | 0.058 | 6.016 |
| −0.585 | 0.063 | 6.016 |
| −0.585 | 0.067 | 6.016 |
| −0.584 | 0.090 | 6.016 |
| −0.582 | 0.112 | 6.016 |
| −0.580 | 0.135 | 6.016 |
| −0.576 | 0.157 | 6.016 |
| −0.571 | 0.179 | 6.016 |
| −0.565 | 0.201 | 6.016 |
| −0.558 | 0.222 | 6.016 |
| −0.551 | 0.243 | 6.016 |
| −0.542 | 0.264 | 6.016 |
| −0.532 | 0.284 | 6.016 |
| −0.521 | 0.304 | 6.016 |
| −0.508 | 0.323 | 6.016 |
| −0.495 | 0.341 | 6.016 |
| −0.480 | 0.358 | 6.016 |
| −0.464 | 0.373 | 6.016 |
| −0.447 | 0.388 | 6.016 |
| −0.428 | 0.401 | 6.016 |
| −0.409 | 0.412 | 6.016 |
| −0.389 | 0.422 | 6.016 |
| −0.367 | 0.430 | 6.016 |
| −0.346 | 0.436 | 6.016 |
| −0.324 | 0.440 | 6.016 |
| −0.301 | 0.442 | 6.016 |
| −0.279 | 0.443 | 6.016 |
| −0.256 | 0.441 | 6.016 |
| −0.234 | 0.438 | 6.016 |
| −0.212 | 0.433 | 6.016 |
| −0.190 | 0.426 | 6.016 |
| −0.169 | 0.419 | 6.016 |
| −0.149 | 0.409 | 6.016 |
| −0.129 | 0.399 | 6.016 |
| −0.109 | 0.388 | 6.016 |
| −0.090 | 0.375 | 6.016 |
| −0.072 | 0.362 | 6.016 |
| −0.054 | 0.349 | 6.016 |
| −0.036 | 0.335 | 6.016 |
| −0.019 | 0.320 | 6.016 |
| −0.003 | 0.305 | 6.016 |
| 0.014 | 0.289 | 6.016 |
| 0.030 | 0.274 | 6.016 |
| 0.046 | 0.258 | 6.016 |
| 0.062 | 0.242 | 6.016 |
| 0.077 | 0.225 | 6.016 |
| 0.092 | 0.209 | 6.016 |
| 0.107 | 0.192 | 6.016 |
| 0.122 | 0.174 | 6.016 |
| 0.136 | 0.157 | 6.016 |
| 0.150 | 0.139 | 6.016 |
| 0.164 | 0.121 | 6.016 |
| 0.177 | 0.103 | 6.016 |
| 0.190 | 0.085 | 6.016 |
| 0.203 | 0.066 | 6.016 |
| 0.216 | 0.048 | 6.016 |
| 0.228 | 0.029 | 6.016 |
| 0.240 | 0.010 | 6.016 |
| 0.252 | −0.009 | 6.016 |
| 0.264 | −0.028 | 6.016 |
| 0.275 | −0.048 | 6.016 |
| 0.287 | −0.067 | 6.016 |
| 0.298 | −0.086 | 6.016 |
| 0.309 | −0.106 | 6.016 |
| 0.320 | −0.126 | 6.016 |
| 0.331 | −0.146 | 6.016 |
| 0.342 | −0.166 | 6.016 |
| 0.352 | −0.186 | 6.016 |
| 0.362 | −0.205 | 6.016 |
| 0.373 | −0.226 | 6.016 |
| 0.383 | −0.246 | 6.016 |
| 0.393 | −0.266 | 6.016 |
| 0.403 | −0.286 | 6.016 |
| 0.413 | −0.306 | 6.016 |
| 0.423 | −0.326 | 6.016 |
| 0.433 | −0.347 | 6.016 |
| 0.442 | −0.367 | 6.016 |
| 0.452 | −0.388 | 6.016 |
| 0.461 | −0.408 | 6.016 |
| 0.469 | −0.429 | 6.016 |
| 0.478 | −0.450 | 6.016 |
| 0.486 | −0.471 | 6.016 |
| 0.488 | −0.475 | 6.016 |
| 0.490 | −0.479 | 6.016 |
| 0.491 | −0.483 | 6.016 |
| 0.493 | −0.487 | 6.016 |
| 0.495 | −0.492 | 6.016 |
| 0.497 | −0.496 | 6.016 |
| 0.499 | −0.500 | 6.016 |
| 0.500 | −0.504 | 6.016 |
| 0.501 | −0.508 | 6.016 |
| 0.503 | −0.513 | 6.016 |
| 0.504 | −0.516 | 6.016 |
| 0.505 | −0.519 | 6.016 |
| 0.505 | −0.522 | 6.016 |
| 0.505 | −0.525 | 6.016 |
| 0.504 | −0.528 | 6.016 |
| 0.503 | −0.531 | 6.016 |
| 0.501 | −0.534 | 6.016 |
| 0.499 | −0.536 | 6.016 |
| 0.496 | −0.538 | 6.016 |
| 0.493 | −0.540 | 6.016 |
| 0.490 | −0.541 | 6.016 |
| 0.487 | −0.541 | 6.016 |
| 0.484 | −0.541 | 6.016 |
| 0.480 | −0.541 | 6.016 |
| 0.477 | −0.541 | 6.016 |
| 0.474 | −0.540 | 6.016 |
| 0.472 | −0.538 | 6.016 |
| 0.469 | −0.535 | 6.016 |
| 0.468 | −0.533 | 6.016 |
| 0.466 | −0.530 | 6.016 |
| 0.465 | −0.528 | 6.016 |
| 0.463 | −0.526 | 6.016 |
| 0.462 | −0.524 | 6.016 |
| 0.460 | −0.521 | 6.016 |
| 0.459 | −0.519 | 6.016 |
| 0.457 | −0.517 | 6.016 |
| 0.456 | −0.515 | 6.016 |
| 0.454 | −0.512 | 6.016 |
| 0.452 | −0.510 | 6.016 |
| 0.445 | −0.499 | 6.016 |
| 0.436 | −0.488 | 6.016 |
| 0.428 | −0.477 | 6.016 |
| 0.419 | −0.467 | 6.016 |
| 0.411 | −0.456 | 6.016 |
| 0.402 | −0.446 | 6.016 |
| 0.393 | −0.436 | 6.016 |
| 0.383 | −0.426 | 6.016 |
| 0.374 | −0.416 | 6.016 |
| 0.364 | −0.406 | 6.016 |
| 0.355 | −0.396 | 6.016 |
| 0.345 | −0.387 | 6.016 |
| 0.335 | −0.378 | 6.016 |
| 0.324 | −0.369 | 6.016 |
| 0.314 | −0.360 | 6.016 |
| 0.303 | −0.352 | 6.016 |
| 0.293 | −0.343 | 6.016 |
| 0.282 | −0.335 | 6.016 |
| 0.271 | −0.326 | 6.016 |
| 0.260 | −0.318 | 6.016 |
| 0.249 | −0.310 | 6.016 |
| 0.239 | −0.301 | 6.016 |
| 0.228 | −0.293 | 6.016 |
| 0.217 | −0.285 | 6.016 |
| 0.206 | −0.277 | 6.016 |
| 0.195 | −0.269 | 6.016 |
| 0.183 | −0.261 | 6.016 |
| 0.172 | −0.254 | 6.016 |
| 0.161 | −0.246 | 6.016 |
| 0.149 | −0.239 | 6.016 |
| 0.138 | −0.231 | 6.016 |
| 0.126 | −0.224 | 6.016 |
| 0.115 | −0.217 | 6.016 |
| 0.103 | −0.210 | 6.016 |

| X | Y | Z |
|---|---|---|
| 0.091 | −0.203 | 6.016 |
| 0.079 | −0.196 | 6.016 |
| 0.068 | −0.189 | 6.016 |
| 0.056 | −0.183 | 6.016 |
| 0.044 | −0.176 | 6.016 |
| 0.032 | −0.170 | 6.016 |
| 0.019 | −0.163 | 6.016 |
| 0.007 | −0.157 | 6.016 |
| −0.005 | −0.151 | 6.016 |
| −0.017 | −0.145 | 6.016 |
| −0.029 | −0.139 | 6.016 |
| −0.042 | −0.133 | 6.016 |
| −0.054 | −0.127 | 6.016 |
| −0.067 | −0.122 | 6.016 |
| −0.079 | −0.117 | 6.016 |
| −0.092 | −0.111 | 6.016 |
| −0.104 | −0.106 | 6.016 |
| −0.117 | −0.101 | 6.016 |
| −0.130 | −0.096 | 6.016 |
| −0.142 | −0.091 | 6.016 |
| −0.155 | −0.086 | 6.016 |
| −0.168 | −0.082 | 6.016 |
| −0.181 | −0.077 | 6.016 |
| −0.194 | −0.073 | 6.016 |
| −0.207 | −0.069 | 6.016 |
| −0.220 | −0.065 | 6.016 |
| −0.233 | −0.061 | 6.016 |
| −0.246 | −0.058 | 6.016 |
| −0.260 | −0.054 | 6.016 |
| −0.273 | −0.051 | 6.016 |
| −0.286 | −0.048 | 6.016 |
| −0.300 | −0.046 | 6.016 |
| −0.313 | −0.043 | 6.016 |
| −0.326 | −0.040 | 6.016 |
| −0.340 | −0.038 | 6.016 |
| −0.353 | −0.036 | 6.016 |
| −0.367 | −0.034 | 6.016 |
| −0.380 | −0.032 | 6.016 |
| −0.394 | −0.031 | 6.016 |
| −0.408 | −0.030 | 6.016 |
| −0.421 | −0.030 | 6.016 |
| −0.435 | −0.031 | 6.016 |
| −0.448 | −0.031 | 6.016 |
| −0.462 | −0.033 | 6.016 |
| −0.476 | −0.034 | 6.016 |
| −0.478 | −0.034 | 6.016 |
| −0.481 | −0.034 | 6.016 |
| −0.484 | −0.034 | 6.016 |
| −0.487 | −0.035 | 6.016 |
| −0.489 | −0.035 | 6.016 |
| −0.492 | −0.035 | 6.016 |
| −0.495 | −0.035 | 6.016 |
| −0.497 | −0.035 | 6.016 |
| −0.500 | −0.036 | 6.016 |
| −0.503 | −0.036 | 6.016 |
| −0.509 | −0.036 | 6.016 |
| −0.515 | −0.037 | 6.016 |
| −0.521 | −0.037 | 6.016 |
| −0.527 | −0.037 | 6.016 |
| −0.533 | −0.036 | 6.016 |
| −0.539 | −0.035 | 6.016 |
| −0.545 | −0.034 | 6.016 |
| −0.551 | −0.032 | 6.016 |
| −0.556 | −0.029 | 6.016 |
| −0.561 | −0.026 | 6.016 |
| −0.566 | −0.022 | 6.016 |
| −0.570 | −0.017 | 6.016 |
| −0.573 | −0.012 | 6.016 |
| −0.576 | −0.007 | 6.016 |
| −0.579 | −0.001 | 6.016 |
| −0.580 | 0.004 | 6.016 |
| −0.582 | 0.010 | 6.016 |
| −0.583 | 0.016 | 6.016 |
| SECTION 2 | | |
| −0.563 | 0.050 | 6.160 |
| −0.563 | 0.054 | 6.160 |
| −0.563 | 0.059 | 6.160 |
| −0.563 | 0.063 | 6.160 |
| −0.563 | 0.067 | 6.160 |
| −0.562 | 0.071 | 6.160 |
| −0.562 | 0.076 | 6.160 |
| −0.562 | 0.080 | 6.160 |
| −0.562 | 0.084 | 6.160 |
| −0.561 | 0.088 | 6.160 |
| −0.561 | 0.093 | 6.160 |
| −0.558 | 0.114 | 6.160 |
| −0.554 | 0.135 | 6.160 |
| −0.549 | 0.156 | 6.160 |
| −0.543 | 0.176 | 6.160 |
| −0.537 | 0.196 | 6.160 |
| −0.529 | 0.216 | 6.160 |
| −0.520 | 0.236 | 6.160 |
| −0.510 | 0.255 | 6.160 |
| −0.499 | 0.273 | 6.160 |
| −0.487 | 0.290 | 6.160 |
| −0.474 | 0.307 | 6.160 |
| −0.460 | 0.323 | 6.160 |
| −0.445 | 0.338 | 6.160 |
| −0.428 | 0.352 | 6.160 |
| −0.411 | 0.365 | 6.160 |
| −0.393 | 0.376 | 6.160 |
| −0.374 | 0.386 | 6.160 |
| −0.354 | 0.394 | 6.160 |
| −0.334 | 0.400 | 6.160 |
| −0.313 | 0.405 | 6.160 |
| −0.292 | 0.408 | 6.160 |
| −0.271 | 0.410 | 6.160 |
| −0.249 | 0.409 | 6.160 |
| −0.228 | 0.407 | 6.160 |
| −0.207 | 0.404 | 6.160 |
| −0.186 | 0.399 | 6.160 |
| −0.166 | 0.392 | 6.160 |
| −0.146 | 0.384 | 6.160 |
| −0.127 | 0.375 | 6.160 |
| −0.108 | 0.365 | 6.160 |
| −0.089 | 0.354 | 6.160 |
| −0.072 | 0.343 | 6.160 |
| −0.054 | 0.330 | 6.160 |
| −0.037 | 0.317 | 6.160 |
| −0.021 | 0.304 | 6.160 |
| −0.005 | 0.290 | 6.160 |
| 0.011 | 0.276 | 6.160 |
| 0.027 | 0.261 | 6.160 |
| 0.042 | 0.246 | 6.160 |
| 0.057 | 0.231 | 6.160 |
| 0.072 | 0.215 | 6.160 |
| 0.086 | 0.200 | 6.160 |
| 0.100 | 0.184 | 6.160 |
| 0.114 | 0.168 | 6.160 |
| 0.128 | 0.151 | 6.160 |
| 0.142 | 0.135 | 6.160 |
| 0.155 | 0.118 | 6.160 |
| 0.168 | 0.101 | 6.160 |
| 0.181 | 0.084 | 6.160 |
| 0.193 | 0.067 | 6.160 |
| 0.205 | 0.049 | 6.160 |
| 0.217 | 0.031 | 6.160 |
| 0.229 | 0.014 | 6.160 |
| 0.241 | −0.004 | 6.160 |
| 0.252 | −0.022 | 6.160 |
| 0.264 | −0.040 | 6.160 |
| 0.275 | −0.058 | 6.160 |
| 0.286 | −0.077 | 6.160 |
| 0.297 | −0.095 | 6.160 |
| 0.307 | −0.114 | 6.160 |
| 0.318 | −0.132 | 6.160 |
| 0.328 | −0.151 | 6.160 |
| 0.339 | −0.169 | 6.160 |
| 0.349 | −0.188 | 6.160 |
| 0.359 | −0.207 | 6.160 |
| 0.369 | −0.226 | 6.160 |
| 0.379 | −0.245 | 6.160 |
| 0.389 | −0.264 | 6.160 |
| 0.399 | −0.283 | 6.160 |
| 0.408 | −0.302 | 6.160 |

TABLE 2-continued

| X | Y | Z |
|---|---|---|
| 0.418 | −0.321 | 6.160 |
| 0.427 | −0.340 | 6.160 |
| 0.437 | −0.359 | 6.160 |
| 0.446 | −0.378 | 6.160 |
| 0.455 | −0.398 | 6.160 |
| 0.463 | −0.417 | 6.160 |
| 0.471 | −0.437 | 6.160 |
| 0.479 | −0.457 | 6.160 |
| 0.488 | −0.476 | 6.160 |
| 0.489 | −0.480 | 6.160 |
| 0.491 | −0.484 | 6.160 |
| 0.493 | −0.488 | 6.160 |
| 0.495 | −0.492 | 6.160 |
| 0.496 | −0.496 | 6.160 |
| 0.498 | −0.500 | 6.160 |
| 0.500 | −0.504 | 6.160 |
| 0.501 | −0.508 | 6.160 |
| 0.502 | −0.512 | 6.160 |
| 0.504 | −0.516 | 6.160 |
| 0.505 | −0.519 | 6.160 |
| 0.506 | −0.522 | 6.160 |
| 0.506 | −0.525 | 6.160 |
| 0.506 | −0.528 | 6.160 |
| 0.505 | −0.531 | 6.160 |
| 0.503 | −0.534 | 6.160 |
| 0.502 | −0.537 | 6.160 |
| 0.500 | −0.539 | 6.160 |
| 0.497 | −0.541 | 6.160 |
| 0.494 | −0.542 | 6.160 |
| 0.491 | −0.543 | 6.160 |
| 0.488 | −0.544 | 6.160 |
| 0.485 | −0.544 | 6.160 |
| 0.482 | −0.544 | 6.160 |
| 0.479 | −0.543 | 6.160 |
| 0.476 | −0.542 | 6.160 |
| 0.473 | −0.541 | 6.160 |
| 0.471 | −0.539 | 6.160 |
| 0.469 | −0.536 | 6.160 |
| 0.468 | −0.534 | 6.160 |
| 0.466 | −0.532 | 6.160 |
| 0.465 | −0.529 | 6.160 |
| 0.463 | −0.527 | 6.160 |
| 0.462 | −0.525 | 6.160 |
| 0.460 | −0.523 | 6.160 |
| 0.459 | −0.520 | 6.160 |
| 0.457 | −0.518 | 6.160 |
| 0.456 | −0.516 | 6.160 |
| 0.454 | −0.514 | 6.160 |
| 0.446 | −0.503 | 6.160 |
| 0.438 | −0.492 | 6.160 |
| 0.430 | −0.481 | 6.160 |
| 0.421 | −0.471 | 6.160 |
| 0.412 | −0.461 | 6.160 |
| 0.403 | −0.450 | 6.160 |
| 0.394 | −0.440 | 6.160 |
| 0.385 | −0.431 | 6.160 |
| 0.376 | −0.421 | 6.160 |
| 0.366 | −0.411 | 6.160 |
| 0.357 | −0.402 | 6.160 |
| 0.347 | −0.392 | 6.160 |
| 0.337 | −0.383 | 6.160 |
| 0.327 | −0.374 | 6.160 |
| 0.317 | −0.366 | 6.160 |
| 0.306 | −0.357 | 6.160 |
| 0.296 | −0.348 | 6.160 |
| 0.285 | −0.340 | 6.160 |
| 0.275 | −0.332 | 6.160 |
| 0.264 | −0.323 | 6.160 |
| 0.254 | −0.315 | 6.160 |
| 0.243 | −0.306 | 6.160 |
| 0.232 | −0.298 | 6.160 |
| 0.222 | −0.290 | 6.160 |
| 0.211 | −0.282 | 6.160 |
| 0.200 | −0.274 | 6.160 |
| 0.189 | −0.266 | 6.160 |
| 0.178 | −0.258 | 6.160 |
| 0.167 | −0.250 | 6.160 |
| 0.156 | −0.243 | 6.160 |
| 0.145 | −0.235 | 6.160 |
| 0.133 | −0.228 | 6.160 |
| 0.122 | −0.220 | 6.160 |
| 0.111 | −0.213 | 6.160 |
| 0.099 | −0.206 | 6.160 |
| 0.088 | −0.199 | 6.160 |
| 0.076 | −0.192 | 6.160 |
| 0.065 | −0.185 | 6.160 |
| 0.053 | −0.178 | 6.160 |
| 0.041 | −0.171 | 6.160 |
| 0.029 | −0.165 | 6.160 |
| 0.018 | −0.158 | 6.160 |
| 0.006 | −0.152 | 6.160 |
| −0.006 | −0.145 | 6.160 |
| −0.018 | −0.139 | 6.160 |
| −0.030 | −0.133 | 6.160 |
| −0.042 | −0.127 | 6.160 |
| −0.054 | −0.121 | 6.160 |
| −0.067 | −0.115 | 6.160 |
| −0.079 | −0.109 | 6.160 |
| −0.091 | −0.104 | 6.160 |
| −0.103 | −0.098 | 6.160 |
| −0.116 | −0.093 | 6.160 |
| −0.128 | −0.088 | 6.160 |
| −0.141 | −0.083 | 6.160 |
| −0.153 | −0.078 | 6.160 |
| −0.166 | −0.073 | 6.160 |
| −0.179 | −0.068 | 6.160 |
| −0.191 | −0.063 | 6.160 |
| −0.204 | −0.059 | 6.160 |
| −0.217 | −0.055 | 6.160 |
| −0.230 | −0.051 | 6.160 |
| −0.243 | −0.047 | 6.160 |
| −0.256 | −0.043 | 6.160 |
| −0.269 | −0.039 | 6.160 |
| −0.282 | −0.036 | 6.160 |
| −0.295 | −0.033 | 6.160 |
| −0.308 | −0.030 | 6.160 |
| −0.321 | −0.027 | 6.160 |
| −0.335 | −0.025 | 6.160 |
| −0.348 | −0.022 | 6.160 |
| −0.361 | −0.020 | 6.160 |
| −0.375 | −0.019 | 6.160 |
| −0.388 | −0.018 | 6.160 |
| −0.402 | −0.017 | 6.160 |
| −0.415 | −0.016 | 6.160 |
| −0.429 | −0.016 | 6.160 |
| −0.442 | −0.016 | 6.160 |
| −0.456 | −0.017 | 6.160 |
| −0.458 | −0.017 | 6.160 |
| −0.461 | −0.017 | 6.160 |
| −0.464 | −0.017 | 6.160 |
| −0.466 | −0.018 | 6.160 |
| −0.469 | −0.018 | 6.160 |
| −0.472 | −0.018 | 6.160 |
| −0.474 | −0.018 | 6.160 |
| −0.477 | −0.018 | 6.160 |
| −0.480 | −0.019 | 6.160 |
| −0.482 | −0.019 | 6.160 |
| −0.489 | −0.020 | 6.160 |
| −0.496 | −0.020 | 6.160 |
| −0.502 | −0.020 | 6.160 |
| −0.509 | −0.020 | 6.160 |
| −0.515 | −0.019 | 6.160 |
| −0.522 | −0.018 | 6.160 |
| −0.528 | −0.015 | 6.160 |
| −0.534 | −0.012 | 6.160 |
| −0.539 | −0.009 | 6.160 |
| −0.544 | −0.004 | 6.160 |
| −0.549 | 0.000 | 6.160 |
| −0.553 | 0.006 | 6.160 |
| −0.556 | 0.012 | 6.160 |
| −0.558 | 0.018 | 6.160 |
| −0.560 | 0.024 | 6.160 |
| −0.562 | 0.030 | 6.160 |
| −0.563 | 0.037 | 6.160 |
| −0.563 | 0.044 | 6.160 |

TABLE 2-continued

| X | Y | Z |
|---|---|---|
| SECTION 3 | | |
| −0.537 | 0.088 | 6.352 |
| −0.536 | 0.092 | 6.352 |
| −0.536 | 0.096 | 6.352 |
| −0.535 | 0.100 | 6.352 |
| −0.534 | 0.104 | 6.352 |
| −0.533 | 0.108 | 6.352 |
| −0.533 | 0.111 | 6.352 |
| −0.532 | 0.115 | 6.352 |
| −0.531 | 0.119 | 6.352 |
| −0.530 | 0.123 | 6.352 |
| −0.529 | 0.127 | 6.352 |
| −0.523 | 0.146 | 6.352 |
| −0.517 | 0.165 | 6.352 |
| −0.509 | 0.184 | 6.352 |
| −0.501 | 0.202 | 6.352 |
| −0.492 | 0.219 | 6.352 |
| −0.481 | 0.236 | 6.352 |
| −0.470 | 0.253 | 6.352 |
| −0.458 | 0.269 | 6.352 |
| −0.444 | 0.283 | 6.352 |
| −0.430 | 0.298 | 6.352 |
| −0.415 | 0.311 | 6.352 |
| −0.399 | 0.323 | 6.352 |
| −0.382 | 0.333 | 6.352 |
| −0.365 | 0.343 | 6.352 |
| −0.347 | 0.351 | 6.352 |
| −0.328 | 0.358 | 6.352 |
| −0.309 | 0.363 | 6.352 |
| −0.289 | 0.367 | 6.352 |
| −0.269 | 0.370 | 6.352 |
| −0.249 | 0.371 | 6.352 |
| −0.229 | 0.370 | 6.352 |
| −0.209 | 0.369 | 6.352 |
| −0.190 | 0.366 | 6.352 |
| −0.170 | 0.361 | 6.352 |
| −0.151 | 0.356 | 6.352 |
| −0.132 | 0.349 | 6.352 |
| −0.114 | 0.341 | 6.352 |
| −0.096 | 0.332 | 6.352 |
| −0.079 | 0.323 | 6.352 |
| −0.062 | 0.312 | 6.352 |
| −0.045 | 0.301 | 6.352 |
| −0.029 | 0.289 | 6.352 |
| −0.013 | 0.277 | 6.352 |
| 0.002 | 0.264 | 6.352 |
| 0.017 | 0.251 | 6.352 |
| 0.032 | 0.237 | 6.352 |
| 0.046 | 0.223 | 6.352 |
| 0.060 | 0.209 | 6.352 |
| 0.074 | 0.195 | 6.352 |
| 0.087 | 0.180 | 6.352 |
| 0.101 | 0.165 | 6.352 |
| 0.114 | 0.150 | 6.352 |
| 0.127 | 0.135 | 6.352 |
| 0.139 | 0.119 | 6.352 |
| 0.152 | 0.103 | 6.352 |
| 0.164 | 0.088 | 6.352 |
| 0.176 | 0.072 | 6.352 |
| 0.188 | 0.056 | 6.352 |
| 0.199 | 0.039 | 6.352 |
| 0.211 | 0.023 | 6.352 |
| 0.222 | 0.007 | 6.352 |
| 0.233 | −0.010 | 6.352 |
| 0.244 | −0.027 | 6.352 |
| 0.255 | −0.043 | 6.352 |
| 0.266 | −0.060 | 6.352 |
| 0.277 | −0.077 | 6.352 |
| 0.287 | −0.094 | 6.352 |
| 0.298 | −0.111 | 6.352 |
| 0.308 | −0.128 | 6.352 |
| 0.318 | −0.145 | 6.352 |
| 0.328 | −0.163 | 6.352 |
| 0.338 | −0.180 | 6.352 |
| 0.348 | −0.197 | 6.352 |
| 0.358 | −0.215 | 6.352 |
| 0.367 | −0.232 | 6.352 |
| 0.377 | −0.250 | 6.352 |
| 0.386 | −0.267 | 6.352 |
| 0.396 | −0.285 | 6.352 |
| 0.405 | −0.302 | 6.352 |
| 0.414 | −0.320 | 6.352 |
| 0.423 | −0.338 | 6.352 |
| 0.433 | −0.356 | 6.352 |
| 0.441 | −0.374 | 6.352 |
| 0.450 | −0.392 | 6.352 |
| 0.458 | −0.410 | 6.352 |
| 0.466 | −0.428 | 6.352 |
| 0.474 | −0.447 | 6.352 |
| 0.482 | −0.465 | 6.352 |
| 0.490 | −0.483 | 6.352 |
| 0.491 | −0.487 | 6.352 |
| 0.493 | −0.491 | 6.352 |
| 0.494 | −0.494 | 6.352 |
| 0.496 | −0.498 | 6.352 |
| 0.498 | −0.501 | 6.352 |
| 0.499 | −0.505 | 6.352 |
| 0.501 | −0.509 | 6.352 |
| 0.502 | −0.513 | 6.352 |
| 0.503 | −0.516 | 6.352 |
| 0.505 | −0.520 | 6.352 |
| 0.506 | −0.523 | 6.352 |
| 0.507 | −0.526 | 6.352 |
| 0.507 | −0.529 | 6.352 |
| 0.507 | −0.532 | 6.352 |
| 0.506 | −0.535 | 6.352 |
| 0.505 | −0.538 | 6.352 |
| 0.503 | −0.540 | 6.352 |
| 0.501 | −0.542 | 6.352 |
| 0.498 | −0.544 | 6.352 |
| 0.496 | −0.546 | 6.352 |
| 0.493 | −0.547 | 6.352 |
| 0.490 | −0.548 | 6.352 |
| 0.487 | −0.548 | 6.352 |
| 0.484 | −0.548 | 6.352 |
| 0.481 | −0.547 | 6.352 |
| 0.478 | −0.546 | 6.352 |
| 0.475 | −0.545 | 6.352 |
| 0.473 | −0.543 | 6.352 |
| 0.471 | −0.541 | 6.352 |
| 0.469 | −0.538 | 6.352 |
| 0.468 | −0.536 | 6.352 |
| 0.466 | −0.534 | 6.352 |
| 0.465 | −0.532 | 6.352 |
| 0.463 | −0.530 | 6.352 |
| 0.461 | −0.528 | 6.352 |
| 0.460 | −0.525 | 6.352 |
| 0.458 | −0.523 | 6.352 |
| 0.457 | −0.521 | 6.352 |
| 0.455 | −0.519 | 6.352 |
| 0.447 | −0.508 | 6.352 |
| 0.439 | −0.498 | 6.352 |
| 0.430 | −0.488 | 6.352 |
| 0.422 | −0.477 | 6.352 |
| 0.413 | −0.467 | 6.352 |
| 0.404 | −0.457 | 6.352 |
| 0.395 | −0.447 | 6.352 |
| 0.386 | −0.437 | 6.352 |
| 0.377 | −0.427 | 6.352 |
| 0.368 | −0.418 | 6.352 |
| 0.359 | −0.408 | 6.352 |
| 0.350 | −0.399 | 6.352 |
| 0.340 | −0.389 | 6.352 |
| 0.330 | −0.380 | 6.352 |
| 0.320 | −0.372 | 6.352 |
| 0.310 | −0.363 | 6.352 |
| 0.300 | −0.354 | 6.352 |
| 0.289 | −0.346 | 6.352 |
| 0.279 | −0.337 | 6.352 |
| 0.269 | −0.329 | 6.352 |
| 0.258 | −0.321 | 6.352 |
| 0.248 | −0.312 | 6.352 |
| 0.238 | −0.304 | 6.352 |
| 0.227 | −0.295 | 6.352 |
| 0.217 | −0.287 | 6.352 |

TABLE 2-continued

| X | Y | Z |
|---|---|---|
| 0.206 | −0.279 | 6.352 |
| 0.196 | −0.270 | 6.352 |
| 0.185 | −0.262 | 6.352 |
| 0.174 | −0.254 | 6.352 |
| 0.164 | −0.247 | 6.352 |
| 0.153 | −0.239 | 6.352 |
| 0.142 | −0.231 | 6.352 |
| 0.131 | −0.223 | 6.352 |
| 0.120 | −0.216 | 6.352 |
| 0.109 | −0.208 | 6.352 |
| 0.098 | −0.201 | 6.352 |
| 0.087 | −0.193 | 6.352 |
| 0.076 | −0.186 | 6.352 |
| 0.064 | −0.179 | 6.352 |
| 0.053 | −0.172 | 6.352 |
| 0.042 | −0.165 | 6.352 |
| 0.030 | −0.158 | 6.352 |
| 0.019 | −0.151 | 6.352 |
| 0.007 | −0.144 | 6.352 |
| −0.004 | −0.137 | 6.352 |
| −0.016 | −0.131 | 6.352 |
| −0.027 | −0.124 | 6.352 |
| −0.039 | −0.118 | 6.352 |
| −0.051 | −0.111 | 6.352 |
| −0.063 | −0.105 | 6.352 |
| −0.074 | −0.099 | 6.352 |
| −0.086 | −0.093 | 6.352 |
| −0.098 | −0.087 | 6.352 |
| −0.110 | −0.081 | 6.352 |
| −0.122 | −0.076 | 6.352 |
| −0.135 | −0.070 | 6.352 |
| −0.147 | −0.065 | 6.352 |
| −0.159 | −0.059 | 6.352 |
| −0.171 | −0.054 | 6.352 |
| −0.184 | −0.049 | 6.352 |
| −0.196 | −0.044 | 6.352 |
| −0.209 | −0.039 | 6.352 |
| −0.221 | −0.035 | 6.352 |
| −0.234 | −0.030 | 6.352 |
| −0.246 | −0.026 | 6.352 |
| −0.259 | −0.022 | 6.352 |
| −0.272 | −0.018 | 6.352 |
| −0.285 | −0.015 | 6.352 |
| −0.298 | −0.011 | 6.352 |
| −0.311 | −0.008 | 6.352 |
| −0.324 | −0.005 | 6.352 |
| −0.337 | −0.002 | 6.352 |
| −0.350 | 0.000 | 6.352 |
| −0.363 | 0.002 | 6.352 |
| −0.376 | 0.004 | 6.352 |
| −0.390 | 0.005 | 6.352 |
| −0.403 | 0.006 | 6.352 |
| −0.416 | 0.006 | 6.352 |
| −0.430 | 0.006 | 6.352 |
| −0.432 | 0.006 | 6.352 |
| −0.435 | 0.006 | 6.352 |
| −0.438 | 0.006 | 6.352 |
| −0.440 | 0.006 | 6.352 |
| −0.443 | 0.005 | 6.352 |
| −0.446 | 0.005 | 6.352 |
| −0.448 | 0.005 | 6.352 |
| −0.451 | 0.005 | 6.352 |
| −0.454 | 0.005 | 6.352 |
| −0.456 | 0.004 | 6.352 |
| −0.463 | 0.004 | 6.352 |
| −0.471 | 0.004 | 6.352 |
| −0.478 | 0.005 | 6.352 |
| −0.485 | 0.006 | 6.352 |
| −0.492 | 0.008 | 6.352 |
| −0.498 | 0.010 | 6.352 |
| −0.505 | 0.014 | 6.352 |
| −0.511 | 0.018 | 6.352 |
| −0.516 | 0.022 | 6.352 |
| −0.521 | 0.027 | 6.352 |
| −0.526 | 0.033 | 6.352 |
| −0.529 | 0.039 | 6.352 |
| −0.532 | 0.046 | 6.352 |
| −0.535 | 0.052 | 6.352 |
| −0.537 | 0.059 | 6.352 |
| −0.538 | 0.066 | 6.352 |
| −0.538 | 0.074 | 6.352 |
| −0.538 | 0.081 | 6.352 |

TABLE 2-continued

| X | Y | Z |
|---|---|---|
| SECTION 4 | | |
| −0.519 | 0.115 | 6.487 |
| −0.518 | 0.119 | 6.487 |
| −0.517 | 0.123 | 6.487 |
| −0.516 | 0.126 | 6.487 |
| −0.515 | 0.130 | 6.487 |
| −0.514 | 0.134 | 6.487 |
| −0.513 | 0.137 | 6.487 |
| −0.512 | 0.141 | 6.487 |
| −0.510 | 0.145 | 6.487 |
| −0.509 | 0.148 | 6.487 |
| −0.508 | 0.152 | 6.487 |
| −0.501 | 0.170 | 6.487 |
| −0.493 | 0.187 | 6.487 |
| −0.484 | 0.204 | 6.487 |
| −0.474 | 0.220 | 6.487 |
| −0.463 | 0.236 | 6.487 |
| −0.451 | 0.251 | 6.487 |
| −0.438 | 0.265 | 6.487 |
| −0.424 | 0.278 | 6.487 |
| −0.409 | 0.290 | 6.487 |
| −0.394 | 0.302 | 6.487 |
| −0.378 | 0.312 | 6.487 |
| −0.361 | 0.321 | 6.487 |
| −0.343 | 0.329 | 6.487 |
| −0.325 | 0.335 | 6.487 |
| −0.307 | 0.341 | 6.487 |
| −0.288 | 0.345 | 6.487 |
| −0.269 | 0.348 | 6.487 |
| −0.250 | 0.349 | 6.487 |
| −0.231 | 0.349 | 6.487 |
| −0.212 | 0.348 | 6.487 |
| −0.193 | 0.346 | 6.487 |
| −0.174 | 0.342 | 6.487 |
| −0.156 | 0.338 | 6.487 |
| −0.137 | 0.332 | 6.487 |
| −0.119 | 0.326 | 6.487 |
| −0.102 | 0.318 | 6.487 |
| −0.085 | 0.310 | 6.487 |
| −0.068 | 0.300 | 6.487 |
| −0.052 | 0.290 | 6.487 |
| −0.036 | 0.280 | 6.487 |
| −0.020 | 0.268 | 6.487 |
| −0.005 | 0.257 | 6.487 |
| 0.010 | 0.244 | 6.487 |
| 0.024 | 0.232 | 6.487 |
| 0.038 | 0.219 | 6.487 |
| 0.052 | 0.205 | 6.487 |
| 0.065 | 0.192 | 6.487 |
| 0.078 | 0.178 | 6.487 |
| 0.091 | 0.164 | 6.487 |
| 0.104 | 0.149 | 6.487 |
| 0.116 | 0.135 | 6.487 |
| 0.128 | 0.120 | 6.487 |
| 0.140 | 0.105 | 6.487 |
| 0.152 | 0.090 | 6.487 |
| 0.164 | 0.075 | 6.487 |
| 0.175 | 0.060 | 6.487 |
| 0.187 | 0.044 | 6.487 |
| 0.198 | 0.029 | 6.487 |
| 0.209 | 0.013 | 6.487 |
| 0.220 | −0.003 | 6.487 |
| 0.230 | −0.019 | 6.487 |
| 0.241 | −0.034 | 6.487 |
| 0.252 | −0.050 | 6.487 |
| 0.262 | −0.066 | 6.487 |
| 0.272 | −0.083 | 6.487 |
| 0.283 | −0.099 | 6.487 |
| 0.293 | −0.115 | 6.487 |
| 0.303 | −0.131 | 6.487 |
| 0.313 | −0.148 | 6.487 |
| 0.323 | −0.164 | 6.487 |
| 0.332 | −0.180 | 6.487 |

TABLE 2-continued

| X | Y | Z |
|---|---|---|
| 0.342 | −0.197 | 6.487 |
| 0.352 | −0.214 | 6.487 |
| 0.361 | −0.230 | 6.487 |
| 0.370 | −0.247 | 6.487 |
| 0.380 | −0.264 | 6.487 |
| 0.389 | −0.280 | 6.487 |
| 0.398 | −0.297 | 6.487 |
| 0.407 | −0.314 | 6.487 |
| 0.416 | −0.331 | 6.487 |
| 0.425 | −0.348 | 6.487 |
| 0.434 | −0.365 | 6.487 |
| 0.442 | −0.382 | 6.487 |
| 0.450 | −0.399 | 6.487 |
| 0.458 | −0.417 | 6.487 |
| 0.466 | −0.434 | 6.487 |
| 0.474 | −0.452 | 6.487 |
| 0.481 | −0.469 | 6.487 |
| 0.489 | −0.487 | 6.487 |
| 0.490 | −0.490 | 6.487 |
| 0.492 | −0.494 | 6.487 |
| 0.493 | −0.497 | 6.487 |
| 0.495 | −0.501 | 6.487 |
| 0.497 | −0.504 | 6.487 |
| 0.498 | −0.508 | 6.487 |
| 0.500 | −0.511 | 6.487 |
| 0.501 | −0.515 | 6.487 |
| 0.502 | −0.519 | 6.487 |
| 0.503 | −0.522 | 6.487 |
| 0.505 | −0.525 | 6.487 |
| 0.505 | −0.528 | 6.487 |
| 0.506 | −0.531 | 6.487 |
| 0.505 | −0.534 | 6.487 |
| 0.505 | −0.537 | 6.487 |
| 0.503 | −0.540 | 6.487 |
| 0.502 | −0.542 | 6.487 |
| 0.500 | −0.544 | 6.487 |
| 0.497 | −0.546 | 6.487 |
| 0.495 | −0.548 | 6.487 |
| 0.492 | −0.549 | 6.487 |
| 0.489 | −0.550 | 6.487 |
| 0.486 | −0.550 | 6.487 |
| 0.483 | −0.550 | 6.487 |
| 0.480 | −0.549 | 6.487 |
| 0.477 | −0.548 | 6.487 |
| 0.474 | −0.547 | 6.487 |
| 0.472 | −0.545 | 6.487 |
| 0.470 | −0.543 | 6.487 |
| 0.468 | −0.541 | 6.487 |
| 0.467 | −0.538 | 6.487 |
| 0.465 | −0.536 | 6.487 |
| 0.464 | −0.534 | 6.487 |
| 0.462 | −0.532 | 6.487 |
| 0.460 | −0.530 | 6.487 |
| 0.459 | −0.528 | 6.487 |
| 0.457 | −0.526 | 6.487 |
| 0.456 | −0.524 | 6.487 |
| 0.454 | −0.522 | 6.487 |
| 0.446 | −0.511 | 6.487 |
| 0.438 | −0.501 | 6.487 |
| 0.429 | −0.490 | 6.487 |
| 0.421 | −0.480 | 6.487 |
| 0.412 | −0.470 | 6.487 |
| 0.403 | −0.460 | 6.487 |
| 0.395 | −0.450 | 6.487 |
| 0.386 | −0.440 | 6.487 |
| 0.377 | −0.431 | 6.487 |
| 0.368 | −0.421 | 6.487 |
| 0.359 | −0.412 | 6.487 |
| 0.349 | −0.402 | 6.487 |
| 0.340 | −0.393 | 6.487 |
| 0.330 | −0.384 | 6.487 |
| 0.320 | −0.375 | 6.487 |
| 0.310 | −0.366 | 6.487 |
| 0.300 | −0.358 | 6.487 |
| 0.290 | −0.349 | 6.487 |
| 0.280 | −0.341 | 6.487 |
| 0.270 | −0.332 | 6.487 |
| 0.260 | −0.324 | 6.487 |
| 0.250 | −0.315 | 6.487 |
| 0.239 | −0.306 | 6.487 |
| 0.229 | −0.298 | 6.487 |
| 0.219 | −0.289 | 6.487 |
| 0.209 | −0.281 | 6.487 |
| 0.199 | −0.273 | 6.487 |
| 0.188 | −0.264 | 6.487 |
| 0.178 | −0.256 | 6.487 |
| 0.167 | −0.248 | 6.487 |
| 0.157 | −0.240 | 6.487 |
| 0.146 | −0.232 | 6.487 |
| 0.135 | −0.224 | 6.487 |
| 0.125 | −0.217 | 6.487 |
| 0.114 | −0.209 | 6.487 |
| 0.103 | −0.201 | 6.487 |
| 0.092 | −0.193 | 6.487 |
| 0.081 | −0.186 | 6.487 |
| 0.071 | −0.178 | 6.487 |
| 0.060 | −0.171 | 6.487 |
| 0.049 | −0.164 | 6.487 |
| 0.037 | −0.156 | 6.487 |
| 0.026 | −0.149 | 6.487 |
| 0.015 | −0.142 | 6.487 |
| 0.004 | −0.135 | 6.487 |
| −0.007 | −0.128 | 6.487 |
| −0.019 | −0.121 | 6.487 |
| −0.030 | −0.115 | 6.487 |
| −0.042 | −0.108 | 6.487 |
| −0.053 | −0.101 | 6.487 |
| −0.065 | −0.095 | 6.487 |
| −0.076 | −0.088 | 6.487 |
| −0.088 | −0.082 | 6.487 |
| −0.099 | −0.076 | 6.487 |
| −0.111 | −0.070 | 6.487 |
| −0.123 | −0.064 | 6.487 |
| −0.135 | −0.058 | 6.487 |
| −0.147 | −0.052 | 6.487 |
| −0.159 | −0.046 | 6.487 |
| −0.171 | −0.041 | 6.487 |
| −0.183 | −0.036 | 6.487 |
| −0.195 | −0.030 | 6.487 |
| −0.207 | −0.025 | 6.487 |
| −0.220 | −0.020 | 6.487 |
| −0.232 | −0.016 | 6.487 |
| −0.245 | −0.011 | 6.487 |
| −0.257 | −0.007 | 6.487 |
| −0.270 | −0.002 | 6.487 |
| −0.282 | 0.002 | 6.487 |
| −0.295 | 0.005 | 6.487 |
| −0.308 | 0.009 | 6.487 |
| −0.321 | 0.012 | 6.487 |
| −0.334 | 0.015 | 6.487 |
| −0.347 | 0.017 | 6.487 |
| −0.360 | 0.020 | 6.487 |
| −0.373 | 0.021 | 6.487 |
| −0.386 | 0.023 | 6.487 |
| −0.399 | 0.023 | 6.487 |
| −0.412 | 0.024 | 6.487 |
| −0.415 | 0.024 | 6.487 |
| −0.418 | 0.024 | 6.487 |
| −0.420 | 0.024 | 6.487 |
| −0.423 | 0.024 | 6.487 |
| −0.426 | 0.024 | 6.487 |
| −0.428 | 0.024 | 6.487 |
| −0.431 | 0.024 | 6.487 |
| −0.434 | 0.023 | 6.487 |
| −0.436 | 0.023 | 6.487 |
| −0.439 | 0.023 | 6.487 |
| −0.446 | 0.023 | 6.487 |
| −0.454 | 0.023 | 6.487 |
| −0.461 | 0.024 | 6.487 |
| −0.469 | 0.026 | 6.487 |
| −0.476 | 0.029 | 6.487 |
| −0.482 | 0.032 | 6.487 |
| −0.489 | 0.036 | 6.487 |
| −0.495 | 0.040 | 6.487 |
| −0.500 | 0.046 | 6.487 |
| −0.505 | 0.051 | 6.487 |

TABLE 2-continued

| X | Y | Z |
|---|---|---|
| −0.509 | 0.057 | 6.487 |
| −0.513 | 0.064 | 6.487 |
| −0.516 | 0.071 | 6.487 |
| −0.518 | 0.078 | 6.487 |
| −0.520 | 0.085 | 6.487 |
| −0.520 | 0.093 | 6.487 |
| −0.521 | 0.100 | 6.487 |
| −0.520 | 0.108 | 6.487 |
| SECTION 5 | | |
| −0.511 | 0.127 | 6.544 |
| −0.510 | 0.130 | 6.544 |
| −0.509 | 0.134 | 6.544 |
| −0.508 | 0.138 | 6.544 |
| −0.506 | 0.141 | 6.544 |
| −0.505 | 0.145 | 6.544 |
| −0.504 | 0.148 | 6.544 |
| −0.503 | 0.152 | 6.544 |
| −0.502 | 0.156 | 6.544 |
| −0.500 | 0.159 | 6.544 |
| −0.499 | 0.163 | 6.544 |
| −0.491 | 0.180 | 6.544 |
| −0.483 | 0.196 | 6.544 |
| −0.473 | 0.213 | 6.544 |
| −0.462 | 0.228 | 6.544 |
| −0.451 | 0.243 | 6.544 |
| −0.438 | 0.257 | 6.544 |
| −0.425 | 0.270 | 6.544 |
| −0.410 | 0.282 | 6.544 |
| −0.395 | 0.293 | 6.544 |
| −0.379 | 0.303 | 6.544 |
| −0.363 | 0.312 | 6.544 |
| −0.346 | 0.320 | 6.544 |
| −0.328 | 0.327 | 6.544 |
| −0.310 | 0.332 | 6.544 |
| −0.292 | 0.337 | 6.544 |
| −0.273 | 0.340 | 6.544 |
| −0.254 | 0.341 | 6.544 |
| −0.236 | 0.342 | 6.544 |
| −0.217 | 0.341 | 6.544 |
| −0.198 | 0.339 | 6.544 |
| −0.180 | 0.336 | 6.544 |
| −0.161 | 0.332 | 6.544 |
| −0.143 | 0.327 | 6.544 |
| −0.125 | 0.321 | 6.544 |
| −0.108 | 0.314 | 6.544 |
| −0.091 | 0.306 | 6.544 |
| −0.074 | 0.298 | 6.544 |
| −0.058 | 0.288 | 6.544 |
| −0.042 | 0.278 | 6.544 |
| −0.026 | 0.267 | 6.544 |
| −0.011 | 0.256 | 6.544 |
| 0.003 | 0.244 | 6.544 |
| 0.018 | 0.232 | 6.544 |
| 0.032 | 0.219 | 6.544 |
| 0.045 | 0.206 | 6.544 |
| 0.059 | 0.193 | 6.544 |
| 0.072 | 0.180 | 6.544 |
| 0.084 | 0.166 | 6.544 |
| 0.097 | 0.152 | 6.544 |
| 0.109 | 0.138 | 6.544 |
| 0.121 | 0.123 | 6.544 |
| 0.133 | 0.109 | 6.544 |
| 0.145 | 0.094 | 6.544 |
| 0.157 | 0.079 | 6.544 |
| 0.168 | 0.064 | 6.544 |
| 0.179 | 0.049 | 6.544 |
| 0.190 | 0.034 | 6.544 |
| 0.201 | 0.018 | 6.544 |
| 0.212 | 0.003 | 6.544 |
| 0.222 | −0.013 | 6.544 |
| 0.233 | −0.028 | 6.544 |
| 0.243 | −0.044 | 6.544 |
| 0.254 | −0.059 | 6.544 |
| 0.264 | −0.075 | 6.544 |
| 0.274 | −0.091 | 6.544 |
| 0.284 | −0.107 | 6.544 |
| 0.294 | −0.123 | 6.544 |
| 0.304 | −0.139 | 6.544 |
| 0.314 | −0.155 | 6.544 |
| 0.324 | −0.171 | 6.544 |
| 0.333 | −0.187 | 6.544 |
| 0.343 | −0.203 | 6.544 |
| 0.352 | −0.220 | 6.544 |
| 0.362 | −0.236 | 6.544 |
| 0.371 | −0.252 | 6.544 |
| 0.380 | −0.269 | 6.544 |
| 0.389 | −0.285 | 6.544 |
| 0.398 | −0.302 | 6.544 |
| 0.407 | −0.318 | 6.544 |
| 0.416 | −0.335 | 6.544 |
| 0.425 | −0.352 | 6.544 |
| 0.433 | −0.368 | 6.544 |
| 0.442 | −0.385 | 6.544 |
| 0.450 | −0.402 | 6.544 |
| 0.458 | −0.419 | 6.544 |
| 0.465 | −0.437 | 6.544 |
| 0.473 | −0.454 | 6.544 |
| 0.480 | −0.471 | 6.544 |
| 0.488 | −0.488 | 6.544 |
| 0.489 | −0.492 | 6.544 |
| 0.491 | −0.495 | 6.544 |
| 0.492 | −0.499 | 6.544 |
| 0.494 | −0.502 | 6.544 |
| 0.495 | −0.505 | 6.544 |
| 0.497 | −0.509 | 6.544 |
| 0.498 | −0.512 | 6.544 |
| 0.499 | −0.516 | 6.544 |
| 0.501 | −0.519 | 6.544 |
| 0.502 | −0.523 | 6.544 |
| 0.503 | −0.526 | 6.544 |
| 0.504 | −0.529 | 6.544 |
| 0.504 | −0.532 | 6.544 |
| 0.504 | −0.535 | 6.544 |
| 0.503 | −0.538 | 6.544 |
| 0.502 | −0.540 | 6.544 |
| 0.500 | −0.543 | 6.544 |
| 0.498 | −0.545 | 6.544 |
| 0.496 | −0.547 | 6.544 |
| 0.493 | −0.548 | 6.544 |
| 0.491 | −0.550 | 6.544 |
| 0.488 | −0.550 | 6.544 |
| 0.485 | −0.551 | 6.544 |
| 0.482 | −0.550 | 6.544 |
| 0.479 | −0.550 | 6.544 |
| 0.476 | −0.549 | 6.544 |
| 0.473 | −0.547 | 6.544 |
| 0.471 | −0.546 | 6.544 |
| 0.469 | −0.543 | 6.544 |
| 0.467 | −0.541 | 6.544 |
| 0.466 | −0.539 | 6.544 |
| 0.464 | −0.537 | 6.544 |
| 0.463 | −0.535 | 6.544 |
| 0.461 | −0.533 | 6.544 |
| 0.459 | −0.531 | 6.544 |
| 0.458 | −0.529 | 6.544 |
| 0.456 | −0.527 | 6.544 |
| 0.455 | −0.524 | 6.544 |
| 0.453 | −0.522 | 6.544 |
| 0.445 | −0.512 | 6.544 |
| 0.437 | −0.502 | 6.544 |
| 0.428 | −0.491 | 6.544 |
| 0.420 | −0.481 | 6.544 |
| 0.411 | −0.471 | 6.544 |
| 0.402 | −0.461 | 6.544 |
| 0.394 | −0.452 | 6.544 |
| 0.385 | −0.442 | 6.544 |
| 0.376 | −0.432 | 6.544 |
| 0.367 | −0.422 | 6.544 |
| 0.358 | −0.413 | 6.544 |
| 0.348 | −0.403 | 6.544 |
| 0.339 | −0.394 | 6.544 |
| 0.329 | −0.385 | 6.544 |
| 0.319 | −0.376 | 6.544 |
| 0.309 | −0.368 | 6.544 |
| 0.299 | −0.359 | 6.544 |

TABLE 2-continued

| X | Y | Z |
|---|---|---|
| 0.289 | −0.351 | 6.544 |
| 0.279 | −0.342 | 6.544 |
| 0.269 | −0.333 | 6.544 |
| 0.259 | −0.325 | 6.544 |
| 0.250 | −0.316 | 6.544 |
| 0.240 | −0.307 | 6.544 |
| 0.229 | −0.299 | 6.544 |
| 0.219 | −0.290 | 6.544 |
| 0.209 | −0.282 | 6.544 |
| 0.199 | −0.273 | 6.544 |
| 0.189 | −0.265 | 6.544 |
| 0.178 | −0.257 | 6.544 |
| 0.168 | −0.249 | 6.544 |
| 0.158 | −0.241 | 6.544 |
| 0.147 | −0.233 | 6.544 |
| 0.137 | −0.225 | 6.544 |
| 0.126 | −0.217 | 6.544 |
| 0.115 | −0.209 | 6.544 |
| 0.105 | −0.201 | 6.544 |
| 0.094 | −0.193 | 6.544 |
| 0.083 | −0.186 | 6.544 |
| 0.072 | −0.178 | 6.544 |
| 0.062 | −0.171 | 6.544 |
| 0.051 | −0.163 | 6.544 |
| 0.040 | −0.156 | 6.544 |
| 0.029 | −0.149 | 6.544 |
| 0.018 | −0.141 | 6.544 |
| 0.007 | −0.134 | 6.544 |
| −0.005 | −0.127 | 6.544 |
| −0.016 | −0.120 | 6.544 |
| −0.027 | −0.113 | 6.544 |
| −0.038 | −0.106 | 6.544 |
| −0.050 | −0.100 | 6.544 |
| −0.061 | −0.093 | 6.544 |
| −0.073 | −0.086 | 6.544 |
| −0.084 | −0.080 | 6.544 |
| −0.096 | −0.073 | 6.544 |
| −0.107 | −0.067 | 6.544 |
| −0.119 | −0.061 | 6.544 |
| −0.131 | −0.055 | 6.544 |
| −0.142 | −0.049 | 6.544 |
| −0.154 | −0.043 | 6.544 |
| −0.166 | −0.037 | 6.544 |
| −0.178 | −0.032 | 6.544 |
| −0.190 | −0.026 | 6.544 |
| −0.202 | −0.021 | 6.544 |
| −0.214 | −0.016 | 6.544 |
| −0.227 | −0.011 | 6.544 |
| −0.239 | −0.006 | 6.544 |
| −0.251 | −0.002 | 6.544 |
| −0.264 | 0.003 | 6.544 |
| −0.276 | 0.007 | 6.544 |
| −0.289 | 0.011 | 6.544 |
| −0.302 | 0.015 | 6.544 |
| −0.314 | 0.018 | 6.544 |
| −0.327 | 0.021 | 6.544 |
| −0.340 | 0.024 | 6.544 |
| −0.353 | 0.026 | 6.544 |
| −0.366 | 0.029 | 6.544 |
| −0.379 | 0.030 | 6.544 |
| −0.392 | 0.031 | 6.544 |
| −0.406 | 0.032 | 6.544 |
| −0.408 | 0.032 | 6.544 |
| −0.411 | 0.032 | 6.544 |
| −0.413 | 0.032 | 6.544 |
| −0.416 | 0.032 | 6.544 |
| −0.419 | 0.032 | 6.544 |
| −0.421 | 0.032 | 6.544 |
| −0.424 | 0.032 | 6.544 |
| −0.427 | 0.032 | 6.544 |
| −0.429 | 0.032 | 6.544 |
| −0.432 | 0.031 | 6.544 |
| −0.440 | 0.031 | 6.544 |
| −0.447 | 0.032 | 6.544 |
| −0.455 | 0.033 | 6.544 |
| −0.462 | 0.035 | 6.544 |
| −0.469 | 0.038 | 6.544 |
| −0.476 | 0.042 | 6.544 |
| −0.482 | 0.046 | 6.544 |
| −0.488 | 0.050 | 6.544 |
| −0.493 | 0.056 | 6.544 |
| −0.498 | 0.062 | 6.544 |
| −0.503 | 0.068 | 6.544 |
| −0.506 | 0.075 | 6.544 |
| −0.509 | 0.082 | 6.544 |
| −0.511 | 0.089 | 6.544 |
| −0.513 | 0.097 | 6.544 |
| −0.513 | 0.104 | 6.544 |
| −0.513 | 0.112 | 6.544 |
| −0.512 | 0.119 | 6.544 |

SECTION 6

| X | Y | Z |
|---|---|---|
| −0.482 | 0.166 | 6.736 |
| −0.480 | 0.170 | 6.736 |
| −0.479 | 0.173 | 6.736 |
| −0.478 | 0.176 | 6.736 |
| −0.476 | 0.180 | 6.736 |
| −0.475 | 0.183 | 6.736 |
| −0.473 | 0.186 | 6.736 |
| −0.471 | 0.189 | 6.736 |
| −0.470 | 0.192 | 6.736 |
| −0.468 | 0.195 | 6.736 |
| −0.466 | 0.198 | 6.736 |
| −0.457 | 0.214 | 6.736 |
| −0.446 | 0.228 | 6.736 |
| −0.435 | 0.242 | 6.736 |
| −0.422 | 0.254 | 6.736 |
| −0.409 | 0.266 | 6.736 |
| −0.395 | 0.277 | 6.736 |
| −0.380 | 0.287 | 6.736 |
| −0.365 | 0.296 | 6.736 |
| −0.349 | 0.303 | 6.736 |
| −0.332 | 0.310 | 6.736 |
| −0.315 | 0.315 | 6.736 |
| −0.298 | 0.319 | 6.736 |
| −0.280 | 0.322 | 6.736 |
| −0.262 | 0.324 | 6.736 |
| −0.245 | 0.325 | 6.736 |
| −0.227 | 0.324 | 6.736 |
| −0.209 | 0.323 | 6.736 |
| −0.191 | 0.321 | 6.736 |
| −0.174 | 0.317 | 6.736 |
| −0.157 | 0.313 | 6.736 |
| −0.140 | 0.308 | 6.736 |
| −0.123 | 0.302 | 6.736 |
| −0.106 | 0.295 | 6.736 |
| −0.090 | 0.288 | 6.736 |
| −0.074 | 0.280 | 6.736 |
| −0.059 | 0.271 | 6.736 |
| −0.044 | 0.261 | 6.736 |
| −0.029 | 0.251 | 6.736 |
| −0.015 | 0.241 | 6.736 |
| −0.001 | 0.230 | 6.736 |
| 0.013 | 0.219 | 6.736 |
| 0.027 | 0.207 | 6.736 |
| 0.040 | 0.195 | 6.736 |
| 0.052 | 0.182 | 6.736 |
| 0.065 | 0.170 | 6.736 |
| 0.077 | 0.157 | 6.736 |
| 0.089 | 0.143 | 6.736 |
| 0.101 | 0.130 | 6.736 |
| 0.112 | 0.116 | 6.736 |
| 0.124 | 0.103 | 6.736 |
| 0.135 | 0.089 | 6.736 |
| 0.146 | 0.075 | 6.736 |
| 0.157 | 0.061 | 6.736 |
| 0.167 | 0.046 | 6.736 |
| 0.178 | 0.032 | 6.736 |
| 0.188 | 0.017 | 6.736 |
| 0.198 | 0.003 | 6.736 |
| 0.208 | −0.012 | 6.736 |
| 0.218 | −0.027 | 6.736 |
| 0.228 | −0.041 | 6.736 |
| 0.238 | −0.056 | 6.736 |
| 0.248 | −0.071 | 6.736 |
| 0.258 | −0.086 | 6.736 |

TABLE 2-continued

| X | Y | Z |
|---|---|---|
| 0.267 | −0.101 | 6.736 |
| 0.277 | −0.116 | 6.736 |
| 0.286 | −0.131 | 6.736 |
| 0.296 | −0.146 | 6.736 |
| 0.305 | −0.161 | 6.736 |
| 0.314 | −0.177 | 6.736 |
| 0.324 | −0.192 | 6.736 |
| 0.333 | −0.207 | 6.736 |
| 0.342 | −0.223 | 6.736 |
| 0.351 | −0.238 | 6.736 |
| 0.360 | −0.253 | 6.736 |
| 0.368 | −0.269 | 6.736 |
| 0.377 | −0.284 | 6.736 |
| 0.386 | −0.300 | 6.736 |
| 0.395 | −0.315 | 6.736 |
| 0.403 | −0.331 | 6.736 |
| 0.412 | −0.347 | 6.736 |
| 0.420 | −0.362 | 6.736 |
| 0.428 | −0.378 | 6.736 |
| 0.436 | −0.394 | 6.736 |
| 0.444 | −0.410 | 6.736 |
| 0.451 | −0.427 | 6.736 |
| 0.458 | −0.443 | 6.736 |
| 0.465 | −0.459 | 6.736 |
| 0.473 | −0.475 | 6.736 |
| 0.480 | −0.492 | 6.736 |
| 0.482 | −0.495 | 6.736 |
| 0.483 | −0.498 | 6.736 |
| 0.485 | −0.501 | 6.736 |
| 0.486 | −0.505 | 6.736 |
| 0.488 | −0.508 | 6.736 |
| 0.489 | −0.511 | 6.736 |
| 0.490 | −0.514 | 6.736 |
| 0.491 | −0.518 | 6.736 |
| 0.493 | −0.521 | 6.736 |
| 0.494 | −0.524 | 6.736 |
| 0.495 | −0.527 | 6.736 |
| 0.496 | −0.530 | 6.736 |
| 0.496 | −0.533 | 6.736 |
| 0.496 | −0.536 | 6.736 |
| 0.495 | −0.539 | 6.736 |
| 0.494 | −0.541 | 6.736 |
| 0.492 | −0.544 | 6.736 |
| 0.490 | −0.546 | 6.736 |
| 0.488 | −0.548 | 6.736 |
| 0.486 | −0.549 | 6.736 |
| 0.483 | −0.551 | 6.736 |
| 0.480 | −0.551 | 6.736 |
| 0.477 | −0.552 | 6.736 |
| 0.474 | −0.551 | 6.736 |
| 0.471 | −0.551 | 6.736 |
| 0.469 | −0.550 | 6.736 |
| 0.466 | −0.549 | 6.736 |
| 0.463 | −0.547 | 6.736 |
| 0.461 | −0.545 | 6.736 |
| 0.460 | −0.543 | 6.736 |
| 0.458 | −0.541 | 6.736 |
| 0.457 | −0.539 | 6.736 |
| 0.455 | −0.537 | 6.736 |
| 0.454 | −0.534 | 6.736 |
| 0.452 | −0.532 | 6.736 |
| 0.450 | −0.530 | 6.736 |
| 0.449 | −0.528 | 6.736 |
| 0.447 | −0.526 | 6.736 |
| 0.446 | −0.524 | 6.736 |
| 0.437 | −0.514 | 6.736 |
| 0.429 | −0.504 | 6.736 |
| 0.421 | −0.494 | 6.736 |
| 0.412 | −0.484 | 6.736 |
| 0.404 | −0.474 | 6.736 |
| 0.395 | −0.464 | 6.736 |
| 0.386 | −0.455 | 6.736 |
| 0.378 | −0.445 | 6.736 |
| 0.369 | −0.435 | 6.736 |
| 0.360 | −0.426 | 6.736 |
| 0.351 | −0.416 | 6.736 |
| 0.342 | −0.407 | 6.736 |
| 0.332 | −0.398 | 6.736 |
| 0.323 | −0.389 | 6.736 |
| 0.313 | −0.380 | 6.736 |
| 0.303 | −0.372 | 6.736 |
| 0.294 | −0.363 | 6.736 |
| 0.284 | −0.354 | 6.736 |
| 0.274 | −0.346 | 6.736 |
| 0.264 | −0.337 | 6.736 |
| 0.255 | −0.328 | 6.736 |
| 0.245 | −0.319 | 6.736 |
| 0.235 | −0.311 | 6.736 |
| 0.226 | −0.302 | 6.736 |
| 0.216 | −0.293 | 6.736 |
| 0.206 | −0.285 | 6.736 |
| 0.196 | −0.276 | 6.736 |
| 0.186 | −0.268 | 6.736 |
| 0.176 | −0.259 | 6.736 |
| 0.166 | −0.251 | 6.736 |
| 0.156 | −0.243 | 6.736 |
| 0.146 | −0.234 | 6.736 |
| 0.136 | −0.226 | 6.736 |
| 0.126 | −0.218 | 6.736 |
| 0.116 | −0.210 | 6.736 |
| 0.105 | −0.202 | 6.736 |
| 0.095 | −0.194 | 6.736 |
| 0.085 | −0.186 | 6.736 |
| 0.074 | −0.178 | 6.736 |
| 0.064 | −0.170 | 6.736 |
| 0.053 | −0.162 | 6.736 |
| 0.043 | −0.155 | 6.736 |
| 0.032 | −0.147 | 6.736 |
| 0.022 | −0.139 | 6.736 |
| 0.011 | −0.132 | 6.736 |
| 0.001 | −0.124 | 6.736 |
| −0.010 | −0.117 | 6.736 |
| −0.021 | −0.109 | 6.736 |
| −0.032 | −0.102 | 6.736 |
| −0.043 | −0.095 | 6.736 |
| −0.054 | −0.088 | 6.736 |
| −0.064 | −0.080 | 6.736 |
| −0.075 | −0.073 | 6.736 |
| −0.086 | −0.066 | 6.736 |
| −0.098 | −0.060 | 6.736 |
| −0.109 | −0.053 | 6.736 |
| −0.120 | −0.046 | 6.736 |
| −0.131 | −0.040 | 6.736 |
| −0.143 | −0.033 | 6.736 |
| −0.154 | −0.027 | 6.736 |
| −0.165 | −0.020 | 6.736 |
| −0.177 | −0.014 | 6.736 |
| −0.188 | −0.008 | 6.736 |
| −0.200 | −0.002 | 6.736 |
| −0.212 | 0.004 | 6.736 |
| −0.223 | 0.009 | 6.736 |
| −0.235 | 0.015 | 6.736 |
| −0.247 | 0.020 | 6.736 |
| −0.259 | 0.025 | 6.736 |
| −0.271 | 0.030 | 6.736 |
| −0.284 | 0.035 | 6.736 |
| −0.296 | 0.039 | 6.736 |
| −0.308 | 0.043 | 6.736 |
| −0.321 | 0.047 | 6.736 |
| −0.333 | 0.051 | 6.736 |
| −0.346 | 0.054 | 6.736 |
| −0.359 | 0.056 | 6.736 |
| −0.372 | 0.059 | 6.736 |
| −0.384 | 0.060 | 6.736 |
| −0.387 | 0.060 | 6.736 |
| −0.390 | 0.061 | 6.736 |
| −0.392 | 0.061 | 6.736 |
| −0.395 | 0.061 | 6.736 |
| −0.398 | 0.061 | 6.736 |
| −0.400 | 0.061 | 6.736 |
| −0.403 | 0.061 | 6.736 |
| −0.405 | 0.062 | 6.736 |
| −0.408 | 0.062 | 6.736 |
| −0.411 | 0.062 | 6.736 |
| −0.418 | 0.062 | 6.736 |
| −0.426 | 0.063 | 6.736 |

TABLE 2-continued

| X | Y | Z |
|---|---|---|
| −0.434 | 0.065 | 6.736 |
| −0.441 | 0.068 | 6.736 |
| −0.448 | 0.071 | 6.736 |
| −0.455 | 0.075 | 6.736 |
| −0.461 | 0.080 | 6.736 |
| −0.467 | 0.086 | 6.736 |
| −0.472 | 0.092 | 6.736 |
| −0.476 | 0.098 | 6.736 |
| −0.480 | 0.105 | 6.736 |
| −0.483 | 0.113 | 6.736 |
| −0.485 | 0.120 | 6.736 |
| −0.487 | 0.128 | 6.736 |
| −0.487 | 0.136 | 6.736 |
| −0.487 | 0.143 | 6.736 |
| −0.486 | 0.151 | 6.736 |
| −0.484 | 0.159 | 6.736 |
| SECTION 7 | | |
| −0.450 | 0.208 | 6.928 |
| −0.449 | 0.211 | 6.928 |
| −0.447 | 0.214 | 6.928 |
| −0.445 | 0.217 | 6.928 |
| −0.444 | 0.220 | 6.928 |
| −0.442 | 0.222 | 6.928 |
| −0.440 | 0.225 | 6.928 |
| −0.438 | 0.228 | 6.928 |
| −0.436 | 0.231 | 6.928 |
| −0.434 | 0.233 | 6.928 |
| −0.432 | 0.236 | 6.928 |
| −0.421 | 0.249 | 6.928 |
| −0.409 | 0.261 | 6.928 |
| −0.396 | 0.272 | 6.928 |
| −0.383 | 0.282 | 6.928 |
| −0.368 | 0.291 | 6.928 |
| −0.353 | 0.299 | 6.928 |
| −0.338 | 0.306 | 6.928 |
| −0.322 | 0.312 | 6.928 |
| −0.305 | 0.316 | 6.928 |
| −0.289 | 0.319 | 6.928 |
| −0.272 | 0.321 | 6.928 |
| −0.255 | 0.322 | 6.928 |
| −0.238 | 0.322 | 6.928 |
| −0.221 | 0.321 | 6.928 |
| −0.204 | 0.319 | 6.928 |
| −0.188 | 0.316 | 6.928 |
| −0.171 | 0.312 | 6.928 |
| −0.155 | 0.307 | 6.928 |
| −0.139 | 0.301 | 6.928 |
| −0.123 | 0.295 | 6.928 |
| −0.108 | 0.288 | 6.928 |
| −0.093 | 0.280 | 6.928 |
| −0.078 | 0.272 | 6.928 |
| −0.064 | 0.263 | 6.928 |
| −0.050 | 0.253 | 6.928 |
| −0.036 | 0.244 | 6.928 |
| −0.022 | 0.233 | 6.928 |
| −0.009 | 0.223 | 6.928 |
| 0.004 | 0.212 | 6.928 |
| 0.017 | 0.201 | 6.928 |
| 0.029 | 0.189 | 6.928 |
| 0.041 | 0.177 | 6.928 |
| 0.053 | 0.165 | 6.928 |
| 0.065 | 0.153 | 6.928 |
| 0.076 | 0.140 | 6.928 |
| 0.087 | 0.128 | 6.928 |
| 0.098 | 0.115 | 6.928 |
| 0.109 | 0.102 | 6.928 |
| 0.120 | 0.089 | 6.928 |
| 0.130 | 0.075 | 6.928 |
| 0.141 | 0.062 | 6.928 |
| 0.151 | 0.048 | 6.928 |
| 0.161 | 0.035 | 6.928 |
| 0.171 | 0.021 | 6.928 |
| 0.181 | 0.007 | 6.928 |
| 0.190 | −0.007 | 6.928 |
| 0.200 | −0.021 | 6.928 |
| 0.209 | −0.035 | 6.928 |
| 0.219 | −0.049 | 6.928 |
| 0.228 | −0.063 | 6.928 |
| 0.237 | −0.077 | 6.928 |
| 0.246 | −0.091 | 6.928 |
| 0.255 | −0.106 | 6.928 |
| 0.264 | −0.120 | 6.928 |
| 0.273 | −0.135 | 6.928 |
| 0.282 | −0.149 | 6.928 |
| 0.291 | −0.164 | 6.928 |
| 0.299 | −0.178 | 6.928 |
| 0.308 | −0.193 | 6.928 |
| 0.317 | −0.207 | 6.928 |
| 0.325 | −0.222 | 6.928 |
| 0.334 | −0.237 | 6.928 |
| 0.342 | −0.251 | 6.928 |
| 0.350 | −0.266 | 6.928 |
| 0.359 | −0.281 | 6.928 |
| 0.367 | −0.296 | 6.928 |
| 0.375 | −0.311 | 6.928 |
| 0.383 | −0.325 | 6.928 |
| 0.391 | −0.340 | 6.928 |
| 0.399 | −0.355 | 6.928 |
| 0.407 | −0.370 | 6.928 |
| 0.415 | −0.385 | 6.928 |
| 0.423 | −0.400 | 6.928 |
| 0.430 | −0.416 | 6.928 |
| 0.437 | −0.431 | 6.928 |
| 0.444 | −0.447 | 6.928 |
| 0.451 | −0.462 | 6.928 |
| 0.458 | −0.477 | 6.928 |
| 0.465 | −0.493 | 6.928 |
| 0.466 | −0.496 | 6.928 |
| 0.468 | −0.499 | 6.928 |
| 0.469 | −0.502 | 6.928 |
| 0.471 | −0.505 | 6.928 |
| 0.472 | −0.508 | 6.928 |
| 0.473 | −0.511 | 6.928 |
| 0.475 | −0.514 | 6.928 |
| 0.476 | −0.518 | 6.928 |
| 0.477 | −0.521 | 6.928 |
| 0.478 | −0.524 | 6.928 |
| 0.480 | −0.526 | 6.928 |
| 0.480 | −0.529 | 6.928 |
| 0.481 | −0.532 | 6.928 |
| 0.481 | −0.535 | 6.928 |
| 0.480 | −0.538 | 6.928 |
| 0.479 | −0.540 | 6.928 |
| 0.477 | −0.543 | 6.928 |
| 0.475 | −0.545 | 6.928 |
| 0.473 | −0.547 | 6.928 |
| 0.471 | −0.548 | 6.928 |
| 0.468 | −0.549 | 6.928 |
| 0.465 | −0.550 | 6.928 |
| 0.462 | −0.550 | 6.928 |
| 0.460 | −0.550 | 6.928 |
| 0.457 | −0.550 | 6.928 |
| 0.454 | −0.549 | 6.928 |
| 0.451 | −0.548 | 6.928 |
| 0.449 | −0.546 | 6.928 |
| 0.447 | −0.544 | 6.928 |
| 0.445 | −0.542 | 6.928 |
| 0.444 | −0.540 | 6.928 |
| 0.442 | −0.538 | 6.928 |
| 0.441 | −0.536 | 6.928 |
| 0.439 | −0.534 | 6.928 |
| 0.438 | −0.532 | 6.928 |
| 0.436 | −0.530 | 6.928 |
| 0.434 | −0.528 | 6.928 |
| 0.433 | −0.526 | 6.928 |
| 0.431 | −0.524 | 6.928 |
| 0.423 | −0.514 | 6.928 |
| 0.415 | −0.504 | 6.928 |
| 0.406 | −0.494 | 6.928 |
| 0.398 | −0.484 | 6.928 |
| 0.390 | −0.474 | 6.928 |
| 0.381 | −0.465 | 6.928 |
| 0.372 | −0.455 | 6.928 |
| 0.364 | −0.446 | 6.928 |
| 0.355 | −0.436 | 6.928 |

TABLE 2-continued

| X | Y | Z |
|---|---|---|
| 0.346 | −0.427 | 6.928 |
| 0.337 | −0.417 | 6.928 |
| 0.328 | −0.408 | 6.928 |
| 0.319 | −0.399 | 6.928 |
| 0.309 | −0.391 | 6.928 |
| 0.300 | −0.382 | 6.928 |
| 0.290 | −0.373 | 6.928 |
| 0.281 | −0.365 | 6.928 |
| 0.271 | −0.356 | 6.928 |
| 0.261 | −0.347 | 6.928 |
| 0.252 | −0.339 | 6.928 |
| 0.242 | −0.330 | 6.928 |
| 0.233 | −0.321 | 6.928 |
| 0.224 | −0.312 | 6.928 |
| 0.214 | −0.304 | 6.928 |
| 0.205 | −0.295 | 6.928 |
| 0.195 | −0.286 | 6.928 |
| 0.185 | −0.278 | 6.928 |
| 0.176 | −0.269 | 6.928 |
| 0.166 | −0.260 | 6.928 |
| 0.156 | −0.252 | 6.928 |
| 0.147 | −0.243 | 6.928 |
| 0.137 | −0.235 | 6.928 |
| 0.127 | −0.227 | 6.928 |
| 0.117 | −0.218 | 6.928 |
| 0.107 | −0.210 | 6.928 |
| 0.097 | −0.202 | 6.928 |
| 0.088 | −0.193 | 6.928 |
| 0.078 | −0.185 | 6.928 |
| 0.068 | −0.177 | 6.928 |
| 0.058 | −0.169 | 6.928 |
| 0.048 | −0.161 | 6.928 |
| 0.038 | −0.153 | 6.928 |
| 0.028 | −0.145 | 6.928 |
| 0.017 | −0.137 | 6.928 |
| 0.007 | −0.129 | 6.928 |
| −0.003 | −0.121 | 6.928 |
| −0.013 | −0.113 | 6.928 |
| −0.023 | −0.105 | 6.928 |
| −0.034 | −0.097 | 6.928 |
| −0.044 | −0.089 | 6.928 |
| −0.054 | −0.082 | 6.928 |
| −0.065 | −0.074 | 6.928 |
| −0.075 | −0.067 | 6.928 |
| −0.086 | −0.059 | 6.928 |
| −0.096 | −0.052 | 6.928 |
| −0.107 | −0.044 | 6.928 |
| −0.117 | −0.037 | 6.928 |
| −0.128 | −0.030 | 6.928 |
| −0.139 | −0.022 | 6.928 |
| −0.150 | −0.015 | 6.928 |
| −0.160 | −0.008 | 6.928 |
| −0.171 | −0.001 | 6.928 |
| −0.182 | 0.006 | 6.928 |
| −0.193 | 0.012 | 6.928 |
| −0.204 | 0.019 | 6.928 |
| −0.215 | 0.026 | 6.928 |
| −0.226 | 0.032 | 6.928 |
| −0.238 | 0.038 | 6.928 |
| −0.249 | 0.045 | 6.928 |
| −0.260 | 0.051 | 6.928 |
| −0.272 | 0.056 | 6.928 |
| −0.283 | 0.062 | 6.928 |
| −0.295 | 0.068 | 6.928 |
| −0.307 | 0.073 | 6.928 |
| −0.319 | 0.078 | 6.928 |
| −0.331 | 0.082 | 6.928 |
| −0.343 | 0.086 | 6.928 |
| −0.356 | 0.090 | 6.928 |
| −0.368 | 0.093 | 6.928 |
| −0.371 | 0.094 | 6.928 |
| −0.373 | 0.094 | 6.928 |
| −0.376 | 0.095 | 6.928 |
| −0.378 | 0.095 | 6.928 |
| −0.381 | 0.096 | 6.928 |
| −0.383 | 0.096 | 6.928 |
| −0.386 | 0.096 | 6.928 |
| −0.388 | 0.097 | 6.928 |
| −0.391 | 0.097 | 6.928 |
| −0.393 | 0.097 | 6.928 |
| −0.401 | 0.099 | 6.928 |
| −0.409 | 0.100 | 6.928 |
| −0.416 | 0.103 | 6.928 |
| −0.423 | 0.106 | 6.928 |
| −0.430 | 0.110 | 6.928 |
| −0.437 | 0.115 | 6.928 |
| −0.442 | 0.120 | 6.928 |
| −0.447 | 0.126 | 6.928 |
| −0.452 | 0.133 | 6.928 |
| −0.455 | 0.140 | 6.928 |
| −0.458 | 0.147 | 6.928 |
| −0.460 | 0.155 | 6.928 |
| −0.461 | 0.163 | 6.928 |
| −0.461 | 0.170 | 6.928 |
| −0.460 | 0.178 | 6.928 |
| −0.459 | 0.186 | 6.928 |
| −0.457 | 0.194 | 6.928 |
| −0.454 | 0.201 | 6.928 |

SECTION 8

| X | Y | Z |
|---|---|---|
| −0.424 | 0.257 | 7.120 |
| −0.422 | 0.259 | 7.120 |
| −0.420 | 0.262 | 7.120 |
| −0.418 | 0.265 | 7.120 |
| −0.416 | 0.267 | 7.120 |
| −0.414 | 0.270 | 7.120 |
| −0.412 | 0.272 | 7.120 |
| −0.410 | 0.275 | 7.120 |
| −0.408 | 0.277 | 7.120 |
| −0.405 | 0.279 | 7.120 |
| −0.403 | 0.282 | 7.120 |
| −0.391 | 0.293 | 7.120 |
| −0.378 | 0.303 | 7.120 |
| −0.365 | 0.312 | 7.120 |
| −0.350 | 0.319 | 7.120 |
| −0.335 | 0.326 | 7.120 |
| −0.320 | 0.331 | 7.120 |
| −0.304 | 0.335 | 7.120 |
| −0.288 | 0.338 | 7.120 |
| −0.272 | 0.339 | 7.120 |
| −0.255 | 0.340 | 7.120 |
| −0.239 | 0.339 | 7.120 |
| −0.223 | 0.337 | 7.120 |
| −0.207 | 0.334 | 7.120 |
| −0.191 | 0.330 | 7.120 |
| −0.176 | 0.325 | 7.120 |
| −0.160 | 0.319 | 7.120 |
| −0.145 | 0.313 | 7.120 |
| −0.131 | 0.306 | 7.120 |
| −0.116 | 0.298 | 7.120 |
| −0.102 | 0.290 | 7.120 |
| −0.088 | 0.281 | 7.120 |
| −0.075 | 0.272 | 7.120 |
| −0.062 | 0.262 | 7.120 |
| −0.049 | 0.252 | 7.120 |
| −0.036 | 0.242 | 7.120 |
| −0.024 | 0.231 | 7.120 |
| −0.012 | 0.220 | 7.120 |
| 0.000 | 0.209 | 7.120 |
| 0.011 | 0.198 | 7.120 |
| 0.023 | 0.186 | 7.120 |
| 0.034 | 0.174 | 7.120 |
| 0.045 | 0.162 | 7.120 |
| 0.056 | 0.150 | 7.120 |
| 0.066 | 0.137 | 7.120 |
| 0.077 | 0.125 | 7.120 |
| 0.087 | 0.112 | 7.120 |
| 0.097 | 0.100 | 7.120 |
| 0.107 | 0.087 | 7.120 |
| 0.117 | 0.074 | 7.120 |
| 0.127 | 0.061 | 7.120 |
| 0.137 | 0.048 | 7.120 |
| 0.146 | 0.035 | 7.120 |
| 0.156 | 0.021 | 7.120 |
| 0.165 | 0.008 | 7.120 |
| 0.175 | −0.006 | 7.120 |

TABLE 2-continued

| X | Y | Z |
|---|---|---|
| 0.184 | −0.019 | 7.120 |
| 0.193 | −0.033 | 7.120 |
| 0.201 | −0.046 | 7.120 |
| 0.210 | −0.060 | 7.120 |
| 0.219 | −0.074 | 7.120 |
| 0.228 | −0.088 | 7.120 |
| 0.236 | −0.102 | 7.120 |
| 0.245 | −0.116 | 7.120 |
| 0.253 | −0.130 | 7.120 |
| 0.261 | −0.144 | 7.120 |
| 0.269 | −0.158 | 7.120 |
| 0.278 | −0.172 | 7.120 |
| 0.286 | −0.186 | 7.120 |
| 0.294 | −0.200 | 7.120 |
| 0.302 | −0.214 | 7.120 |
| 0.310 | −0.229 | 7.120 |
| 0.318 | −0.243 | 7.120 |
| 0.326 | −0.257 | 7.120 |
| 0.333 | −0.271 | 7.120 |
| 0.341 | −0.286 | 7.120 |
| 0.349 | −0.300 | 7.120 |
| 0.357 | −0.314 | 7.120 |
| 0.365 | −0.329 | 7.120 |
| 0.372 | −0.343 | 7.120 |
| 0.380 | −0.357 | 7.120 |
| 0.388 | −0.372 | 7.120 |
| 0.395 | −0.386 | 7.120 |
| 0.402 | −0.401 | 7.120 |
| 0.409 | −0.416 | 7.120 |
| 0.416 | −0.431 | 7.120 |
| 0.422 | −0.445 | 7.120 |
| 0.429 | −0.460 | 7.120 |
| 0.436 | −0.475 | 7.120 |
| 0.443 | −0.490 | 7.120 |
| 0.445 | −0.493 | 7.120 |
| 0.446 | −0.496 | 7.120 |
| 0.447 | −0.499 | 7.120 |
| 0.449 | −0.502 | 7.120 |
| 0.450 | −0.505 | 7.120 |
| 0.451 | −0.508 | 7.120 |
| 0.453 | −0.511 | 7.120 |
| 0.454 | −0.514 | 7.120 |
| 0.455 | −0.517 | 7.120 |
| 0.456 | −0.520 | 7.120 |
| 0.458 | −0.522 | 7.120 |
| 0.458 | −0.525 | 7.120 |
| 0.459 | −0.528 | 7.120 |
| 0.459 | −0.530 | 7.120 |
| 0.458 | −0.533 | 7.120 |
| 0.457 | −0.536 | 7.120 |
| 0.455 | −0.538 | 7.120 |
| 0.453 | −0.540 | 7.120 |
| 0.451 | −0.542 | 7.120 |
| 0.449 | −0.543 | 7.120 |
| 0.446 | −0.544 | 7.120 |
| 0.444 | −0.545 | 7.120 |
| 0.441 | −0.545 | 7.120 |
| 0.438 | −0.545 | 7.120 |
| 0.435 | −0.545 | 7.120 |
| 0.433 | −0.544 | 7.120 |
| 0.430 | −0.543 | 7.120 |
| 0.428 | −0.541 | 7.120 |
| 0.426 | −0.539 | 7.120 |
| 0.424 | −0.537 | 7.120 |
| 0.423 | −0.535 | 7.120 |
| 0.421 | −0.533 | 7.120 |
| 0.420 | −0.531 | 7.120 |
| 0.418 | −0.529 | 7.120 |
| 0.416 | −0.527 | 7.120 |
| 0.415 | −0.525 | 7.120 |
| 0.413 | −0.523 | 7.120 |
| 0.412 | −0.521 | 7.120 |
| 0.410 | −0.519 | 7.120 |
| 0.402 | −0.509 | 7.120 |
| 0.394 | −0.499 | 7.120 |
| 0.385 | −0.489 | 7.120 |
| 0.377 | −0.479 | 7.120 |
| 0.369 | −0.470 | 7.120 |

TABLE 2-continued

| X | Y | Z |
|---|---|---|
| 0.360 | −0.460 | 7.120 |
| 0.351 | −0.451 | 7.120 |
| 0.343 | −0.441 | 7.120 |
| 0.334 | −0.432 | 7.120 |
| 0.325 | −0.422 | 7.120 |
| 0.316 | −0.413 | 7.120 |
| 0.307 | −0.404 | 7.120 |
| 0.298 | −0.395 | 7.120 |
| 0.289 | −0.386 | 7.120 |
| 0.279 | −0.377 | 7.120 |
| 0.270 | −0.368 | 7.120 |
| 0.260 | −0.360 | 7.120 |
| 0.251 | −0.351 | 7.120 |
| 0.241 | −0.342 | 7.120 |
| 0.232 | −0.333 | 7.120 |
| 0.223 | −0.324 | 7.120 |
| 0.214 | −0.315 | 7.120 |
| 0.205 | −0.306 | 7.120 |
| 0.195 | −0.297 | 7.120 |
| 0.186 | −0.288 | 7.120 |
| 0.177 | −0.279 | 7.120 |
| 0.167 | −0.271 | 7.120 |
| 0.158 | −0.262 | 7.120 |
| 0.149 | −0.253 | 7.120 |
| 0.139 | −0.244 | 7.120 |
| 0.130 | −0.235 | 7.120 |
| 0.120 | −0.227 | 7.120 |
| 0.111 | −0.218 | 7.120 |
| 0.101 | −0.209 | 7.120 |
| 0.092 | −0.201 | 7.120 |
| 0.082 | −0.192 | 7.120 |
| 0.073 | −0.183 | 7.120 |
| 0.063 | −0.175 | 7.120 |
| 0.054 | −0.166 | 7.120 |
| 0.044 | −0.157 | 7.120 |
| 0.034 | −0.149 | 7.120 |
| 0.025 | −0.140 | 7.120 |
| 0.015 | −0.132 | 7.120 |
| 0.005 | −0.123 | 7.120 |
| −0.004 | −0.115 | 7.120 |
| −0.014 | −0.106 | 7.120 |
| −0.024 | −0.098 | 7.120 |
| −0.034 | −0.090 | 7.120 |
| −0.043 | −0.081 | 7.120 |
| −0.053 | −0.073 | 7.120 |
| −0.063 | −0.065 | 7.120 |
| −0.073 | −0.056 | 7.120 |
| −0.083 | −0.048 | 7.120 |
| −0.093 | −0.040 | 7.120 |
| −0.103 | −0.032 | 7.120 |
| −0.113 | −0.024 | 7.120 |
| −0.123 | −0.016 | 7.120 |
| −0.133 | −0.008 | 7.120 |
| −0.143 | 0.000 | 7.120 |
| −0.153 | 0.008 | 7.120 |
| −0.163 | 0.016 | 7.120 |
| −0.173 | 0.024 | 7.120 |
| −0.184 | 0.032 | 7.120 |
| −0.194 | 0.040 | 7.120 |
| −0.204 | 0.047 | 7.120 |
| −0.215 | 0.055 | 7.120 |
| −0.225 | 0.062 | 7.120 |
| −0.236 | 0.070 | 7.120 |
| −0.246 | 0.077 | 7.120 |
| −0.257 | 0.084 | 7.120 |
| −0.268 | 0.092 | 7.120 |
| −0.278 | 0.099 | 7.120 |
| −0.289 | 0.106 | 7.120 |
| −0.300 | 0.112 | 7.120 |
| −0.311 | 0.119 | 7.120 |
| −0.323 | 0.125 | 7.120 |
| −0.334 | 0.131 | 7.120 |
| −0.346 | 0.136 | 7.120 |
| −0.358 | 0.141 | 7.120 |
| −0.360 | 0.142 | 7.120 |
| −0.363 | 0.142 | 7.120 |
| −0.365 | 0.143 | 7.120 |
| −0.368 | 0.144 | 7.120 |

TABLE 2-continued

| X | Y | Z |
|---|---|---|
| −0.370 | 0.145 | 7.120 |
| −0.372 | 0.146 | 7.120 |
| −0.375 | 0.146 | 7.120 |
| −0.377 | 0.147 | 7.120 |
| −0.380 | 0.148 | 7.120 |
| −0.382 | 0.148 | 7.120 |
| −0.390 | 0.150 | 7.120 |
| −0.397 | 0.152 | 7.120 |
| −0.404 | 0.155 | 7.120 |
| −0.410 | 0.159 | 7.120 |
| −0.416 | 0.163 | 7.120 |
| −0.422 | 0.168 | 7.120 |
| −0.426 | 0.173 | 7.120 |
| −0.431 | 0.180 | 7.120 |
| −0.434 | 0.186 | 7.120 |
| −0.436 | 0.193 | 7.120 |
| −0.438 | 0.200 | 7.120 |
| −0.439 | 0.208 | 7.120 |
| −0.439 | 0.215 | 7.120 |
| −0.438 | 0.223 | 7.120 |
| −0.436 | 0.230 | 7.120 |
| −0.434 | 0.237 | 7.120 |
| −0.431 | 0.244 | 7.120 |
| −0.428 | 0.250 | 7.120 |

SECTION 9

| X | Y | Z |
|---|---|---|
| −0.408 | 0.317 | 7.312 |
| −0.407 | 0.320 | 7.312 |
| −0.405 | 0.323 | 7.312 |
| −0.403 | 0.325 | 7.312 |
| −0.401 | 0.328 | 7.312 |
| −0.399 | 0.330 | 7.312 |
| −0.397 | 0.332 | 7.312 |
| −0.394 | 0.335 | 7.312 |
| −0.392 | 0.337 | 7.312 |
| −0.390 | 0.339 | 7.312 |
| −0.388 | 0.342 | 7.312 |
| −0.375 | 0.352 | 7.312 |
| −0.362 | 0.361 | 7.312 |
| −0.348 | 0.368 | 7.312 |
| −0.333 | 0.374 | 7.312 |
| −0.317 | 0.378 | 7.312 |
| −0.302 | 0.381 | 7.312 |
| −0.286 | 0.382 | 7.312 |
| −0.270 | 0.382 | 7.312 |
| −0.254 | 0.381 | 7.312 |
| −0.238 | 0.378 | 7.312 |
| −0.222 | 0.374 | 7.312 |
| −0.207 | 0.369 | 7.312 |
| −0.192 | 0.364 | 7.312 |
| −0.177 | 0.357 | 7.312 |
| −0.163 | 0.350 | 7.312 |
| −0.149 | 0.342 | 7.312 |
| −0.135 | 0.334 | 7.312 |
| −0.122 | 0.325 | 7.312 |
| −0.109 | 0.315 | 7.312 |
| −0.097 | 0.306 | 7.312 |
| −0.084 | 0.295 | 7.312 |
| −0.072 | 0.285 | 7.312 |
| −0.060 | 0.274 | 7.312 |
| −0.049 | 0.263 | 7.312 |
| −0.038 | 0.252 | 7.312 |
| −0.026 | 0.240 | 7.312 |
| −0.016 | 0.228 | 7.312 |
| −0.005 | 0.216 | 7.312 |
| 0.006 | 0.204 | 7.312 |
| 0.016 | 0.192 | 7.312 |
| 0.026 | 0.180 | 7.312 |
| 0.036 | 0.167 | 7.312 |
| 0.046 | 0.155 | 7.312 |
| 0.056 | 0.142 | 7.312 |
| 0.065 | 0.129 | 7.312 |
| 0.075 | 0.116 | 7.312 |
| 0.084 | 0.103 | 7.312 |
| 0.094 | 0.090 | 7.312 |
| 0.103 | 0.077 | 7.312 |
| 0.112 | 0.064 | 7.312 |
| 0.121 | 0.051 | 7.312 |

TABLE 2-continued

| X | Y | Z |
|---|---|---|
| 0.130 | 0.038 | 7.312 |
| 0.139 | 0.024 | 7.312 |
| 0.148 | 0.011 | 7.312 |
| 0.157 | −0.002 | 7.312 |
| 0.165 | −0.016 | 7.312 |
| 0.174 | −0.029 | 7.312 |
| 0.182 | −0.043 | 7.312 |
| 0.191 | −0.057 | 7.312 |
| 0.199 | −0.070 | 7.312 |
| 0.207 | −0.084 | 7.312 |
| 0.215 | −0.098 | 7.312 |
| 0.223 | −0.112 | 7.312 |
| 0.231 | −0.126 | 7.312 |
| 0.239 | −0.140 | 7.312 |
| 0.247 | −0.153 | 7.312 |
| 0.255 | −0.167 | 7.312 |
| 0.263 | −0.181 | 7.312 |
| 0.271 | −0.195 | 7.312 |
| 0.278 | −0.209 | 7.312 |
| 0.286 | −0.224 | 7.312 |
| 0.294 | −0.238 | 7.312 |
| 0.301 | −0.252 | 7.312 |
| 0.309 | −0.266 | 7.312 |
| 0.317 | −0.280 | 7.312 |
| 0.324 | −0.294 | 7.312 |
| 0.332 | −0.308 | 7.312 |
| 0.339 | −0.322 | 7.312 |
| 0.347 | −0.336 | 7.312 |
| 0.354 | −0.350 | 7.312 |
| 0.362 | −0.365 | 7.312 |
| 0.369 | −0.379 | 7.312 |
| 0.376 | −0.393 | 7.312 |
| 0.382 | −0.408 | 7.312 |
| 0.389 | −0.423 | 7.312 |
| 0.396 | −0.437 | 7.312 |
| 0.402 | −0.452 | 7.312 |
| 0.409 | −0.466 | 7.312 |
| 0.416 | −0.481 | 7.312 |
| 0.418 | −0.483 | 7.312 |
| 0.419 | −0.486 | 7.312 |
| 0.420 | −0.489 | 7.312 |
| 0.422 | −0.492 | 7.312 |
| 0.423 | −0.495 | 7.312 |
| 0.424 | −0.498 | 7.312 |
| 0.425 | −0.501 | 7.312 |
| 0.426 | −0.504 | 7.312 |
| 0.428 | −0.507 | 7.312 |
| 0.429 | −0.510 | 7.312 |
| 0.430 | −0.512 | 7.312 |
| 0.431 | −0.515 | 7.312 |
| 0.431 | −0.518 | 7.312 |
| 0.431 | −0.521 | 7.312 |
| 0.430 | −0.523 | 7.312 |
| 0.429 | −0.526 | 7.312 |
| 0.428 | −0.528 | 7.312 |
| 0.426 | −0.530 | 7.312 |
| 0.424 | −0.532 | 7.312 |
| 0.421 | −0.534 | 7.312 |
| 0.419 | −0.535 | 7.312 |
| 0.416 | −0.535 | 7.312 |
| 0.414 | −0.536 | 7.312 |
| 0.411 | −0.536 | 7.312 |
| 0.408 | −0.535 | 7.312 |
| 0.405 | −0.534 | 7.312 |
| 0.403 | −0.533 | 7.312 |
| 0.401 | −0.531 | 7.312 |
| 0.399 | −0.529 | 7.312 |
| 0.397 | −0.527 | 7.312 |
| 0.395 | −0.525 | 7.312 |
| 0.394 | −0.523 | 7.312 |
| 0.392 | −0.521 | 7.312 |
| 0.391 | −0.519 | 7.312 |
| 0.389 | −0.517 | 7.312 |
| 0.388 | −0.515 | 7.312 |
| 0.386 | −0.513 | 7.312 |
| 0.384 | −0.511 | 7.312 |
| 0.383 | −0.509 | 7.312 |
| 0.375 | −0.498 | 7.312 |

TABLE 2-continued

| X | Y | Z |
|---|---|---|
| 0.366 | −0.488 | 7.312 |
| 0.358 | −0.478 | 7.312 |
| 0.350 | −0.468 | 7.312 |
| 0.341 | −0.458 | 7.312 |
| 0.333 | −0.448 | 7.312 |
| 0.324 | −0.438 | 7.312 |
| 0.316 | −0.428 | 7.312 |
| 0.307 | −0.419 | 7.312 |
| 0.298 | −0.409 | 7.312 |
| 0.289 | −0.399 | 7.312 |
| 0.280 | −0.390 | 7.312 |
| 0.271 | −0.381 | 7.312 |
| 0.262 | −0.371 | 7.312 |
| 0.253 | −0.362 | 7.312 |
| 0.243 | −0.353 | 7.312 |
| 0.234 | −0.344 | 7.312 |
| 0.225 | −0.334 | 7.312 |
| 0.216 | −0.325 | 7.312 |
| 0.207 | −0.315 | 7.312 |
| 0.198 | −0.306 | 7.312 |
| 0.189 | −0.296 | 7.312 |
| 0.180 | −0.287 | 7.312 |
| 0.171 | −0.277 | 7.312 |
| 0.162 | −0.268 | 7.312 |
| 0.153 | −0.259 | 7.312 |
| 0.144 | −0.249 | 7.312 |
| 0.135 | −0.240 | 7.312 |
| 0.126 | −0.230 | 7.312 |
| 0.116 | −0.221 | 7.312 |
| 0.107 | −0.212 | 7.312 |
| 0.098 | −0.202 | 7.312 |
| 0.089 | −0.193 | 7.312 |
| 0.080 | −0.184 | 7.312 |
| 0.071 | −0.174 | 7.312 |
| 0.062 | −0.165 | 7.312 |
| 0.052 | −0.156 | 7.312 |
| 0.043 | −0.146 | 7.312 |
| 0.034 | −0.137 | 7.312 |
| 0.025 | −0.128 | 7.312 |
| 0.016 | −0.118 | 7.312 |
| 0.006 | −0.109 | 7.312 |
| −0.003 | −0.100 | 7.312 |
| −0.012 | −0.091 | 7.312 |
| −0.021 | −0.082 | 7.312 |
| −0.031 | −0.072 | 7.312 |
| −0.040 | −0.063 | 7.312 |
| −0.049 | −0.054 | 7.312 |
| −0.059 | −0.045 | 7.312 |
| −0.068 | −0.036 | 7.312 |
| −0.077 | −0.027 | 7.312 |
| −0.087 | −0.018 | 7.312 |
| −0.096 | −0.008 | 7.312 |
| −0.106 | 0.001 | 7.312 |
| −0.115 | 0.010 | 7.312 |
| −0.125 | 0.019 | 7.312 |
| −0.134 | 0.028 | 7.312 |
| −0.144 | 0.037 | 7.312 |
| −0.153 | 0.046 | 7.312 |
| −0.163 | 0.055 | 7.312 |
| −0.172 | 0.064 | 7.312 |
| −0.182 | 0.072 | 7.312 |
| −0.191 | 0.081 | 7.312 |
| −0.201 | 0.090 | 7.312 |
| −0.211 | 0.099 | 7.312 |
| −0.221 | 0.107 | 7.312 |
| −0.230 | 0.116 | 7.312 |
| −0.240 | 0.125 | 7.312 |
| −0.250 | 0.133 | 7.312 |
| −0.260 | 0.142 | 7.312 |
| −0.270 | 0.150 | 7.312 |
| −0.280 | 0.159 | 7.312 |
| −0.290 | 0.167 | 7.312 |
| −0.300 | 0.175 | 7.312 |
| −0.311 | 0.183 | 7.312 |
| −0.321 | 0.190 | 7.312 |
| −0.332 | 0.198 | 7.312 |
| −0.344 | 0.204 | 7.312 |
| −0.355 | 0.211 | 7.312 |
| −0.357 | 0.212 | 7.312 |
| −0.360 | 0.213 | 7.312 |
| −0.362 | 0.215 | 7.312 |
| −0.364 | 0.216 | 7.312 |
| −0.367 | 0.217 | 7.312 |
| −0.369 | 0.218 | 7.312 |
| −0.371 | 0.219 | 7.312 |
| −0.374 | 0.220 | 7.312 |
| −0.376 | 0.221 | 7.312 |
| −0.378 | 0.222 | 7.312 |
| −0.384 | 0.224 | 7.312 |
| −0.390 | 0.226 | 7.312 |
| −0.396 | 0.229 | 7.312 |
| −0.401 | 0.232 | 7.312 |
| −0.406 | 0.237 | 7.312 |
| −0.411 | 0.241 | 7.312 |
| −0.414 | 0.246 | 7.312 |
| −0.418 | 0.252 | 7.312 |
| −0.420 | 0.258 | 7.312 |
| −0.422 | 0.264 | 7.312 |
| −0.423 | 0.270 | 7.312 |
| −0.423 | 0.276 | 7.312 |
| −0.422 | 0.282 | 7.312 |
| −0.421 | 0.289 | 7.312 |
| −0.420 | 0.295 | 7.312 |
| −0.418 | 0.301 | 7.312 |
| −0.415 | 0.307 | 7.312 |
| −0.412 | 0.312 | 7.312 |
| SECTION 10 | | |
| −0.394 | 0.382 | 7.504 |
| −0.393 | 0.384 | 7.504 |
| −0.391 | 0.387 | 7.504 |
| −0.389 | 0.389 | 7.504 |
| −0.387 | 0.392 | 7.504 |
| −0.384 | 0.394 | 7.504 |
| −0.382 | 0.396 | 7.504 |
| −0.380 | 0.398 | 7.504 |
| −0.378 | 0.401 | 7.504 |
| −0.375 | 0.403 | 7.504 |
| −0.373 | 0.405 | 7.504 |
| −0.360 | 0.414 | 7.504 |
| −0.346 | 0.421 | 7.504 |
| −0.331 | 0.427 | 7.504 |
| −0.316 | 0.431 | 7.504 |
| −0.301 | 0.433 | 7.504 |
| −0.285 | 0.433 | 7.504 |
| −0.269 | 0.431 | 7.504 |
| −0.254 | 0.428 | 7.504 |
| −0.239 | 0.423 | 7.504 |
| −0.224 | 0.417 | 7.504 |
| −0.210 | 0.411 | 7.504 |
| −0.196 | 0.403 | 7.504 |
| −0.182 | 0.395 | 7.504 |
| −0.169 | 0.386 | 7.504 |
| −0.156 | 0.377 | 7.504 |
| −0.144 | 0.367 | 7.504 |
| −0.132 | 0.357 | 7.504 |
| −0.120 | 0.346 | 7.504 |
| −0.109 | 0.336 | 7.504 |
| −0.098 | 0.325 | 7.504 |
| −0.087 | 0.313 | 7.504 |
| −0.076 | 0.302 | 7.504 |
| −0.065 | 0.290 | 7.504 |
| −0.055 | 0.278 | 7.504 |
| −0.045 | 0.266 | 7.504 |
| −0.035 | 0.254 | 7.504 |
| −0.025 | 0.241 | 7.504 |
| −0.016 | 0.229 | 7.504 |
| −0.006 | 0.216 | 7.504 |
| 0.003 | 0.203 | 7.504 |
| 0.012 | 0.191 | 7.504 |
| 0.022 | 0.178 | 7.504 |
| 0.031 | 0.165 | 7.504 |
| 0.039 | 0.152 | 7.504 |
| 0.048 | 0.139 | 7.504 |
| 0.057 | 0.126 | 7.504 |
| 0.066 | 0.112 | 7.504 |

TABLE 2-continued

| X | Y | Z |
|---|---|---|
| 0.074 | 0.099 | 7.504 |
| 0.083 | 0.086 | 7.504 |
| 0.091 | 0.073 | 7.504 |
| 0.100 | 0.059 | 7.504 |
| 0.108 | 0.046 | 7.504 |
| 0.116 | 0.033 | 7.504 |
| 0.125 | 0.019 | 7.504 |
| 0.133 | 0.006 | 7.504 |
| 0.141 | −0.008 | 7.504 |
| 0.149 | −0.022 | 7.504 |
| 0.157 | −0.035 | 7.504 |
| 0.165 | −0.049 | 7.504 |
| 0.173 | −0.062 | 7.504 |
| 0.181 | −0.076 | 7.504 |
| 0.188 | −0.090 | 7.504 |
| 0.196 | −0.103 | 7.504 |
| 0.204 | −0.117 | 7.504 |
| 0.212 | −0.131 | 7.504 |
| 0.219 | −0.145 | 7.504 |
| 0.227 | −0.158 | 7.504 |
| 0.235 | −0.172 | 7.504 |
| 0.242 | −0.186 | 7.504 |
| 0.250 | −0.200 | 7.504 |
| 0.257 | −0.214 | 7.504 |
| 0.265 | −0.228 | 7.504 |
| 0.272 | −0.242 | 7.504 |
| 0.280 | −0.255 | 7.504 |
| 0.287 | −0.269 | 7.504 |
| 0.294 | −0.283 | 7.504 |
| 0.302 | −0.297 | 7.504 |
| 0.309 | −0.311 | 7.504 |
| 0.317 | −0.325 | 7.504 |
| 0.324 | −0.339 | 7.504 |
| 0.331 | −0.353 | 7.504 |
| 0.338 | −0.367 | 7.504 |
| 0.345 | −0.381 | 7.504 |
| 0.352 | −0.396 | 7.504 |
| 0.358 | −0.410 | 7.504 |
| 0.365 | −0.424 | 7.504 |
| 0.371 | −0.439 | 7.504 |
| 0.378 | −0.453 | 7.504 |
| 0.385 | −0.467 | 7.504 |
| 0.386 | −0.470 | 7.504 |
| 0.387 | −0.473 | 7.504 |
| 0.388 | −0.476 | 7.504 |
| 0.390 | −0.479 | 7.504 |
| 0.391 | −0.482 | 7.504 |
| 0.392 | −0.485 | 7.504 |
| 0.393 | −0.488 | 7.504 |
| 0.394 | −0.490 | 7.504 |
| 0.396 | −0.493 | 7.504 |
| 0.397 | −0.496 | 7.504 |
| 0.398 | −0.499 | 7.504 |
| 0.399 | −0.502 | 7.504 |
| 0.399 | −0.504 | 7.504 |
| 0.399 | −0.507 | 7.504 |
| 0.398 | −0.510 | 7.504 |
| 0.397 | −0.512 | 7.504 |
| 0.396 | −0.515 | 7.504 |
| 0.394 | −0.517 | 7.504 |
| 0.392 | −0.519 | 7.504 |
| 0.389 | −0.520 | 7.504 |
| 0.387 | −0.521 | 7.504 |
| 0.384 | −0.522 | 7.504 |
| 0.381 | −0.522 | 7.504 |
| 0.378 | −0.522 | 7.504 |
| 0.376 | −0.522 | 7.504 |
| 0.373 | −0.521 | 7.504 |
| 0.371 | −0.520 | 7.504 |
| 0.368 | −0.518 | 7.504 |
| 0.366 | −0.516 | 7.504 |
| 0.365 | −0.514 | 7.504 |
| 0.363 | −0.512 | 7.504 |
| 0.361 | −0.510 | 7.504 |
| 0.360 | −0.507 | 7.504 |
| 0.358 | −0.505 | 7.504 |
| 0.357 | −0.503 | 7.504 |
| 0.355 | −0.501 | 7.504 |
| 0.353 | −0.499 | 7.504 |
| 0.352 | −0.497 | 7.504 |
| 0.350 | −0.495 | 7.504 |
| 0.342 | −0.484 | 7.504 |
| 0.334 | −0.474 | 7.504 |
| 0.325 | −0.463 | 7.504 |
| 0.317 | −0.453 | 7.504 |
| 0.309 | −0.442 | 7.504 |
| 0.300 | −0.432 | 7.504 |
| 0.292 | −0.422 | 7.504 |
| 0.283 | −0.411 | 7.504 |
| 0.275 | −0.401 | 7.504 |
| 0.266 | −0.391 | 7.504 |
| 0.257 | −0.381 | 7.504 |
| 0.248 | −0.371 | 7.504 |
| 0.239 | −0.361 | 7.504 |
| 0.230 | −0.351 | 7.504 |
| 0.221 | −0.341 | 7.504 |
| 0.212 | −0.331 | 7.504 |
| 0.204 | −0.321 | 7.504 |
| 0.195 | −0.311 | 7.504 |
| 0.186 | −0.301 | 7.504 |
| 0.177 | −0.291 | 7.504 |
| 0.169 | −0.281 | 7.504 |
| 0.160 | −0.271 | 7.504 |
| 0.151 | −0.261 | 7.504 |
| 0.142 | −0.251 | 7.504 |
| 0.134 | −0.241 | 7.504 |
| 0.125 | −0.231 | 7.504 |
| 0.116 | −0.220 | 7.504 |
| 0.107 | −0.210 | 7.504 |
| 0.099 | −0.200 | 7.504 |
| 0.090 | −0.190 | 7.504 |
| 0.081 | −0.180 | 7.504 |
| 0.072 | −0.170 | 7.504 |
| 0.064 | −0.160 | 7.504 |
| 0.055 | −0.150 | 7.504 |
| 0.046 | −0.140 | 7.504 |
| 0.037 | −0.130 | 7.504 |
| 0.028 | −0.120 | 7.504 |
| 0.020 | −0.110 | 7.504 |
| 0.011 | −0.100 | 7.504 |
| 0.002 | −0.090 | 7.504 |
| −0.007 | −0.080 | 7.504 |
| −0.016 | −0.070 | 7.504 |
| −0.024 | −0.060 | 7.504 |
| −0.033 | −0.050 | 7.504 |
| −0.042 | −0.040 | 7.504 |
| −0.051 | −0.030 | 7.504 |
| −0.060 | −0.020 | 7.504 |
| −0.069 | −0.010 | 7.504 |
| −0.077 | 0.000 | 7.504 |
| −0.086 | 0.010 | 7.504 |
| −0.095 | 0.020 | 7.504 |
| −0.104 | 0.030 | 7.504 |
| −0.113 | 0.040 | 7.504 |
| −0.122 | 0.050 | 7.504 |
| −0.131 | 0.060 | 7.504 |
| −0.140 | 0.070 | 7.504 |
| −0.149 | 0.080 | 7.504 |
| −0.158 | 0.090 | 7.504 |
| −0.167 | 0.100 | 7.504 |
| −0.175 | 0.110 | 7.504 |
| −0.184 | 0.120 | 7.504 |
| −0.193 | 0.130 | 7.504 |
| −0.203 | 0.139 | 7.504 |
| −0.212 | 0.149 | 7.504 |
| −0.221 | 0.159 | 7.504 |
| −0.230 | 0.169 | 7.504 |
| −0.239 | 0.179 | 7.504 |
| −0.248 | 0.188 | 7.504 |
| −0.257 | 0.198 | 7.504 |
| −0.266 | 0.208 | 7.504 |
| −0.276 | 0.217 | 7.504 |
| −0.285 | 0.227 | 7.504 |
| −0.294 | 0.236 | 7.504 |
| −0.304 | 0.246 | 7.504 |
| −0.313 | 0.255 | 7.504 |

TABLE 2-continued

| X | Y | Z |
|---|---|---|
| −0.323 | 0.264 | 7.504 |
| −0.333 | 0.273 | 7.504 |
| −0.343 | 0.282 | 7.504 |
| −0.354 | 0.290 | 7.504 |
| −0.356 | 0.291 | 7.504 |
| −0.358 | 0.293 | 7.504 |
| −0.361 | 0.294 | 7.504 |
| −0.363 | 0.296 | 7.504 |
| −0.365 | 0.297 | 7.504 |
| −0.367 | 0.299 | 7.504 |
| −0.370 | 0.300 | 7.504 |
| −0.372 | 0.301 | 7.504 |
| −0.374 | 0.303 | 7.504 |
| −0.377 | 0.304 | 7.504 |
| −0.381 | 0.306 | 7.504 |
| −0.386 | 0.308 | 7.504 |
| −0.390 | 0.311 | 7.504 |
| −0.394 | 0.314 | 7.504 |
| −0.397 | 0.317 | 7.504 |
| −0.400 | 0.321 | 7.504 |
| −0.403 | 0.326 | 7.504 |
| −0.405 | 0.330 | 7.504 |
| −0.406 | 0.335 | 7.504 |
| −0.407 | 0.340 | 7.504 |
| −0.407 | 0.345 | 7.504 |
| −0.407 | 0.350 | 7.504 |
| −0.406 | 0.355 | 7.504 |
| −0.405 | 0.359 | 7.504 |
| −0.404 | 0.364 | 7.504 |
| −0.402 | 0.369 | 7.504 |
| −0.400 | 0.373 | 7.504 |
| −0.397 | 0.378 | 7.504 |

SECTION 11

| X | Y | Z |
|---|---|---|
| −0.363 | 0.435 | 7.696 |
| −0.361 | 0.437 | 7.696 |
| −0.359 | 0.439 | 7.696 |
| −0.357 | 0.441 | 7.696 |
| −0.354 | 0.443 | 7.696 |
| −0.352 | 0.445 | 7.696 |
| −0.349 | 0.446 | 7.696 |
| −0.346 | 0.448 | 7.696 |
| −0.344 | 0.449 | 7.696 |
| −0.341 | 0.451 | 7.696 |
| −0.338 | 0.452 | 7.696 |
| −0.324 | 0.458 | 7.696 |
| −0.310 | 0.461 | 7.696 |
| −0.295 | 0.461 | 7.696 |
| −0.280 | 0.460 | 7.696 |
| −0.265 | 0.457 | 7.696 |
| −0.250 | 0.453 | 7.696 |
| −0.237 | 0.447 | 7.696 |
| −0.223 | 0.440 | 7.696 |
| −0.210 | 0.432 | 7.696 |
| −0.198 | 0.424 | 7.696 |
| −0.186 | 0.415 | 7.696 |
| −0.174 | 0.405 | 7.696 |
| −0.163 | 0.395 | 7.696 |
| −0.152 | 0.385 | 7.696 |
| −0.141 | 0.374 | 7.696 |
| −0.131 | 0.363 | 7.696 |
| −0.121 | 0.352 | 7.696 |
| −0.111 | 0.340 | 7.696 |
| −0.101 | 0.329 | 7.696 |
| −0.092 | 0.317 | 7.696 |
| −0.083 | 0.305 | 7.696 |
| −0.073 | 0.293 | 7.696 |
| −0.064 | 0.281 | 7.696 |
| −0.056 | 0.269 | 7.696 |
| −0.047 | 0.257 | 7.696 |
| −0.038 | 0.244 | 7.696 |
| −0.030 | 0.232 | 7.696 |
| −0.021 | 0.219 | 7.696 |
| −0.013 | 0.207 | 7.696 |
| −0.005 | 0.194 | 7.696 |
| 0.003 | 0.181 | 7.696 |
| 0.011 | 0.169 | 7.696 |
| 0.019 | 0.156 | 7.696 |
| 0.027 | 0.143 | 7.696 |
| 0.035 | 0.130 | 7.696 |
| 0.043 | 0.117 | 7.696 |
| 0.051 | 0.104 | 7.696 |
| 0.058 | 0.091 | 7.696 |
| 0.066 | 0.078 | 7.696 |
| 0.074 | 0.065 | 7.696 |
| 0.081 | 0.052 | 7.696 |
| 0.089 | 0.039 | 7.696 |
| 0.096 | 0.026 | 7.696 |
| 0.104 | 0.013 | 7.696 |
| 0.111 | 0.000 | 7.696 |
| 0.119 | −0.013 | 7.696 |
| 0.126 | −0.026 | 7.696 |
| 0.133 | −0.039 | 7.696 |
| 0.141 | −0.052 | 7.696 |
| 0.148 | −0.066 | 7.696 |
| 0.156 | −0.079 | 7.696 |
| 0.163 | −0.092 | 7.696 |
| 0.170 | −0.105 | 7.696 |
| 0.178 | −0.118 | 7.696 |
| 0.185 | −0.132 | 7.696 |
| 0.192 | −0.145 | 7.696 |
| 0.199 | −0.158 | 7.696 |
| 0.207 | −0.171 | 7.696 |
| 0.214 | −0.184 | 7.696 |
| 0.221 | −0.198 | 7.696 |
| 0.228 | −0.211 | 7.696 |
| 0.235 | −0.224 | 7.696 |
| 0.242 | −0.238 | 7.696 |
| 0.249 | −0.251 | 7.696 |
| 0.257 | −0.264 | 7.696 |
| 0.264 | −0.277 | 7.696 |
| 0.271 | −0.291 | 7.696 |
| 0.278 | −0.304 | 7.696 |
| 0.285 | −0.317 | 7.696 |
| 0.292 | −0.331 | 7.696 |
| 0.299 | −0.344 | 7.696 |
| 0.305 | −0.358 | 7.696 |
| 0.312 | −0.371 | 7.696 |
| 0.318 | −0.385 | 7.696 |
| 0.324 | −0.399 | 7.696 |
| 0.331 | −0.412 | 7.696 |
| 0.337 | −0.426 | 7.696 |
| 0.343 | −0.440 | 7.696 |
| 0.350 | −0.453 | 7.696 |
| 0.351 | −0.456 | 7.696 |
| 0.352 | −0.459 | 7.696 |
| 0.354 | −0.462 | 7.696 |
| 0.355 | −0.464 | 7.696 |
| 0.356 | −0.467 | 7.696 |
| 0.357 | −0.470 | 7.696 |
| 0.358 | −0.473 | 7.696 |
| 0.359 | −0.476 | 7.696 |
| 0.361 | −0.478 | 7.696 |
| 0.362 | −0.481 | 7.696 |
| 0.363 | −0.484 | 7.696 |
| 0.364 | −0.486 | 7.696 |
| 0.364 | −0.489 | 7.696 |
| 0.364 | −0.492 | 7.696 |
| 0.363 | −0.495 | 7.696 |
| 0.362 | −0.498 | 7.696 |
| 0.360 | −0.500 | 7.696 |
| 0.358 | −0.502 | 7.696 |
| 0.356 | −0.504 | 7.696 |
| 0.354 | −0.506 | 7.696 |
| 0.351 | −0.507 | 7.696 |
| 0.348 | −0.508 | 7.696 |
| 0.345 | −0.508 | 7.696 |
| 0.343 | −0.508 | 7.696 |
| 0.340 | −0.507 | 7.696 |
| 0.337 | −0.506 | 7.696 |
| 0.334 | −0.505 | 7.696 |
| 0.332 | −0.504 | 7.696 |
| 0.330 | −0.501 | 7.696 |
| 0.328 | −0.499 | 7.696 |
| 0.327 | −0.497 | 7.696 |
| 0.325 | −0.495 | 7.696 |

TABLE 2-continued

| X | Y | Z |
|---|---|---|
| 0.323 | −0.493 | 7.696 |
| 0.322 | −0.491 | 7.696 |
| 0.320 | −0.489 | 7.696 |
| 0.319 | −0.486 | 7.696 |
| 0.317 | −0.484 | 7.696 |
| 0.315 | −0.482 | 7.696 |
| 0.314 | −0.480 | 7.696 |
| 0.306 | −0.469 | 7.696 |
| 0.297 | −0.459 | 7.696 |
| 0.289 | −0.448 | 7.696 |
| 0.281 | −0.437 | 7.696 |
| 0.273 | −0.427 | 7.696 |
| 0.265 | −0.416 | 7.696 |
| 0.256 | −0.405 | 7.696 |
| 0.248 | −0.395 | 7.696 |
| 0.240 | −0.384 | 7.696 |
| 0.231 | −0.374 | 7.696 |
| 0.223 | −0.364 | 7.696 |
| 0.214 | −0.353 | 7.696 |
| 0.205 | −0.343 | 7.696 |
| 0.196 | −0.333 | 7.696 |
| 0.187 | −0.323 | 7.696 |
| 0.179 | −0.313 | 7.696 |
| 0.170 | −0.303 | 7.696 |
| 0.161 | −0.292 | 7.696 |
| 0.153 | −0.282 | 7.696 |
| 0.145 | −0.271 | 7.696 |
| 0.136 | −0.261 | 7.696 |
| 0.128 | −0.250 | 7.696 |
| 0.120 | −0.240 | 7.696 |
| 0.111 | −0.229 | 7.696 |
| 0.103 | −0.219 | 7.696 |
| 0.094 | −0.208 | 7.696 |
| 0.086 | −0.198 | 7.696 |
| 0.077 | −0.187 | 7.696 |
| 0.069 | −0.177 | 7.696 |
| 0.061 | −0.167 | 7.696 |
| 0.052 | −0.156 | 7.696 |
| 0.044 | −0.146 | 7.696 |
| 0.035 | −0.135 | 7.696 |
| 0.027 | −0.125 | 7.696 |
| 0.019 | −0.114 | 7.696 |
| 0.010 | −0.104 | 7.696 |
| 0.002 | −0.093 | 7.696 |
| −0.007 | −0.083 | 7.696 |
| −0.015 | −0.072 | 7.696 |
| −0.023 | −0.062 | 7.696 |
| −0.032 | −0.051 | 7.696 |
| −0.040 | −0.041 | 7.696 |
| −0.048 | −0.030 | 7.696 |
| −0.057 | −0.020 | 7.696 |
| −0.065 | −0.009 | 7.696 |
| −0.073 | 0.001 | 7.696 |
| −0.082 | 0.012 | 7.696 |
| −0.090 | 0.022 | 7.696 |
| −0.099 | 0.033 | 7.696 |
| −0.107 | 0.043 | 7.696 |
| −0.115 | 0.054 | 7.696 |
| −0.124 | 0.065 | 7.696 |
| −0.132 | 0.075 | 7.696 |
| −0.140 | 0.086 | 7.696 |
| −0.148 | 0.096 | 7.696 |
| −0.157 | 0.107 | 7.696 |
| −0.165 | 0.117 | 7.696 |
| −0.173 | 0.128 | 7.696 |
| −0.182 | 0.138 | 7.696 |
| −0.190 | 0.149 | 7.696 |
| −0.198 | 0.160 | 7.696 |
| −0.207 | 0.170 | 7.696 |
| −0.215 | 0.181 | 7.696 |
| −0.223 | 0.191 | 7.696 |
| −0.232 | 0.202 | 7.696 |
| −0.240 | 0.212 | 7.696 |
| −0.248 | 0.223 | 7.696 |
| −0.257 | 0.233 | 7.696 |
| −0.265 | 0.244 | 7.696 |
| −0.273 | 0.254 | 7.696 |
| −0.282 | 0.265 | 7.696 |
| −0.290 | 0.275 | 7.696 |
| −0.298 | 0.286 | 7.696 |
| −0.307 | 0.296 | 7.696 |
| −0.315 | 0.307 | 7.696 |
| −0.324 | 0.317 | 7.696 |
| −0.332 | 0.327 | 7.696 |
| −0.341 | 0.337 | 7.696 |
| −0.351 | 0.347 | 7.696 |
| −0.353 | 0.349 | 7.696 |
| −0.354 | 0.351 | 7.696 |
| −0.356 | 0.353 | 7.696 |
| −0.358 | 0.355 | 7.696 |
| −0.360 | 0.357 | 7.696 |
| −0.362 | 0.358 | 7.696 |
| −0.364 | 0.360 | 7.696 |
| −0.366 | 0.362 | 7.696 |
| −0.368 | 0.364 | 7.696 |
| −0.370 | 0.366 | 7.696 |
| −0.373 | 0.369 | 7.696 |
| −0.376 | 0.372 | 7.696 |
| −0.379 | 0.375 | 7.696 |
| −0.381 | 0.379 | 7.696 |
| −0.383 | 0.383 | 7.696 |
| −0.384 | 0.387 | 7.696 |
| −0.385 | 0.391 | 7.696 |
| −0.386 | 0.395 | 7.696 |
| −0.385 | 0.400 | 7.696 |
| −0.385 | 0.404 | 7.696 |
| −0.384 | 0.408 | 7.696 |
| −0.382 | 0.412 | 7.696 |
| −0.381 | 0.416 | 7.696 |
| −0.378 | 0.420 | 7.696 |
| −0.376 | 0.423 | 7.696 |
| −0.373 | 0.427 | 7.696 |
| −0.370 | 0.430 | 7.696 |
| −0.367 | 0.433 | 7.696 |

SECTION 12

| X | Y | Z |
|---|---|---|
| −0.330 | 0.462 | 7.823 |
| −0.327 | 0.463 | 7.823 |
| −0.324 | 0.464 | 7.823 |
| −0.322 | 0.465 | 7.823 |
| −0.319 | 0.466 | 7.823 |
| −0.316 | 0.466 | 7.823 |
| −0.313 | 0.467 | 7.823 |
| −0.311 | 0.468 | 7.823 |
| −0.308 | 0.468 | 7.823 |
| −0.305 | 0.468 | 7.823 |
| −0.302 | 0.469 | 7.823 |
| −0.288 | 0.468 | 7.823 |
| −0.274 | 0.466 | 7.823 |
| −0.260 | 0.462 | 7.823 |
| −0.246 | 0.456 | 7.823 |
| −0.234 | 0.450 | 7.823 |
| −0.221 | 0.442 | 7.823 |
| −0.210 | 0.434 | 7.823 |
| −0.198 | 0.425 | 7.823 |
| −0.188 | 0.416 | 7.823 |
| −0.177 | 0.406 | 7.823 |
| −0.167 | 0.396 | 7.823 |
| −0.157 | 0.385 | 7.823 |
| −0.148 | 0.375 | 7.823 |
| −0.138 | 0.364 | 7.823 |
| −0.129 | 0.353 | 7.823 |
| −0.120 | 0.342 | 7.823 |
| −0.111 | 0.330 | 7.823 |
| −0.102 | 0.319 | 7.823 |
| −0.094 | 0.307 | 7.823 |
| −0.086 | 0.296 | 7.823 |
| −0.077 | 0.284 | 7.823 |
| −0.069 | 0.272 | 7.823 |
| −0.061 | 0.260 | 7.823 |
| −0.054 | 0.248 | 7.823 |
| −0.046 | 0.236 | 7.823 |
| −0.038 | 0.224 | 7.823 |
| −0.031 | 0.211 | 7.823 |
| −0.023 | 0.199 | 7.823 |
| −0.016 | 0.187 | 7.823 |

TABLE 2-continued

| X | Y | Z |
|---|---|---|
| −0.008 | 0.175 | 7.823 |
| −0.001 | 0.162 | 7.823 |
| 0.007 | 0.150 | 7.823 |
| 0.014 | 0.138 | 7.823 |
| 0.021 | 0.125 | 7.823 |
| 0.028 | 0.113 | 7.823 |
| 0.036 | 0.100 | 7.823 |
| 0.043 | 0.088 | 7.823 |
| 0.050 | 0.075 | 7.823 |
| 0.057 | 0.063 | 7.823 |
| 0.064 | 0.050 | 7.823 |
| 0.071 | 0.038 | 7.823 |
| 0.078 | 0.025 | 7.823 |
| 0.085 | 0.013 | 7.823 |
| 0.092 | 0.000 | 7.823 |
| 0.099 | −0.012 | 7.823 |
| 0.106 | −0.025 | 7.823 |
| 0.113 | −0.037 | 7.823 |
| 0.120 | −0.050 | 7.823 |
| 0.127 | −0.063 | 7.823 |
| 0.134 | −0.075 | 7.823 |
| 0.141 | −0.088 | 7.823 |
| 0.147 | −0.100 | 7.823 |
| 0.154 | −0.113 | 7.823 |
| 0.161 | −0.126 | 7.823 |
| 0.168 | −0.138 | 7.823 |
| 0.175 | −0.151 | 7.823 |
| 0.182 | −0.163 | 7.823 |
| 0.189 | −0.176 | 7.823 |
| 0.196 | −0.189 | 7.823 |
| 0.202 | −0.201 | 7.823 |
| 0.209 | −0.214 | 7.823 |
| 0.216 | −0.227 | 7.823 |
| 0.223 | −0.239 | 7.823 |
| 0.230 | −0.252 | 7.823 |
| 0.236 | −0.265 | 7.823 |
| 0.243 | −0.277 | 7.823 |
| 0.250 | −0.290 | 7.823 |
| 0.257 | −0.302 | 7.823 |
| 0.263 | −0.315 | 7.823 |
| 0.270 | −0.328 | 7.823 |
| 0.276 | −0.341 | 7.823 |
| 0.283 | −0.354 | 7.823 |
| 0.289 | −0.367 | 7.823 |
| 0.295 | −0.380 | 7.823 |
| 0.301 | −0.393 | 7.823 |
| 0.307 | −0.406 | 7.823 |
| 0.313 | −0.419 | 7.823 |
| 0.319 | −0.432 | 7.823 |
| 0.326 | −0.445 | 7.823 |
| 0.327 | −0.447 | 7.823 |
| 0.328 | −0.450 | 7.823 |
| 0.329 | −0.453 | 7.823 |
| 0.330 | −0.455 | 7.823 |
| 0.331 | −0.458 | 7.823 |
| 0.332 | −0.460 | 7.823 |
| 0.334 | −0.463 | 7.823 |
| 0.335 | −0.466 | 7.823 |
| 0.336 | −0.468 | 7.823 |
| 0.337 | −0.471 | 7.823 |
| 0.338 | −0.474 | 7.823 |
| 0.339 | −0.477 | 7.823 |
| 0.339 | −0.480 | 7.823 |
| 0.339 | −0.483 | 7.823 |
| 0.338 | −0.485 | 7.823 |
| 0.337 | −0.488 | 7.823 |
| 0.336 | −0.491 | 7.823 |
| 0.334 | −0.493 | 7.823 |
| 0.331 | −0.495 | 7.823 |
| 0.329 | −0.496 | 7.823 |
| 0.326 | −0.498 | 7.823 |
| 0.323 | −0.498 | 7.823 |
| 0.320 | −0.499 | 7.823 |
| 0.317 | −0.498 | 7.823 |
| 0.314 | −0.498 | 7.823 |
| 0.311 | −0.497 | 7.823 |
| 0.309 | −0.496 | 7.823 |
| 0.306 | −0.494 | 7.823 |
| 0.304 | −0.492 | 7.823 |
| 0.303 | −0.490 | 7.823 |
| 0.301 | −0.488 | 7.823 |
| 0.299 | −0.486 | 7.823 |
| 0.298 | −0.483 | 7.823 |
| 0.296 | −0.481 | 7.823 |
| 0.295 | −0.479 | 7.823 |
| 0.293 | −0.477 | 7.823 |
| 0.291 | −0.475 | 7.823 |
| 0.290 | −0.473 | 7.823 |
| 0.288 | −0.471 | 7.823 |
| 0.280 | −0.460 | 7.823 |
| 0.272 | −0.449 | 7.823 |
| 0.264 | −0.439 | 7.823 |
| 0.256 | −0.428 | 7.823 |
| 0.248 | −0.418 | 7.823 |
| 0.240 | −0.407 | 7.823 |
| 0.232 | −0.397 | 7.823 |
| 0.224 | −0.386 | 7.823 |
| 0.215 | −0.376 | 7.823 |
| 0.207 | −0.365 | 7.823 |
| 0.199 | −0.355 | 7.823 |
| 0.190 | −0.345 | 7.823 |
| 0.181 | −0.335 | 7.823 |
| 0.173 | −0.325 | 7.823 |
| 0.164 | −0.315 | 7.823 |
| 0.155 | −0.304 | 7.823 |
| 0.147 | −0.294 | 7.823 |
| 0.139 | −0.284 | 7.823 |
| 0.130 | −0.273 | 7.823 |
| 0.122 | −0.263 | 7.823 |
| 0.114 | −0.252 | 7.823 |
| 0.106 | −0.242 | 7.823 |
| 0.098 | −0.231 | 7.823 |
| 0.089 | −0.221 | 7.823 |
| 0.081 | −0.210 | 7.823 |
| 0.073 | −0.200 | 7.823 |
| 0.065 | −0.189 | 7.823 |
| 0.057 | −0.179 | 7.823 |
| 0.048 | −0.168 | 7.823 |
| 0.040 | −0.158 | 7.823 |
| 0.032 | −0.148 | 7.823 |
| 0.024 | −0.137 | 7.823 |
| 0.016 | −0.127 | 7.823 |
| 0.007 | −0.116 | 7.823 |
| −0.001 | −0.105 | 7.823 |
| −0.009 | −0.095 | 7.823 |
| −0.017 | −0.084 | 7.823 |
| −0.025 | −0.074 | 7.823 |
| −0.033 | −0.063 | 7.823 |
| −0.041 | −0.053 | 7.823 |
| −0.049 | −0.042 | 7.823 |
| −0.057 | −0.032 | 7.823 |
| −0.065 | −0.021 | 7.823 |
| −0.073 | −0.010 | 7.823 |
| −0.081 | 0.000 | 7.823 |
| −0.089 | 0.011 | 7.823 |
| −0.097 | 0.022 | 7.823 |
| −0.105 | 0.032 | 7.823 |
| −0.113 | 0.043 | 7.823 |
| −0.121 | 0.054 | 7.823 |
| −0.129 | 0.064 | 7.823 |
| −0.137 | 0.075 | 7.823 |
| −0.145 | 0.086 | 7.823 |
| −0.153 | 0.096 | 7.823 |
| −0.161 | 0.107 | 7.823 |
| −0.169 | 0.118 | 7.823 |
| −0.177 | 0.128 | 7.823 |
| −0.185 | 0.139 | 7.823 |
| −0.192 | 0.150 | 7.823 |
| −0.200 | 0.161 | 7.823 |
| −0.208 | 0.172 | 7.823 |
| −0.216 | 0.182 | 7.823 |
| −0.224 | 0.193 | 7.823 |
| −0.231 | 0.204 | 7.823 |
| −0.239 | 0.215 | 7.823 |
| −0.247 | 0.226 | 7.823 |
| −0.254 | 0.237 | 7.823 |

TABLE 2-continued

| X | Y | Z |
|---|---|---|
| −0.262 | 0.247 | 7.823 |
| −0.270 | 0.258 | 7.823 |
| −0.277 | 0.269 | 7.823 |
| −0.285 | 0.280 | 7.823 |
| −0.292 | 0.291 | 7.823 |
| −0.300 | 0.302 | 7.823 |
| −0.307 | 0.313 | 7.823 |
| −0.315 | 0.324 | 7.823 |
| −0.323 | 0.335 | 7.823 |
| −0.330 | 0.346 | 7.823 |
| −0.338 | 0.357 | 7.823 |
| −0.346 | 0.368 | 7.823 |
| −0.347 | 0.370 | 7.823 |
| −0.349 | 0.372 | 7.823 |
| −0.350 | 0.374 | 7.823 |
| −0.352 | 0.376 | 7.823 |
| −0.353 | 0.378 | 7.823 |
| −0.355 | 0.380 | 7.823 |
| −0.357 | 0.383 | 7.823 |
| −0.358 | 0.385 | 7.823 |
| −0.360 | 0.387 | 7.823 |
| −0.361 | 0.389 | 7.823 |
| −0.364 | 0.393 | 7.823 |
| −0.367 | 0.398 | 7.823 |
| −0.368 | 0.402 | 7.823 |
| −0.369 | 0.407 | 7.823 |
| −0.370 | 0.412 | 7.823 |
| −0.370 | 0.417 | 7.823 |
| −0.370 | 0.422 | 7.823 |
| −0.369 | 0.427 | 7.823 |
| −0.367 | 0.432 | 7.823 |
| −0.365 | 0.436 | 7.823 |
| −0.363 | 0.440 | 7.823 |
| −0.359 | 0.444 | 7.823 |
| −0.356 | 0.448 | 7.823 |
| −0.352 | 0.451 | 7.823 |
| −0.348 | 0.454 | 7.823 |
| −0.344 | 0.456 | 7.823 |
| −0.339 | 0.458 | 7.823 |
| −0.334 | 0.460 | 7.823 |
| SECTION 13 | | |
| −0.290 | 0.484 | 7.948 |
| −0.288 | 0.484 | 7.948 |
| −0.285 | 0.484 | 7.948 |
| −0.282 | 0.483 | 7.948 |
| −0.280 | 0.483 | 7.948 |
| −0.277 | 0.482 | 7.948 |
| −0.274 | 0.482 | 7.948 |
| −0.271 | 0.481 | 7.948 |
| −0.269 | 0.480 | 7.948 |
| −0.266 | 0.479 | 7.948 |
| −0.264 | 0.478 | 7.948 |
| −0.251 | 0.473 | 7.948 |
| −0.240 | 0.465 | 7.948 |
| −0.229 | 0.457 | 7.948 |
| −0.219 | 0.448 | 7.948 |
| −0.209 | 0.438 | 7.948 |
| −0.199 | 0.428 | 7.948 |
| −0.190 | 0.418 | 7.948 |
| −0.181 | 0.408 | 7.948 |
| −0.172 | 0.398 | 7.948 |
| −0.163 | 0.387 | 7.948 |
| −0.154 | 0.377 | 7.948 |
| −0.146 | 0.366 | 7.948 |
| −0.138 | 0.355 | 7.948 |
| −0.130 | 0.344 | 7.948 |
| −0.122 | 0.333 | 7.948 |
| −0.114 | 0.321 | 7.948 |
| −0.106 | 0.310 | 7.948 |
| −0.099 | 0.299 | 7.948 |
| −0.091 | 0.287 | 7.948 |
| −0.084 | 0.275 | 7.948 |
| −0.077 | 0.264 | 7.948 |
| −0.070 | 0.252 | 7.948 |
| −0.063 | 0.240 | 7.948 |
| −0.056 | 0.228 | 7.948 |
| −0.049 | 0.216 | 7.948 |
| −0.042 | 0.205 | 7.948 |
| −0.035 | 0.193 | 7.948 |
| −0.029 | 0.181 | 7.948 |
| −0.022 | 0.169 | 7.948 |
| −0.015 | 0.157 | 7.948 |
| −0.008 | 0.145 | 7.948 |
| −0.001 | 0.133 | 7.948 |
| 0.005 | 0.121 | 7.948 |
| 0.012 | 0.109 | 7.948 |
| 0.019 | 0.097 | 7.948 |
| 0.025 | 0.085 | 7.948 |
| 0.032 | 0.073 | 7.948 |
| 0.039 | 0.061 | 7.948 |
| 0.045 | 0.049 | 7.948 |
| 0.052 | 0.037 | 7.948 |
| 0.058 | 0.025 | 7.948 |
| 0.065 | 0.013 | 7.948 |
| 0.072 | 0.001 | 7.948 |
| 0.078 | −0.011 | 7.948 |
| 0.085 | −0.023 | 7.948 |
| 0.091 | −0.035 | 7.948 |
| 0.098 | −0.047 | 7.948 |
| 0.104 | −0.059 | 7.948 |
| 0.111 | −0.071 | 7.948 |
| 0.117 | −0.083 | 7.948 |
| 0.124 | −0.095 | 7.948 |
| 0.130 | −0.107 | 7.948 |
| 0.137 | −0.119 | 7.948 |
| 0.143 | −0.131 | 7.948 |
| 0.150 | −0.144 | 7.948 |
| 0.157 | −0.156 | 7.948 |
| 0.163 | −0.168 | 7.948 |
| 0.170 | −0.180 | 7.948 |
| 0.176 | −0.192 | 7.948 |
| 0.183 | −0.204 | 7.948 |
| 0.189 | −0.216 | 7.948 |
| 0.196 | −0.228 | 7.948 |
| 0.202 | −0.240 | 7.948 |
| 0.209 | −0.252 | 7.948 |
| 0.215 | −0.264 | 7.948 |
| 0.222 | −0.276 | 7.948 |
| 0.228 | −0.288 | 7.948 |
| 0.235 | −0.300 | 7.948 |
| 0.241 | −0.313 | 7.948 |
| 0.247 | −0.325 | 7.948 |
| 0.253 | −0.337 | 7.948 |
| 0.259 | −0.349 | 7.948 |
| 0.265 | −0.362 | 7.948 |
| 0.271 | −0.374 | 7.948 |
| 0.277 | −0.387 | 7.948 |
| 0.283 | −0.399 | 7.948 |
| 0.289 | −0.411 | 7.948 |
| 0.295 | −0.424 | 7.948 |
| 0.301 | −0.436 | 7.948 |
| 0.302 | −0.438 | 7.948 |
| 0.303 | −0.441 | 7.948 |
| 0.304 | −0.443 | 7.948 |
| 0.305 | −0.446 | 7.948 |
| 0.306 | −0.448 | 7.948 |
| 0.307 | −0.451 | 7.948 |
| 0.309 | −0.453 | 7.948 |
| 0.310 | −0.456 | 7.948 |
| 0.311 | −0.458 | 7.948 |
| 0.312 | −0.461 | 7.948 |
| 0.313 | −0.464 | 7.948 |
| 0.314 | −0.467 | 7.948 |
| 0.315 | −0.470 | 7.948 |
| 0.314 | −0.473 | 7.948 |
| 0.314 | −0.476 | 7.948 |
| 0.312 | −0.479 | 7.948 |
| 0.311 | −0.481 | 7.948 |
| 0.309 | −0.484 | 7.948 |
| 0.306 | −0.486 | 7.948 |
| 0.304 | −0.487 | 7.948 |
| 0.301 | −0.489 | 7.948 |
| 0.298 | −0.489 | 7.948 |
| 0.295 | −0.490 | 7.948 |
| 0.292 | −0.490 | 7.948 |

TABLE 2-continued

| X | Y | Z |
|---|---|---|
| 0.289 | −0.489 | 7.948 |
| 0.286 | −0.488 | 7.948 |
| 0.283 | −0.487 | 7.948 |
| 0.280 | −0.485 | 7.948 |
| 0.278 | −0.483 | 7.948 |
| 0.276 | −0.481 | 7.948 |
| 0.275 | −0.478 | 7.948 |
| 0.273 | −0.476 | 7.948 |
| 0.272 | −0.474 | 7.948 |
| 0.270 | −0.472 | 7.948 |
| 0.269 | −0.470 | 7.948 |
| 0.267 | −0.468 | 7.948 |
| 0.265 | −0.466 | 7.948 |
| 0.264 | −0.464 | 7.948 |
| 0.262 | −0.462 | 7.948 |
| 0.254 | −0.451 | 7.948 |
| 0.247 | −0.441 | 7.948 |
| 0.239 | −0.430 | 7.948 |
| 0.231 | −0.420 | 7.948 |
| 0.223 | −0.409 | 7.948 |
| 0.215 | −0.399 | 7.948 |
| 0.207 | −0.388 | 7.948 |
| 0.199 | −0.378 | 7.948 |
| 0.191 | −0.368 | 7.948 |
| 0.183 | −0.357 | 7.948 |
| 0.174 | −0.347 | 7.948 |
| 0.166 | −0.337 | 7.948 |
| 0.157 | −0.327 | 7.948 |
| 0.149 | −0.317 | 7.948 |
| 0.140 | −0.307 | 7.948 |
| 0.132 | −0.297 | 7.948 |
| 0.123 | −0.287 | 7.948 |
| 0.115 | −0.277 | 7.948 |
| 0.107 | −0.267 | 7.948 |
| 0.099 | −0.256 | 7.948 |
| 0.091 | −0.246 | 7.948 |
| 0.083 | −0.235 | 7.948 |
| 0.075 | −0.225 | 7.948 |
| 0.067 | −0.215 | 7.948 |
| 0.059 | −0.204 | 7.948 |
| 0.051 | −0.194 | 7.948 |
| 0.043 | −0.183 | 7.948 |
| 0.035 | −0.173 | 7.948 |
| 0.027 | −0.163 | 7.948 |
| 0.019 | −0.152 | 7.948 |
| 0.011 | −0.142 | 7.948 |
| 0.003 | −0.131 | 7.948 |
| −0.005 | −0.121 | 7.948 |
| −0.013 | −0.110 | 7.948 |
| −0.021 | −0.100 | 7.948 |
| −0.028 | −0.089 | 7.948 |
| −0.036 | −0.079 | 7.948 |
| −0.044 | −0.068 | 7.948 |
| −0.052 | −0.058 | 7.948 |
| −0.060 | −0.047 | 7.948 |
| −0.068 | −0.037 | 7.948 |
| −0.075 | −0.026 | 7.948 |
| −0.083 | −0.016 | 7.948 |
| −0.091 | −0.005 | 7.948 |
| −0.099 | 0.006 | 7.948 |
| −0.106 | 0.016 | 7.948 |
| −0.114 | 0.027 | 7.948 |
| −0.122 | 0.038 | 7.948 |
| −0.129 | 0.048 | 7.948 |
| −0.137 | 0.059 | 7.948 |
| −0.144 | 0.070 | 7.948 |
| −0.152 | 0.081 | 7.948 |
| −0.159 | 0.091 | 7.948 |
| −0.167 | 0.102 | 7.948 |
| −0.174 | 0.113 | 7.948 |
| −0.182 | 0.124 | 7.948 |
| −0.189 | 0.135 | 7.948 |
| −0.197 | 0.145 | 7.948 |
| −0.204 | 0.156 | 7.948 |
| −0.211 | 0.167 | 7.948 |
| −0.219 | 0.178 | 7.948 |
| −0.226 | 0.189 | 7.948 |
| −0.233 | 0.200 | 7.948 |
| −0.240 | 0.211 | 7.948 |
| −0.247 | 0.222 | 7.948 |
| −0.254 | 0.233 | 7.948 |
| −0.261 | 0.244 | 7.948 |
| −0.268 | 0.255 | 7.948 |
| −0.275 | 0.267 | 7.948 |
| −0.282 | 0.278 | 7.948 |
| −0.289 | 0.289 | 7.948 |
| −0.295 | 0.300 | 7.948 |
| −0.302 | 0.312 | 7.948 |
| −0.308 | 0.323 | 7.948 |
| −0.315 | 0.335 | 7.948 |
| −0.321 | 0.346 | 7.948 |
| −0.327 | 0.358 | 7.948 |
| −0.333 | 0.369 | 7.948 |
| −0.339 | 0.381 | 7.948 |
| −0.341 | 0.383 | 7.948 |
| −0.342 | 0.386 | 7.948 |
| −0.343 | 0.388 | 7.948 |
| −0.344 | 0.390 | 7.948 |
| −0.345 | 0.393 | 7.948 |
| −0.346 | 0.395 | 7.948 |
| −0.348 | 0.397 | 7.948 |
| −0.349 | 0.400 | 7.948 |
| −0.350 | 0.402 | 7.948 |
| −0.351 | 0.404 | 7.948 |
| −0.354 | 0.410 | 7.948 |
| −0.355 | 0.417 | 7.948 |
| −0.357 | 0.423 | 7.948 |
| −0.357 | 0.429 | 7.948 |
| −0.357 | 0.436 | 7.948 |
| −0.356 | 0.442 | 7.948 |
| −0.354 | 0.449 | 7.948 |
| −0.352 | 0.454 | 7.948 |
| −0.348 | 0.460 | 7.948 |
| −0.344 | 0.465 | 7.948 |
| −0.339 | 0.469 | 7.948 |
| −0.334 | 0.473 | 7.948 |
| −0.328 | 0.476 | 7.948 |
| −0.322 | 0.479 | 7.948 |
| −0.316 | 0.481 | 7.948 |
| −0.310 | 0.482 | 7.948 |
| −0.303 | 0.484 | 7.948 |
| −0.297 | 0.484 | 7.948 |
| SECTION 14 | | |
| −0.228 | 0.517 | 8.152 |
| −0.226 | 0.516 | 8.152 |
| −0.223 | 0.515 | 8.152 |
| −0.221 | 0.513 | 8.152 |
| −0.219 | 0.511 | 8.152 |
| −0.217 | 0.510 | 8.152 |
| −0.215 | 0.508 | 8.152 |
| −0.213 | 0.506 | 8.152 |
| −0.211 | 0.505 | 8.152 |
| −0.210 | 0.503 | 8.152 |
| −0.208 | 0.501 | 8.152 |
| −0.199 | 0.491 | 8.152 |
| −0.192 | 0.480 | 8.152 |
| −0.185 | 0.469 | 8.152 |
| −0.180 | 0.457 | 8.152 |
| −0.175 | 0.445 | 8.152 |
| −0.170 | 0.433 | 8.152 |
| −0.166 | 0.420 | 8.152 |
| −0.162 | 0.408 | 8.152 |
| −0.157 | 0.395 | 8.152 |
| −0.153 | 0.383 | 8.152 |
| −0.148 | 0.371 | 8.152 |
| −0.143 | 0.359 | 8.152 |
| −0.137 | 0.347 | 8.152 |
| −0.131 | 0.335 | 8.152 |
| −0.126 | 0.324 | 8.152 |
| −0.120 | 0.312 | 8.152 |
| −0.114 | 0.300 | 8.152 |
| −0.108 | 0.289 | 8.152 |
| −0.102 | 0.277 | 8.152 |
| −0.096 | 0.265 | 8.152 |
| −0.091 | 0.253 | 8.152 |

TABLE 2-continued

| X | Y | Z |
|---|---|---|
| −0.085 | 0.242 | 8.152 |
| −0.079 | 0.230 | 8.152 |
| −0.073 | 0.218 | 8.152 |
| −0.068 | 0.206 | 8.152 |
| −0.062 | 0.195 | 8.152 |
| −0.056 | 0.183 | 8.152 |
| −0.051 | 0.171 | 8.152 |
| −0.045 | 0.159 | 8.152 |
| −0.039 | 0.148 | 8.152 |
| −0.033 | 0.136 | 8.152 |
| −0.027 | 0.124 | 8.152 |
| −0.021 | 0.112 | 8.152 |
| −0.015 | 0.101 | 8.152 |
| −0.009 | 0.089 | 8.152 |
| −0.003 | 0.078 | 8.152 |
| 0.003 | 0.066 | 8.152 |
| 0.009 | 0.054 | 8.152 |
| 0.015 | 0.043 | 8.152 |
| 0.021 | 0.031 | 8.152 |
| 0.027 | 0.020 | 8.152 |
| 0.033 | 0.008 | 8.152 |
| 0.039 | −0.003 | 8.152 |
| 0.045 | −0.015 | 8.152 |
| 0.051 | −0.027 | 8.152 |
| 0.058 | −0.038 | 8.152 |
| 0.064 | −0.050 | 8.152 |
| 0.070 | −0.061 | 8.152 |
| 0.076 | −0.073 | 8.152 |
| 0.082 | −0.084 | 8.152 |
| 0.088 | −0.096 | 8.152 |
| 0.094 | −0.108 | 8.152 |
| 0.101 | −0.119 | 8.152 |
| 0.107 | −0.131 | 8.152 |
| 0.113 | −0.142 | 8.152 |
| 0.119 | −0.154 | 8.152 |
| 0.125 | −0.165 | 8.152 |
| 0.131 | −0.177 | 8.152 |
| 0.138 | −0.188 | 8.152 |
| 0.144 | −0.200 | 8.152 |
| 0.150 | −0.211 | 8.152 |
| 0.156 | −0.223 | 8.152 |
| 0.162 | −0.234 | 8.152 |
| 0.169 | −0.246 | 8.152 |
| 0.175 | −0.257 | 8.152 |
| 0.181 | −0.269 | 8.152 |
| 0.188 | −0.280 | 8.152 |
| 0.194 | −0.292 | 8.152 |
| 0.200 | −0.303 | 8.152 |
| 0.206 | −0.315 | 8.152 |
| 0.212 | −0.327 | 8.152 |
| 0.218 | −0.338 | 8.152 |
| 0.224 | −0.350 | 8.152 |
| 0.229 | −0.362 | 8.152 |
| 0.235 | −0.373 | 8.152 |
| 0.241 | −0.385 | 8.152 |
| 0.247 | −0.397 | 8.152 |
| 0.253 | −0.408 | 8.152 |
| 0.259 | −0.420 | 8.152 |
| 0.260 | −0.422 | 8.152 |
| 0.261 | −0.425 | 8.152 |
| 0.262 | −0.427 | 8.152 |
| 0.263 | −0.430 | 8.152 |
| 0.265 | −0.432 | 8.152 |
| 0.266 | −0.434 | 8.152 |
| 0.267 | −0.437 | 8.152 |
| 0.268 | −0.439 | 8.152 |
| 0.269 | −0.441 | 8.152 |
| 0.270 | −0.444 | 8.152 |
| 0.272 | −0.447 | 8.152 |
| 0.273 | −0.450 | 8.152 |
| 0.273 | −0.453 | 8.152 |
| 0.273 | −0.456 | 8.152 |
| 0.272 | −0.460 | 8.152 |
| 0.271 | −0.463 | 8.152 |
| 0.269 | −0.466 | 8.152 |
| 0.267 | −0.468 | 8.152 |
| 0.264 | −0.470 | 8.152 |
| 0.262 | −0.472 | 8.152 |
| 0.258 | −0.473 | 8.152 |
| 0.255 | −0.474 | 8.152 |
| 0.252 | −0.474 | 8.152 |
| 0.249 | −0.474 | 8.152 |
| 0.245 | −0.474 | 8.152 |
| 0.242 | −0.473 | 8.152 |
| 0.239 | −0.471 | 8.152 |
| 0.237 | −0.469 | 8.152 |
| 0.234 | −0.467 | 8.152 |
| 0.233 | −0.465 | 8.152 |
| 0.231 | −0.463 | 8.152 |
| 0.230 | −0.461 | 8.152 |
| 0.228 | −0.459 | 8.152 |
| 0.227 | −0.457 | 8.152 |
| 0.225 | −0.455 | 8.152 |
| 0.224 | −0.453 | 8.152 |
| 0.222 | −0.451 | 8.152 |
| 0.220 | −0.448 | 8.152 |
| 0.219 | −0.446 | 8.152 |
| 0.211 | −0.436 | 8.152 |
| 0.204 | −0.426 | 8.152 |
| 0.196 | −0.416 | 8.152 |
| 0.188 | −0.405 | 8.152 |
| 0.180 | −0.395 | 8.152 |
| 0.172 | −0.385 | 8.152 |
| 0.165 | −0.375 | 8.152 |
| 0.157 | −0.365 | 8.152 |
| 0.149 | −0.354 | 8.152 |
| 0.141 | −0.344 | 8.152 |
| 0.133 | −0.334 | 8.152 |
| 0.125 | −0.324 | 8.152 |
| 0.116 | −0.314 | 8.152 |
| 0.108 | −0.305 | 8.152 |
| 0.100 | −0.295 | 8.152 |
| 0.092 | −0.285 | 8.152 |
| 0.084 | −0.275 | 8.152 |
| 0.075 | −0.265 | 8.152 |
| 0.067 | −0.255 | 8.152 |
| 0.060 | −0.245 | 8.152 |
| 0.052 | −0.235 | 8.152 |
| 0.044 | −0.224 | 8.152 |
| 0.036 | −0.214 | 8.152 |
| 0.029 | −0.204 | 8.152 |
| 0.021 | −0.194 | 8.152 |
| 0.013 | −0.183 | 8.152 |
| 0.005 | −0.173 | 8.152 |
| −0.002 | −0.163 | 8.152 |
| −0.010 | −0.152 | 8.152 |
| −0.018 | −0.142 | 8.152 |
| −0.025 | −0.132 | 8.152 |
| −0.033 | −0.122 | 8.152 |
| −0.041 | −0.111 | 8.152 |
| −0.048 | −0.101 | 8.152 |
| −0.056 | −0.090 | 8.152 |
| −0.063 | −0.080 | 8.152 |
| −0.071 | −0.069 | 8.152 |
| −0.078 | −0.059 | 8.152 |
| −0.086 | −0.048 | 8.152 |
| −0.093 | −0.038 | 8.152 |
| −0.100 | −0.027 | 8.152 |
| −0.108 | −0.017 | 8.152 |
| −0.115 | −0.006 | 8.152 |
| −0.122 | 0.004 | 8.152 |
| −0.129 | 0.015 | 8.152 |
| −0.137 | 0.026 | 8.152 |
| −0.144 | 0.036 | 8.152 |
| −0.151 | 0.047 | 8.152 |
| −0.158 | 0.058 | 8.152 |
| −0.165 | 0.068 | 8.152 |
| −0.172 | 0.079 | 8.152 |
| −0.179 | 0.090 | 8.152 |
| −0.186 | 0.101 | 8.152 |
| −0.193 | 0.112 | 8.152 |
| −0.199 | 0.123 | 8.152 |
| −0.206 | 0.134 | 8.152 |
| −0.213 | 0.145 | 8.152 |
| −0.219 | 0.156 | 8.152 |
| −0.226 | 0.167 | 8.152 |

TABLE 2-continued

| X | Y | Z |
|---|---|---|
| −0.232 | 0.178 | 8.152 |
| −0.239 | 0.189 | 8.152 |
| −0.245 | 0.200 | 8.152 |
| −0.251 | 0.212 | 8.152 |
| −0.257 | 0.223 | 8.152 |
| −0.263 | 0.234 | 8.152 |
| −0.269 | 0.246 | 8.152 |
| −0.275 | 0.257 | 8.152 |
| −0.281 | 0.269 | 8.152 |
| −0.286 | 0.280 | 8.152 |
| −0.292 | 0.292 | 8.152 |
| −0.297 | 0.304 | 8.152 |
| −0.302 | 0.315 | 8.152 |
| −0.307 | 0.327 | 8.152 |
| −0.312 | 0.339 | 8.152 |
| −0.316 | 0.351 | 8.152 |
| −0.320 | 0.364 | 8.152 |
| −0.324 | 0.376 | 8.152 |
| −0.327 | 0.388 | 8.152 |
| −0.330 | 0.401 | 8.152 |
| −0.330 | 0.403 | 8.152 |
| −0.331 | 0.406 | 8.152 |
| −0.331 | 0.408 | 8.152 |
| −0.331 | 0.411 | 8.152 |
| −0.332 | 0.414 | 8.152 |
| −0.332 | 0.416 | 8.152 |
| −0.333 | 0.419 | 8.152 |
| −0.333 | 0.421 | 8.152 |
| −0.333 | 0.424 | 8.152 |
| −0.334 | 0.426 | 8.152 |
| −0.336 | 0.435 | 8.152 |
| −0.338 | 0.445 | 8.152 |
| −0.338 | 0.454 | 8.152 |
| −0.338 | 0.463 | 8.152 |
| −0.336 | 0.473 | 8.152 |
| −0.333 | 0.482 | 8.152 |
| −0.329 | 0.490 | 8.152 |
| −0.324 | 0.498 | 8.152 |
| −0.317 | 0.504 | 8.152 |
| −0.310 | 0.510 | 8.152 |
| −0.301 | 0.514 | 8.152 |
| −0.293 | 0.518 | 8.152 |
| −0.283 | 0.520 | 8.152 |
| −0.274 | 0.522 | 8.152 |
| −0.265 | 0.522 | 8.152 |
| −0.255 | 0.522 | 8.152 |
| −0.246 | 0.521 | 8.152 |
| −0.237 | 0.521 | 8.152 |

SECTION 15

| X | Y | Z |
|---|---|---|
| −0.222 | 0.515 | 8.275 |
| −0.220 | 0.513 | 8.275 |
| −0.218 | 0.512 | 8.275 |
| −0.216 | 0.510 | 8.275 |
| −0.215 | 0.508 | 8.275 |
| −0.213 | 0.506 | 8.275 |
| −0.212 | 0.504 | 8.275 |
| −0.210 | 0.502 | 8.275 |
| −0.208 | 0.500 | 8.275 |
| −0.207 | 0.497 | 8.275 |
| −0.206 | 0.495 | 8.275 |
| −0.199 | 0.484 | 8.275 |
| −0.193 | 0.473 | 8.275 |
| −0.188 | 0.461 | 8.275 |
| −0.183 | 0.449 | 8.275 |
| −0.179 | 0.437 | 8.275 |
| −0.176 | 0.425 | 8.275 |
| −0.173 | 0.413 | 8.275 |
| −0.170 | 0.400 | 8.275 |
| −0.167 | 0.388 | 8.275 |
| −0.163 | 0.375 | 8.275 |
| −0.160 | 0.363 | 8.275 |
| −0.155 | 0.351 | 8.275 |
| −0.151 | 0.339 | 8.275 |
| −0.146 | 0.327 | 8.275 |
| −0.141 | 0.316 | 8.275 |
| −0.136 | 0.304 | 8.275 |
| −0.131 | 0.292 | 8.275 |
| −0.125 | 0.280 | 8.275 |
| −0.120 | 0.269 | 8.275 |
| −0.115 | 0.257 | 8.275 |
| −0.109 | 0.246 | 8.275 |
| −0.104 | 0.234 | 8.275 |
| −0.098 | 0.223 | 8.275 |
| −0.093 | 0.211 | 8.275 |
| −0.087 | 0.200 | 8.275 |
| −0.082 | 0.188 | 8.275 |
| −0.076 | 0.177 | 8.275 |
| −0.070 | 0.165 | 8.275 |
| −0.065 | 0.154 | 8.275 |
| −0.059 | 0.142 | 8.275 |
| −0.054 | 0.131 | 8.275 |
| −0.048 | 0.119 | 8.275 |
| −0.042 | 0.108 | 8.275 |
| −0.037 | 0.096 | 8.275 |
| −0.031 | 0.085 | 8.275 |
| −0.025 | 0.073 | 8.275 |
| −0.019 | 0.062 | 8.275 |
| −0.013 | 0.051 | 8.275 |
| −0.007 | 0.039 | 8.275 |
| −0.001 | 0.028 | 8.275 |
| 0.004 | 0.017 | 8.275 |
| 0.010 | 0.005 | 8.275 |
| 0.016 | −0.006 | 8.275 |
| 0.022 | −0.017 | 8.275 |
| 0.028 | −0.029 | 8.275 |
| 0.034 | −0.040 | 8.275 |
| 0.040 | −0.051 | 8.275 |
| 0.046 | −0.062 | 8.275 |
| 0.052 | −0.074 | 8.275 |
| 0.058 | −0.085 | 8.275 |
| 0.064 | −0.096 | 8.275 |
| 0.070 | −0.107 | 8.275 |
| 0.077 | −0.119 | 8.275 |
| 0.083 | −0.130 | 8.275 |
| 0.089 | −0.141 | 8.275 |
| 0.095 | −0.152 | 8.275 |
| 0.101 | −0.163 | 8.275 |
| 0.107 | −0.175 | 8.275 |
| 0.113 | −0.186 | 8.275 |
| 0.120 | −0.197 | 8.275 |
| 0.126 | −0.208 | 8.275 |
| 0.132 | −0.219 | 8.275 |
| 0.138 | −0.231 | 8.275 |
| 0.145 | −0.242 | 8.275 |
| 0.151 | −0.253 | 8.275 |
| 0.157 | −0.264 | 8.275 |
| 0.164 | −0.275 | 8.275 |
| 0.170 | −0.286 | 8.275 |
| 0.176 | −0.297 | 8.275 |
| 0.183 | −0.308 | 8.275 |
| 0.189 | −0.320 | 8.275 |
| 0.195 | −0.331 | 8.275 |
| 0.201 | −0.342 | 8.275 |
| 0.207 | −0.353 | 8.275 |
| 0.213 | −0.365 | 8.275 |
| 0.219 | −0.376 | 8.275 |
| 0.225 | −0.387 | 8.275 |
| 0.232 | −0.398 | 8.275 |
| 0.238 | −0.409 | 8.275 |
| 0.239 | −0.412 | 8.275 |
| 0.240 | −0.414 | 8.275 |
| 0.241 | −0.416 | 8.275 |
| 0.242 | −0.418 | 8.275 |
| 0.244 | −0.421 | 8.275 |
| 0.245 | −0.423 | 8.275 |
| 0.246 | −0.425 | 8.275 |
| 0.247 | −0.427 | 8.275 |
| 0.248 | −0.430 | 8.275 |
| 0.250 | −0.432 | 8.275 |
| 0.251 | −0.435 | 8.275 |
| 0.252 | −0.438 | 8.275 |
| 0.253 | −0.442 | 8.275 |
| 0.253 | −0.445 | 8.275 |
| 0.252 | −0.448 | 8.275 |
| 0.251 | −0.452 | 8.275 |

TABLE 2-continued

| X | Y | Z |
|---|---|---|
| 0.249 | −0.455 | 8.275 |
| 0.247 | −0.457 | 8.275 |
| 0.245 | −0.460 | 8.275 |
| 0.242 | −0.461 | 8.275 |
| 0.239 | −0.463 | 8.275 |
| 0.235 | −0.464 | 8.275 |
| 0.232 | −0.464 | 8.275 |
| 0.228 | −0.464 | 8.275 |
| 0.225 | −0.464 | 8.275 |
| 0.222 | −0.463 | 8.275 |
| 0.219 | −0.462 | 8.275 |
| 0.216 | 0.460 | 8.275 |
| 0.214 | −0.457 | 8.275 |
| 0.212 | −0.455 | 8.275 |
| 0.210 | −0.453 | 8.275 |
| 0.209 | −0.451 | 8.275 |
| 0.207 | −0.449 | 8.275 |
| 0.206 | −0.447 | 8.275 |
| 0.204 | −0.445 | 8.275 |
| 0.202 | −0.443 | 8.275 |
| 0.201 | −0.441 | 8.275 |
| 0.199 | −0.439 | 8.275 |
| 0.198 | −0.437 | 8.275 |
| 0.190 | −0.427 | 8.275 |
| 0.182 | −0.417 | 8.275 |
| 0.174 | −0.407 | 8.275 |
| 0.166 | −0.397 | 8.275 |
| 0.158 | −0.387 | 8.275 |
| 0.150 | −0.377 | 8.275 |
| 0.142 | −0.367 | 8.275 |
| 0.134 | −0.357 | 8.275 |
| 0.126 | −0.347 | 8.275 |
| 0.118 | −0.337 | 8.275 |
| 0.110 | −0.327 | 8.275 |
| 0.102 | −0.317 | 8.275 |
| 0.094 | −0.307 | 8.275 |
| 0.086 | −0.297 | 8.275 |
| 0.078 | −0.288 | 8.275 |
| 0.070 | −0.278 | 8.275 |
| 0.061 | −0.268 | 8.275 |
| 0.053 | −0.258 | 8.275 |
| 0.046 | −0.248 | 8.275 |
| 0.038 | −0.238 | 8.275 |
| 0.030 | −0.228 | 8.275 |
| 0.022 | −0.217 | 8.275 |
| 0.015 | −0.207 | 8.275 |
| 0.007 | −0.197 | 8.275 |
| 0.000 | −0.187 | 8.275 |
| −0.008 | −0.176 | 8.275 |
| −0.015 | −0.166 | 8.275 |
| −0.023 | −0.156 | 8.275 |
| −0.031 | −0.145 | 8.275 |
| −0.038 | −0.135 | 8.275 |
| −0.046 | −0.125 | 8.275 |
| −0.053 | −0.114 | 8.275 |
| −0.060 | −0.104 | 8.275 |
| −0.068 | −0.094 | 8.275 |
| −0.075 | −0.083 | 8.275 |
| −0.083 | −0.073 | 8.275 |
| −0.090 | −0.062 | 8.275 |
| −0.097 | −0.052 | 8.275 |
| −0.104 | −0.041 | 8.275 |
| −0.112 | −0.031 | 8.275 |
| −0.119 | −0.020 | 8.275 |
| −0.126 | −0.010 | 8.275 |
| −0.133 | 0.001 | 8.275 |
| −0.140 | 0.011 | 8.275 |
| −0.147 | 0.022 | 8.275 |
| −0.155 | 0.033 | 8.275 |
| −0.162 | 0.043 | 8.275 |
| −0.169 | 0.054 | 8.275 |
| −0.175 | 0.065 | 8.275 |
| −0.182 | 0.076 | 8.275 |
| −0.189 | 0.086 | 8.275 |
| −0.196 | 0.097 | 8.275 |
| −0.203 | 0.108 | 8.275 |
| −0.209 | 0.119 | 8.275 |
| −0.216 | 0.130 | 8.275 |
| −0.223 | 0.141 | 8.275 |
| −0.229 | 0.152 | 8.275 |
| −0.235 | 0.163 | 8.275 |
| −0.242 | 0.174 | 8.275 |
| −0.248 | 0.185 | 8.275 |
| −0.254 | 0.196 | 8.275 |
| −0.260 | 0.208 | 8.275 |
| −0.266 | 0.219 | 8.275 |
| −0.271 | 0.230 | 8.275 |
| −0.277 | 0.242 | 8.275 |
| −0.283 | 0.253 | 8.275 |
| −0.288 | 0.265 | 8.275 |
| −0.293 | 0.277 | 8.275 |
| −0.299 | 0.288 | 8.275 |
| −0.304 | 0.300 | 8.275 |
| −0.308 | 0.312 | 8.275 |
| −0.313 | 0.324 | 8.275 |
| −0.317 | 0.336 | 8.275 |
| −0.321 | 0.348 | 8.275 |
| −0.325 | 0.360 | 8.275 |
| −0.328 | 0.373 | 8.275 |
| −0.330 | 0.385 | 8.275 |
| −0.333 | 0.398 | 8.275 |
| −0.334 | 0.410 | 8.275 |
| −0.335 | 0.413 | 8.275 |
| −0.335 | 0.415 | 8.275 |
| −0.335 | 0.418 | 8.275 |
| −0.336 | 0.420 | 8.275 |
| −0.336 | 0.423 | 8.275 |
| −0.336 | 0.426 | 8.275 |
| −0.336 | 0.428 | 8.275 |
| −0.336 | 0.431 | 8.275 |
| −0.337 | 0.433 | 8.275 |
| −0.337 | 0.436 | 8.275 |
| −0.338 | 0.445 | 8.275 |
| −0.339 | 0.455 | 8.275 |
| −0.339 | 0.465 | 8.275 |
| −0.337 | 0.474 | 8.275 |
| −0.335 | 0.484 | 8.275 |
| −0.331 | 0.493 | 8.275 |
| −0.327 | 0.501 | 8.275 |
| −0.321 | 0.509 | 8.275 |
| −0.313 | 0.515 | 8.275 |
| −0.305 | 0.520 | 8.275 |
| −0.296 | 0.524 | 8.275 |
| −0.287 | 0.527 | 8.275 |
| −0.277 | 0.529 | 8.275 |
| −0.268 | 0.529 | 8.275 |
| −0.258 | 0.528 | 8.275 |
| −0.248 | 0.526 | 8.275 |
| −0.239 | 0.524 | 8.275 |
| −0.230 | 0.520 | 8.275 |

It should be understood that the finished second stage HPT blade 42*b* does not necessarily include all the sections defined in Table 2. The portion of the airfoil 54 proximal to the platform 60 and tip 62 may not be defined by a profile section 66. It should be considered that the blade 42*b* airfoil profile proximal to the platform 60 may vary due to several imposed constraints. However, the HPT blade 42*b* has an intermediate airfoil portion 64 defined between platform 60 and tip 62 thereof and which has a profile defined on the basis of at least the intermediate sections of the various vane profile sections 66 defined in Table 2.

It should be appreciated that the intermediate airfoil portion 64 of the HPT stage vane 42*b* is defined between the inner and outer gaspath walls 28 and 30 and that the platform 60 forms part of the inner gaspath wall 28. More specifically, the Z values defining the gaspath 27 in the region of the stacking line 50 are comprised within the range of about 6.18 to about 8.15 which generally correspond to the z values around the stacking line 50 (X=4.433). The airfoil profile physically appearing on HPT blade 42*b* and fully contained in the gaspath includes Sections 3 to 13 of Table 2. The remaining sections are at least partly located outside of the gaspath 27, but are provided, in part, to fully define the airfoil surface and/or, in part, to improve curve-fitting of the airfoil at its radially distal portions. The skilled reader will appreciate that a suitable fillet radius is to be applied between the platform 60 and the airfoil portion of the blade. The blade inner diameter endwall fillet is in the range of about 0.120" to about 0.225".

Figure 4A:
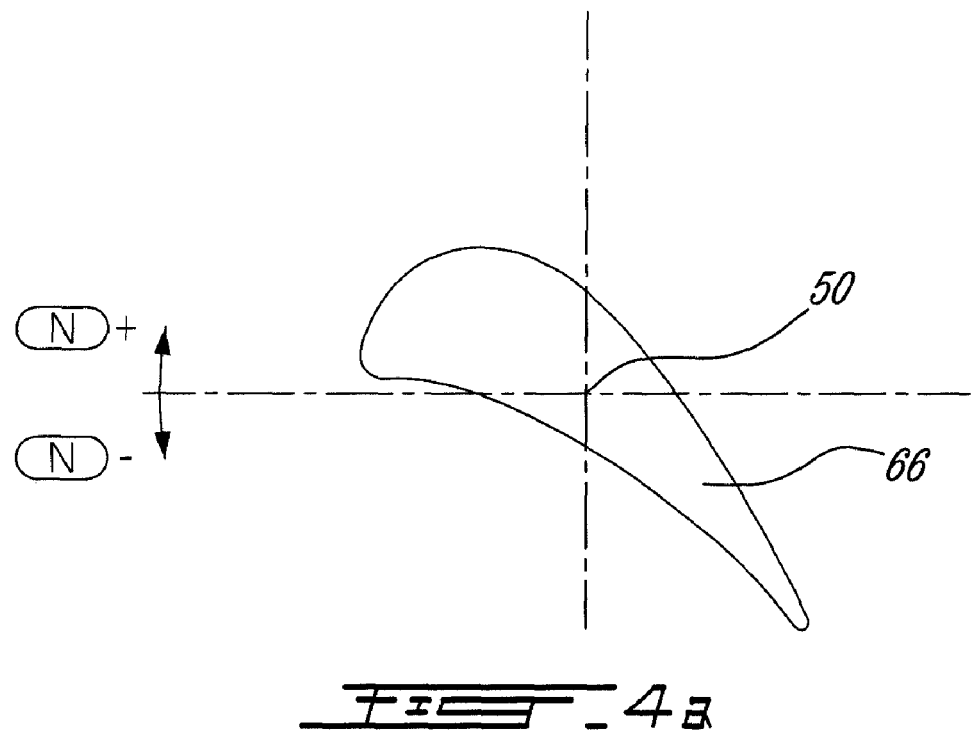
FIGS. 4a and 4b are simplified 2D HP turbine blade airfoil cross-sections illustrating the angular twist and restagger tolerances.
Figure 4B:
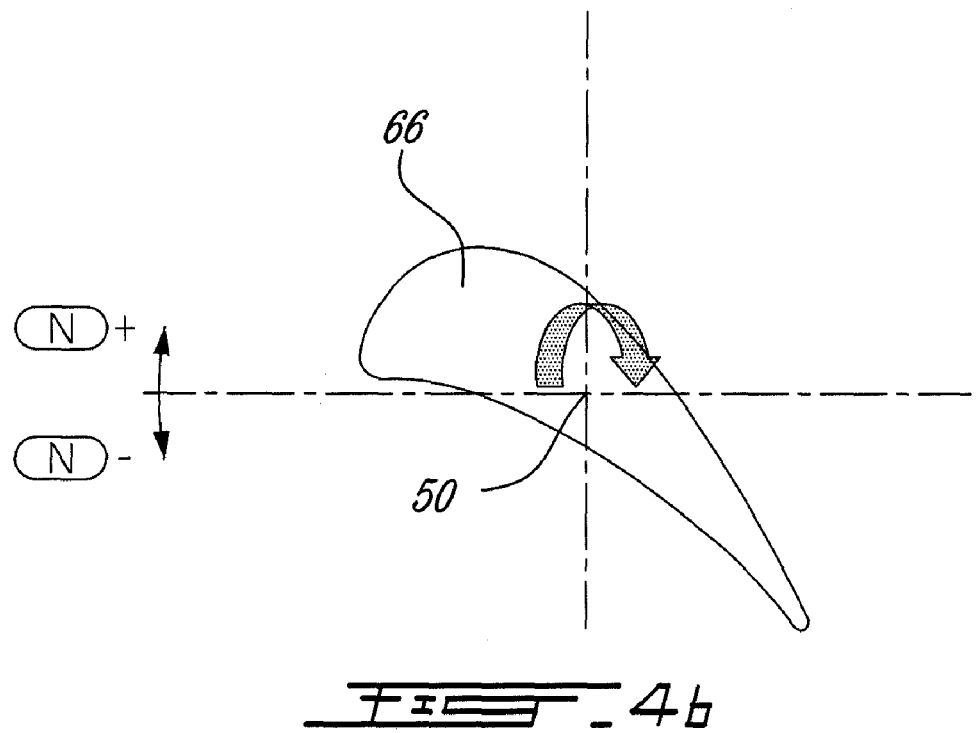

FIGS. 4a and 4b illustrate the tolerances on twist and restagger angles. The twist "N" is an angular variation at each blade section, whereas restagger is the angular reposition of the entire airfoil. Both the twist and the restagger angles are about the stacking line 50. The section twist "N" (section restagger) tolerance with respect to the stacking line is +/−0.501 degrees (casting tolerance). The global restagger capability for the airfoil with respect to the stacking line is +/−2.0 degrees (throat area adjustment).

The above description is meant to be exemplary only, and one skilled in the art will recognize that changes may be made to the embodiments described without department from the scope of the invention disclosed. All modifications which fall within the scope of the present invention will be apparent to those skilled in the art, in light of a review of this disclosure, and such modifications are intended to fall within the appended claims.

The invention claimed is:

1. A turbine blade of a gas turbine engine having a gaspath, the turbine blade comprising an airfoil having an intermediate portion contained within the gaspath and defined by a nominal profile substantially in accordance with Cartesian coordinate values of X, Y, and Z of Sections 3 to 13 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

2. The turbine blade as defined in claim 1 forming part of a high pressure turbine stage of the gas turbine engine.

3. The turbine blade as defined in claim 2, wherein the blade forms part of a second stage of a multi-stage high pressure turbine.

4. The turbine blade as defined in claim 1, wherein the turbine blade has a manufacturing tolerance of ±0.015 inches in a direction perpendicular to the airfoil.

5. The turbine blade as defined in claim 1, wherein X and Y values define a set of points for each Z value which when connected by smooth continuing arcs define an airfoil profile section, the profile sections at the Z distances being joined smoothly with one another to form an airfoil shape of the intermediate portion.

6. A turbine blade for a gas turbine engine having a gaspath, the turbine blade having a cold coated intermediate airfoil portion contained within the gaspath and defined by a nominal profile substantially in accordance with Cartesian coordinate values of X, Y, and Z of Sections 3 to 13 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

7. The turbine blade as defined in claim 6 wherein the blade forms part of a high pressure turbine stage of the gas turbine engine.

8. The turbine blade as defined in claim 7, wherein the blade is part of a second stage of a two-stage high pressure turbine.

9. The turbine blade as defined in claim 8, wherein the turbine blade has a manufacturing tolerance of ±0.015 inches.

10. The turbine blade as defined in claim 6, wherein X and Y values define a set of points for each Z value which when connected by smooth continuing arcs define an airfoil profile section, the profile sections at the Z distances being joined smoothly with one another to form an airfoil shape of the intermediate portion.

11. A turbine rotor assembly for a gas turbine engine having a gaspath, the assembly comprising a plurality of blades, each blade including an airfoil having an intermediate portion contained within the gaspath and defined by a nominal profile substantially in accordance with Cartesian coordinate values of X, Y, and Z of Sections 3 to 13 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

12. A high pressure turbine blade comprising at least one airfoil having a surface lying substantially on the points of Table 2, the airfoil extending from a platform defined generally by at least some of the coordinate values of the inner gaspath wall given in Table 1, wherein a fillet radius is applied around the airfoil between the airfoil and platform.

* * * * *